United States Patent [19]
Tyler et al.

[11] Patent Number: 5,523,942
[45] Date of Patent: Jun. 4, 1996

[54] DESIGN GRID FOR INPUTTING INSURANCE AND INVESTMENT PRODUCT INFORMATION IN A COMPUTER SYSTEM

[75] Inventors: Max C. Tyler, Duxbury; Maureen A. Maimone, Peabody; Christina M. Lev, Framingham; Norman W. Baker, Haverhill; Robert W. Watson, Melrose, all of Mass.

[73] Assignee: New England Mutual Life Insurance Company, Boston, Mass.

[21] Appl. No.: 221,291

[22] Filed: Mar. 31, 1994

[51] Int. Cl.⁶ .................................................. G06F 157/00
[52] U.S. Cl. ............................................ 364/401; 364/406
[58] Field of Search ................................ 364/401, 406, 364/408; 395/149, 156, 157, 161

[56] References Cited

U.S. PATENT DOCUMENTS 4,831,526  5/1989  Luchs et al. ............................ 364/401

OTHER PUBLICATIONS

Cox, Brian, "Lincoln National sees big gains with new software", National Underwriter (Life/Health/Financial Services) V97n32 pp. 2, 17, Aug. 9, 1993.

Scott H. Koehler, "How to Handle Objects", Computerworld, Sep. 20, 1993, p. 113.

Scott H., Koehler, "Objects in Insurance", Object magazine, Jul.–Aug. 1992, pp. 37–41.

Primary Examiner—Gail O. Hayes
Assistant Examiner—Frantzy Poinvil
Attorney, Agent, or Firm—Kenyon & Kenyon

[57] ABSTRACT

A computer implemented graphical user interface for receiving instructions and information relating to insurance products, and for displaying insurance proposals relating thereto. The graphical user interface has an insured section for receiving personal information about a person to be insured and a product design section for receiving information specifying an insurance product and the insurance products components. The product design section has a design grid which is a matrix enabling input of product information, premium information and dividend information relating to a selected insurance product. The design grid enables a user to select a solve procedure and variable as the subject of the selected solve procedure.

10 Claims, 32 Drawing Sheets

FIG. 2A

PROPOSALS 40

File Edit View Actions Producer Insured Design Reports Window Help

PROPOSAL

Producer 1st          Insured 1st
First Name Last Name  First Name Last Name   Gender    Smoking Status    Age  State
                                             Male      Non-Smoker        45   MA Product Design

| Product Line | Strategy | | | Solve For: |
|---|---|---|---|---|
| Traditional Life | Full Pay | | | Initial Premium |

| | Feature | Option | Amount | Year/Age |
|---|---|---|---|---|
| 1 | Product | Ordinary Life | $100,000 | 1-M |
| 2 | Premium | Annual Premium | Solve | 1-M |
| 3 | Dividend Option | Paid-Up Adds | N/A | 1-M |
| 4 | Rider... | | | |
| 5 | Substandard Ratings | | | |

Withdrawals
Policy Funding
Rider
Premium Mode
Tax Bracket 72
73
75

FIG. 2B

![Screenshot of PROPOSALS application window showing Proposal form with Producer, Insured fields, and Product Design table with Feature, Strategy, Option, Amount, Solve For columns. A dropdown shows options: YRT, Lump PUAR, Purchase Option, ADB, Child Agreement, TIO/FTR]

FIG. 2C

| | File | Edit | View | Actions | Producer | Insured | Design | Reports | Window | Help |

PROPOSALS — 40

Producer 1st    Insured 1st

First Name    Last Name      First Name    Last Name      Gender   Male    Risk   Non-Smoker    Age 45    State MA

PROPOSAL

Product Design

Product Line    Strategy                               Solve For
Traditional Life    Full Pay                          Initial Premium

| | Feature | Option | Amount | Year/Age |
|---|---|---|---|---|
| 1 | Product | Ordinary Life | $100,000 | 1-M |
| 2 | Premium | Annual Premium | Solve | 1-M |
| 3 | Dividend Opt.... | Paid-Up Adds | N/A | 1-M |
| 4 | Rider... | Annual PUAR | $10,000 | 1-5 |
| 5 | | | | |
| 6 | | | | |

FIG. 2D

PROPOSALS

Producer 1st

First Name  Last Name

PROPOSAL

Insured 1st

First Name  Last Name    Gender  Risk         Age  State
                         Male    Non-Smoker   45   MA

Design

| Business Plan | Product Line | Strategy | Solve For |
|---|---|---|---|
| None | Traditional Life | Full Pay | Initial Premium |

| | Feature | Option | Amount | Age/Year |
|---|---|---|---|---|
| 1 | Premium | Annual Premium | Solve | 1-M |
| 2 | Product | Ordinary Life | | 1-M |
| 3 | Dividend Opt... | Paid-Up Adds | N/A | 1-M |
| 4 | | | | |
| 5 | | | | |

Premium Details

Option 69a

Amount 70a  Year/Age 71a

Modify

| | Age | Option | Amount |
|---|---|---|---|
| 1 | 45 | Specify | 1000 |
| 2 | 46 | Specify | 1000 |
| 3 | 47 | Specify | 1000 |
| 4 | 48 | Specify | 1000 |
| 5 | 49 | Specify | 1000 |
| 6 | 50 | Specify | 2000 |
| 7 | 51 | | |
| 8 | 52 | | |
| 9 | 53 | | |
| 10 | 54 | | |
| 11 | 55 | | |
| 12 | 56 | | |

OK    Cancel    Help

100

Premium Details

Option: Annual Premium — 69a
Amount: Solve — 70a
Year/Age: 7-10 — 71a

Modify

| | Age | Option | Amount |
|---|---|---|---|
| 1 | 45 | Specify | 1000 |
| 2 | 46 | Specify | 1000 |
| 3 | 47 | Specify | 1000 |
| 4 | 48 | Specify | 1000 |
| 5 | 49 | Specify | 1000 |
| 6 | 50 | Specify | 2000 |
| 7 | 51 | Annual Premium | Solve |
| 8 | 52 | Annual Premium | Solve |
| 9 | 53 | Annual Premium | Solve |
| 10 | 54 | Annual Premium | Solve |
| 11 | 55 | | |
| 12 | 56 | | |

OK   Cancel   Help

FIG. 3C

Premium Details

Option: Specify ~69a

Amount ~70a: 5000

Year/Age ~71a: A-55

[Modify]

| | Age | Option | Amount |
|---|---|---|---|
| 1 | 45 | Specify | 1000 |
| 2 | 46 | Specify | 1000 |
| 3 | 47 | Specify | 1000 |
| 4 | 48 | Specify | 1000 |
| 5 | 49 | Specify | 1000 |
| 6 | 50 | Specify | 2000 |
| 7 | 51 | Annual Premium | Solve |
| 8 | 52 | Annual Premium | Solve |
| 9 | 53 | Annual Premium | Solve |
| 10 | 54 | Annual Premium | Solve |
| 11 | 55 | Specify | 5000 |
| 12 | 56 | | |

[OK] [Cancel] [Help]

Object Viewer Base TL Year: 1

File  View  Prev Year  Next Year  Window

Life Contract TL
| | |
|---|---|
| Death Benefit | 100000.00 |
| Cash Value | .00 |
| Premium Due | 2120.00 |
| EOY Dividend | 24.00 |
| Money Out | .00 |
| Cash Outline | 2120.00 |
| Tot Prem Paid | 2120.00 |
| Billable Interest | .00 |
| Cash Dividends | .00 |
| Terminal Dividend | .00 |
| Basis | 2120.00 |
| ALBO Active | FALSE |

Puar Annual
| | |
|---|---|
| Face Amount | .00 |
| Death Benefit | .00 |
| Cash Value | .00 |
| Cost | .00 |
| Premium Due | .00 |
| EOY Dividend | .00 |
| Tot Surr Amt | 277.9668 |
| Prem Rate | 288.9668 |
| CV Rate | 6.8686 |
| Div Rate | .00 |
| Rated Premium | |
| Entered Payment | |

PuarLump
| | |
|---|---|
| Face Amount | .00 |
| Death Benefit | .00 |
| Cash Value | .00 |
| Cost | .00 |
| Premium Due | .00 |
| EOY Dividend | .00 |
| Tot Surr Amt | 277.5800 |
| Prem Rate | 288.0800 |
| CV Rate | 6.9500 |
| Div Rate | .00 |
| Rated Premium | .00 |
| Entered Payment | |

DivAdds
| | |
|---|---|
| Face Amount | .00 |
| Death Benefit | .00 |
| Cash Value | .00 |
| Cost | .00 |
| Premium Due | .00 |
| EOY Dividend | .00 |
| Tot Surr Amt | 277.9668 |
| Prem Rate | 288.9668 |
| CV Rate | 6.8686 |
| Div Rate | .00 |
| Rated Premium | |
| Entered Payment | |

OL
| | |
|---|---|
| Face Amount | .00 |
| Death Benefit | .00 |
| Cash Value | .00 |
| Cost | .00 |
| Premium Due | .00 |
| EOY Dividend | .00 |
| Tot Surr Amt | 277.9668 |
| Prem Rate | 288.9668 |
| CV Rate | 6.8686 |
| Div Rate | .00 |
| Rated Premium | |
| Entered Payment | |

Client  Work Folder  Loan  LegalTL  IllustrationProcessing TL  CompiledRates

Object Viewer Base TL Year: 1-{Life Contract}

File View Prev Year Next Year Window

| | |
|---|---|
| Death Benefit | 100000.00 |
| Cash Value | .00 |
| Premium Due | 2120.00 |
| EOY Dividend | 24.00 |
| Money Out | .00 |
| Cash Outlay | 2120.00 |
| Tot Prem Paid | 2120.00 |
| Billable Interest | .00 |
| Cash Dividend | .00 |
| Terminal Dividend | .00 |
| Basis | 2120.00 |
| ALBO Active | FALSE |

Object Viewer Base TL Year: 1 — 900

File  View  Prev Year  Next Year  Window

Life Contract TL
Death Benefit       100000.00
Cash Value               .00
Premium Due          2211.00
EOY Dividend           24.00
Money Out                .00
Cash Outlay          2211.00
Tot Prem Paid        2211.00
Billable Interest        .00
Cash Dividends           .00
Terminal Dividend    2211.00
Basis                FALSE
ALBO Active

Waiver-Client
Face Amount              .00
Death Benefit            .00
Cash Value               .00
Cost                   91.00
Premium Due            91.00
EOY Dividend             .00
Tot Surr Amt             .00
Prem Rate             .0000
CV Rate               .0000
Div Rate                 .00
Rate Premium             .00
Entered Payment

OL
Face Amount        100000.00
Death Benefit      100000.00
Cash Value               .00
Cost                 2120.00
Premium Due          2120.00
EOY Dividend           24.00
Tot Surr Amt             .00
Prem Rate           20.8500
CV Rate               .0000
Div Rate              .2400
Rate Premium             .00
Entered Payment Client  Work Folder  Loan  Legal  IllustrationProcessing TL  Led Rates  PuarLump  DivAdds

DESIGN GRID FOR INPUTTING INSURANCE AND INVESTMENT PRODUCT INFORMATION IN A COMPUTER SYSTEM

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves the copyright rights whatsoever.

FIELD OF INVENTION

The present invention pertains to a computer-based system and user interface for entering and processing insurance and investment product information. More particularly, the present invention pertains to a system and method for requesting and entering either quoted or actual information on insurance and investment products, such as, for example, annuity, life and disability insurance and investment products.

BACKGROUND OF THE INVENTION

Insurance and investment products are highly complex and technical products. For example, different insurance products have various features and options. The computer processing and mathematical calculations required for the various insurance products is enormously complicated. Thus, processing requests for information is a complex and often error prone activity.

In the insurance industry, insurance products are often sold by agents, working in the field. Typically, an agent will call on a prospective client (or "prospect") to discuss the insurance products that may interest a client. The agent often brings along statistical information prepared for a particular client to illustrate to the client the benefits of the various products that the agent wishes to sell. As is easily appreciated, the premiums paid and the resulting benefits received depend on many factors (such as, e.g., the age of the client, the number of dependents, the income of the client, the type of policy, the health of the client, etc.) However, due to the complex nature of the many differing insurance products, the agent cannot prepare statistics that illustrate the operation of each product for each contingency.

An insurance agent usually has access to a computer to help prepare statistics for a client, as well as for keeping records as to clients and appointments. Often, the agent has a laptop computer, and is able to take this computer to a client so as to calculate premiums and returns, and show graphs and statistics on the spot. An agent will usually wish to show the client many possible proposals, each having various information about a product, such as product and component level premiums, cash values, surrender values, dividend values, and benefit amounts.

Due to the complex nature of insurance products, and because each insurance product often requires different or unique information as input, it is often the case the user interface for each computer system to perform these tasks is different for each insurance product. Traditional request screens have been designed and developed "one field at a time". There is usually one request screen for each insurance product. Given the number of products and product variables, traditional request screens are often extremely complex. Because of the large number of products, and thus, the large number of request screens, it is difficult for users to learn and use current systems. In particular, it is often not easy for agents to learn and use the various computer user interfaces to produce information for clients.

Further, once the agent has made a sale, the agent usually fills in a form with the relevant client information (usually an insurance application, with the proposal selected by the client attached) and sends it to home office, where the information is entered into another computer system. At home office, a policy is "created" for the client. Based on this policy, the client and the agent are usually sent periodic statements from home office.

The processing of desired information to create sales proposals, for sales support, to issue a new product and for administrative situations is very difficult due to: (i) the large number of variations in products, their features or components, and the combinations of features that are packaged for a client, (ii) the calculations that are necessary to provide information about the products, and (iii) the variable assumptions that often are used to determine a policy's value (for example, an assumed amount of premium flow, the absence and presence of loan activity, policy dividend scales, interest earnings, and mortality experience).

As an example of a product with specific features, a base ordinary life insurance policy may be packaged with a disability rider, accidental death benefit, and a term rider that is made up of both term insurance and paid-up policy features. To support a given client's needs, an information quote must factor in and request all of the desired policy components and convey that information to calculation routines that determine the information that is either requested or required given the specific policy conditions necessitated by the quote. The process that performs the information quote must access required rates. Eventually, the quote and related information is returned to the requester.

Insurance product life-cycles span multiple years. This results in the need to provide not only point in time information but also information that spans a one or a number of time intervals. An example of point in time information is the value of a policy on a particular date. An example of information that spans one or a number of time intervals is a client's annual contribution. Often, a request by an agent, customer or actuary may involve projecting out twenty or more years into the future, interpreting existing information on a previously sold product, or projecting the impact on policy values if certain product assumptions are modified, as well as providing specific point in time information.

Additionally, based on an issued policy, information about a change in policy features may be requested. An example of such a request might be to provide information as to the premium level if the amount of insurance in force with the policy is reduced or a rider or benefit is added, modified or deleted.

The processing of desired information also requires complex calculations to demonstrate how attributes of these products and their underlying components will behave over time. In addition, these same product calculations may be required at many stages of a product's life cycle. For example, product values are often calculated during product development, at point of sale, at time of purchase or new issue, and at termination.

In the insurance industry, information is often required about a policy at a composite policy level and at a policy component level. An insurance policy typically has a core component and one or more riders that provide additional features for the policy. Thus, calculations that are performed must also provide information about the policy as a whole (including all the riders) and about the riders individually. As an example, it is often necessary to provide information on the cost of an ordinary life coverage, a death and disability rider, and a yearly renewable term rider in total as one policy or at the individual policy component level. As above, these values may change over the life time of the policy, and therefore, iterations of values over a number of time intervals (typically years) are also required.

Furthermore, variables impacting policy values, for example, types of underwriting, insured age, sex, issue state, product and component type, and the time interval requested, require access to complex rate structures that are utilized by information calculation routines. Rate information is determined by actuarial formulae and historical information about mortality, investment experience, and other factors.

In general, the parameters that are needed to compute information about a particular insurance product include the product and component types, the rates accessed for the time interval being requested, the age and sex of the insured, and the underwriting class.

New financial service products, introduced at a rapid pace to meet market demands and regulatory pressures, add another level of complexity. Deployment of these products requires the ability to calculate product values at a variety of points in the product development, sales, new issue and servicing cycle.

Part of the sales process typically utilizes complex calculations to demonstrate how attributes of insurance products and their underlying components will behave over time. In addition, these same product calculations are often undertaken at many stages of a product life cycle. For example, product values are calculated during product development, during the sales process, at time of purchase or issue, and at termination.

In many cases, a new product contains many similarities with those already existing in the portfolio. Differences may exist in the underlying funding mechanisms of the product while many other features are carried forward from existing products. In addition, existing products may require innovative changes to keep pace with the marketplace as new marketing opportunities are identified or as the interest rate climate changes. This effort may consist primarily of repackaging an existing product to present it in a new light or altering the dividend scale for a product.

A computer system used in processing information about insurance products must therefore address the highly complex and often slow interactions between the information request screens, calculation routines, and information display options, given the number of variables and large number of rates required to support typical information requests. Return of requested information should support "point in time" information, information across a number of time intervals, and should be accessible at a policy or policy component level. Finally, the system should be easily adaptable to modifications in and new products.

To deal with these complexities, complex computer based information request screens and numerous calculations routines are often developed and used by insurance companies and their agents. Typically, quotes are done on personal computers and administrative procedures are supported on large or mid-scale mainframe computers. Because of the different architectures of personal and mainframe computers, the development of multiple request screens and calculation routines in both architectures is typically required. Similarly, calculation routines are often separately developed for each type of product available. Therefore, a large number of often overlapping calculation routines are developed that do not take advantage of the functions and real world constraints common to most products. This results in additional expense when developing and maintaining these systems. Such a dual environment often results in inconsistent information being provided to a user.

The conventional response to these needs has been a proliferation of dedicated systems. The calculations performed by these systems often overlap, causing many redundancies. Updating conventional versions of these product calculation computer systems has historically been a bottleneck to releasing new products, particularly in the financial services industry.

More specifically, conventional software approaches have drawbacks in several areas. First, the structure of conventional systems is mostly attribute-oriented, rather than component-based. Each module of conventional systems is designed to perform a calculation, regardless of the product. For example, in conventional systems, a module that computes a cash value of a policy is usually designed to compute the cash value for all types of policies. When a new policy is added, this (and other) modules must be modified to accommodate the new policy. Updates resulting from product changes or innovations generally span many modules, rather than being localized.

Second, as explained above, in conventional systems, there is redundant code, since many of the insurance products have similar behaviors.

Third, the procedural-based code is littered with if/case statements that branch conditionally depending on the type of product. Writing and modifying such code is often quite error prone.

In addition, due to the lack of a common interface, versions of the product calculations exist in multiple existing software applications. These applications span hardware architectures and business areas. The development and maintenance of such duplicate applications is expensive and inefficient.

Therefore, known systems and methods for requesting information from a user as to an insurance product (for example, information so that an insurance policy can be designed for the user, or information to update or modify or provide information about an existing policy) and for performing calculations related to insurance products are entirely inadequate for the complexity and number of packaged product features and components. Existing systems can not easily provide information about various product options at varying points or time intervals. When new products are added to an insurance company's product line (or if existing products are modified), the computer systems used to sell and process such products can not easily be modified for the new products.

A uniform approach is needed, in which one user interface can be used to enter information about all possible products, and where the calculations that are performed are designed based on the operations that take place, not on the underlying product for which the operation is performed.

SUMMARY OF THE INVENTION

The present invention is a computer-based system and method for requesting and inputting insurance and investment product information, and for performing calculations relevant to all aspects of insurance and investment products. As used herein, the term "insurance product" includes insurance and investment products, such as, for example, life insurance and disability income contracts, annuities and mutual funds.

The present invention comprises a unique user interface, called a design grid, that enables a user to intelligently enter all relevant information about an insurance product, regardless of the insurance product or the type of request about an insurance product that the user wishes to undertake.

The present invention also comprises a calculation engine. The calculation engine is designed to perform all required calculations related to insurance products. These calculations include determining the cash value of a policy, calculating a death benefit on an annual basis, calculating the premium due, calculating the net premium due, determining a guaranteed cash value of all individual coverages, calculating annual cash dividends, and the like.

At its highest level of functionality, the present invention operates as follows. Information about insurance product rules and rates is stored in the memory of a digital computer. The information may be stored as data or as procedures that carry out specific functions. The digital computer is supplied with a specific information request. The information request may be for information about a proposal, or may be a request for sales support, or a request that the system of the present invention perform a product administrative function. In conjunction with the user, the digital computer determines the information request requirements, accesses the required rates, calculates the required information, and displays it to the user or passes it to another computer system.

Typical functions that can be performed by the present invention include: (i) collecting information required to design an insurance product for a customer; (ii) receiving a request for information about an insurance product or policy; (iii) accessing stored information, such as rates, performing the necessary calculations based on the request and returning the requested information to the user; and (iii) displaying policy level and component level information at both a "point in time" and over one or more time intervals.

The design grid of the representative embodiment of the present invention is a matrix-like graphical user interface. The design grid is used to collect all information from a user required to design an a specific instance of an insurance product, herein called a policy or a proposal. The design grid identifies the information needed to design a policy for the user, presents choices for the user to select while the user is designing the policy, and enables the display of information related to the policy.

The design grid is displayed in one window of a computer screen. In the representative embodiment, the window is part of a graphical user interface and window operations are controlled by the Microsoft Windows NT brand operating system or the Microsoft Windows brand application program running on the MS-DOS brand operating system. Thus, the window on which the design grid is displayed includes a menu bar for selecting instructions and buttons for performing common operations. The window has a section that allows the user to enter information about the person for whom the policy is being designed. (The person for whom the product is being designed is called the insured or client. The person who is entering the information on the design grid is usually an agent of an insurance company or an administrative support person, and is often called the producer.) This information includes that which is typically required by an actuary when determining a premium, and can include the name, gender, age, predominate risk factors and state of residence of the insured. The design grid is displayed on one section of the window. A function of the design grid is to collect data from a user (typically, an agent or a producer) which is required to generate a proposal. The design grid is a concise one-window view of a proposal. In the representative embodiment, the design grid can hide boxes that contain more detailed information, thus accommodating both entry level and advanced users.

The design grid in the representative embodiment is shaped as a matrix. The design grid can be a matrix of rows and columns that conditionally appear based on the type of product and component data entered. The producer enters information about the policy the insured requires. The design grid can itself determine, as information requests are entered into the grid, what information variables are needed or not applicable to the type of proposal being developed. Accordingly, as selections about a policy are made, different choices that result from these selections can be displayed. Hidden boxes can be displayed that allow the producer to select from a list of possible options for the policy. The choices available for selection reflect the structure of the insurance products that are "sold" by the insurance company. Further, the design grid allows the agent to specify the time interval for which information is desired. The design grid therefore standardizes and simplifies the input of information and leads to reduced operator training and errors.

After a policy has been designed, the producer is able to "solve" the policy for various outcomes. For example, once the parameters of a policy have been entered on the design grid, the producer can solve the policy for the "initial premium" and cause the result (i.e., the initial premium that the insured must pay for the designed policy) to be displayed.

Accordingly, the design grid of the present invention provides a concise one-window view of proposal information. The one design grid can be used to design all policies for an insurance company, regardless of the type of insurance product being designed or for which information is being requested. Thus, an agent does not have to learn a particular interface for each available or new product. The agent can use the design grid to experiment in creating proposals best suited for a client, and can easily jump between product types without having to reenter information.

In the representative embodiment, a validation engine is used to validate the information entered via the design grid. Because the design grid allows the user to navigate freely around the system, rather than the system forcing the paths the user must take when entering information and designing proposals, a system that performs interactive validation as the user enters data without following a prescribed sequence is desirable. The validation engine of the present invention is an object oriented system that performs validation on data entered from the design grid, or any other front-end system, and returns error messages to the design grid in the event that invalid data has been entered.

The calculation engine of the present invention accesses required rates, performs all required calculations related to the proposal based on the information entered at the design grid, and returns the proposal output to the user. The calculation engine also has the capability of providing the calculation functions for user interfaces other than that of the design grid, for example, a system used by actuaries.

Typically, the calculation engine can be stored on the memory of the same processor that controls the design grid.

For example, if the design grid is controlled by and displayed on the screen of a laptop computer, then the calculation engine can be controlled by that same laptop computer. Alternatively, the calculation engine may be located at a central location, such as the home office of an insurance company. In such an embodiment, the calculation engine can be executed on large mainframe computer, or on a personal computer that is part of a local area network. The design grid, on the other hand, could be located on and implemented by a small portable computer used by agents in the field. The agent's computer (with the design grid) and the home office computer (with the calculation engine) are, in this embodiment, coupled together, for example, via modems and communication lines. There is total flexibility as to the configurations of the present invention. For example, the design grid may also be located on a personal computer at an agent's local office. This computer may also include the calculation engine, and additionally, the calculation engine may also be located at home office. Typically, home office also uses the design grid, for example, to assist in designing new insurance products and to answer customer queries.

The calculation engine has been designed to be a stand alone product, that can operate independently of the design grid. Other user interfaces can be designed that take advantage of the features of the calculation engine. The calculation engine can be used for many different types of insurance calculations, and it is not limited to designing proposals for clients. Similarly, the design grid can be coupled to an engine other than the calculation engine, if required.

The calculation engine is implemented using object oriented programming techniques. These techniques, and the structure of the calculation engine, allow the calculation engine to perform functions that current programs and systems in the insurance industry are unable to accomplish. Thus, the calculation engine can be considered as comprising a number of processable objects that model the various insurance products that are available.

The object oriented programming techniques used by the calculation engine provide the "model" and the tools for providing inheritance features for emphasizing similarities and eliminating redundant implementation. Messaging provides the public, business-oriented interface through which consuming applications can communicate with the fundamental business (e.g. component) objects. Encapsulation facilitates the ability to hide implementation details from consuming applications and in fact ensure that consuming applications need not access these details. Polymorphism provides the basis for uniquely implementing product differences while allowing consuming applications to communicate in terms of high level abstractions relevant to their need (e.g., provide the value of any component which is "life product" regardless of what the specific life product is or how it calculates that specific value).

Unlike conventional application development techniques in which the resulting system is a series of processing modules which act on data that is stored in databases or on files, the object oriented techniques of the present invention result in a network (or lattice) of objects that have certain knowledge and can exhibit certain behaviors. Collectively, these objects are able to provide all functionality required by the system.

The calculation engine can be common to all insurance product and component types and can take advantage of functions common to all insurance products. The calculation engine can support: (i) accessing required rates, (ii) calculating the desired information and (iii) packaging, in "containers", of the information for return to the design grid (and, if required, other display modules).

In the representative embodiment, the calculation engine utilizes an interface structure, called a "calculation engine application programming interface" herein called an "API". The API enables the calculation engine to be accessed by both personal computer-based and mainframe-based computer platforms via user interfaces such as, but not limited to, the design grid. Calculation engine iterators and containers manage and control arrays of requested information and package the information for information display modules like an object viewer, discussed below.

In the representative embodiment, the calculation engine includes a solve engine. The solve engine works in conjunction with the calculation engine and, in certain situations, controls the operations and activities of the calculation engine. The solve engine performs a solve operation, that determines a result based on information about a policy (such as that information entered at the design grid). For example, the solve engine may be presented with information about a policy and be requested to determine what premiums have to be paid each month to achieve a certain policy value by a certain year.

At the macro level, the solve operation executed by the solve engine can involve varying input parameters in order to achieve one or more targeted values. For example, it may be desirable to achieve a $150,000 contract cash value in year twenty, by varying annual cash value rider contributions. Since there is not always a linear relationship between the amount being varied and the contract value that is trying to be achieved, an iterative approach is used. In order to minimize search time, solve routines are designed to be as smart as possible, thereby arriving at a solution quickly.

A particular solve can consist of the thing that is being varied (input), the thing(s) that are being targeted and the smart logic to establish the guesses (tries). Multiple solves may be requested for a given illustration, and the solve may have multiple targets that need to be met. The solve engine provides powerful capabilities for the dynamic modeling of a client's complex needs.

The present invention may include an object viewer which displays policy level and component level information. Typically, the object viewer is used at home office to design new policy types, but also has other functions. The object viewer can be used to display the objects that comprise the calculation engine.

The object viewer is common to all insurance product and component types and can support the display of calculated information at either point in time or over one or more time intervals requested by the operator through the design grid or the calculation engine. The displays controlled by the object viewer can interact with information container packages provided by the calculation engine.

Accordingly, the present invention meets "consumer" front-end requirements because it is fast, has a uniform interface, and requires minimal training. The platform requirements required at the front-end, e.g., by sales staff in the field, can be minimal in terms of memory and hard disk consumption. Moreover, the data structures employed at the front-end are compatible with those used by "downstream" systems, such as those at home office.

The present invention employs methods whereby the object relationships of the calculation engine can be modified without changing internal code. Business objects can be packaged in such a way that they can be reused rapidly under different scenarios for the purpose of modeling "what if" situations. The business objects are designed in a way that they are easily used by new issue systems that validate product information entered from insurance applications, calculate premiums and produce policy summaries. The system can also readily support remote printing of the contract output at agency locations.

The object relationships of the calculation engine of the present invention focus on products and components (e.g. Ordinary Life or Waiver) rather than the traditional functions or calculation specifics (e.g. calculate death benefit). If consuming applications can "ask" components to relay their underlying "attributes", the specifics of the attribute calculation can be ignored by the consuming application thereby simplifying the programming problem presented to them.

The system of the present invention also is flexible enough to support administrative calculations that are required by policy change and in-force sales illustrations.

By use of a hierarchy of objects in the implementation of the calculation engine, the present invention focuses on similarities between insurance products, so that opportunities for reuse are illuminated. This can influence product design decisions in such a way that the opportunities for reuse are maximized. The system and method of the present invention also directly link the technology used to "model" and design new products with the technology employed by "downstream" sales, issue, and administrative systems. Design issues can be identified earlier in the product life cycle. Higher consistency can be attained and the ability to "service what is sold" can be enhanced. In addition, the present invention provides a structure that promotes extensibility and maintenance through a shorter design/code/test cycling, producing a competitive advantage for the company using the present invention. A common product calculation engine eliminates duplicated effort.

The present invention overcomes the fundamental problems of traditional systems by consolidating processes and leveraging similarities in product characteristics across the development/sales/service cycle. Through consolidation, multiple consumer systems can take advantage of the single implementation.

BRIEF DESCRIPTION OF THE DRAWINGS

FIGS. 2, 2A, 2B, 2C and 2D are screen displays illustrating an exemplary Proposal Window and showing the operation of the Design Grid of FIG. 1B.

FIGS. 3 and 3A are screen displays showing an exemplary detailed dialogue box that can be displayed from the Design Grid of FIG. 1B.

FIGS. 3B, 3C and 3D are screen displays illustrating a second exemplary detailed dialogue box.

FIGS. 15, 16, 17, and 18 show various screen displays produced by the Object Viewer of FIG. 1B.

DETAILED DESCRIPTION

It should be noted that while a representative embodiment of the present invention described herein is directed to the processing of insurance and financial products, the principles of the present invention are not so limited. The present invention can be easily modified for other types of products.

Figure 1A:
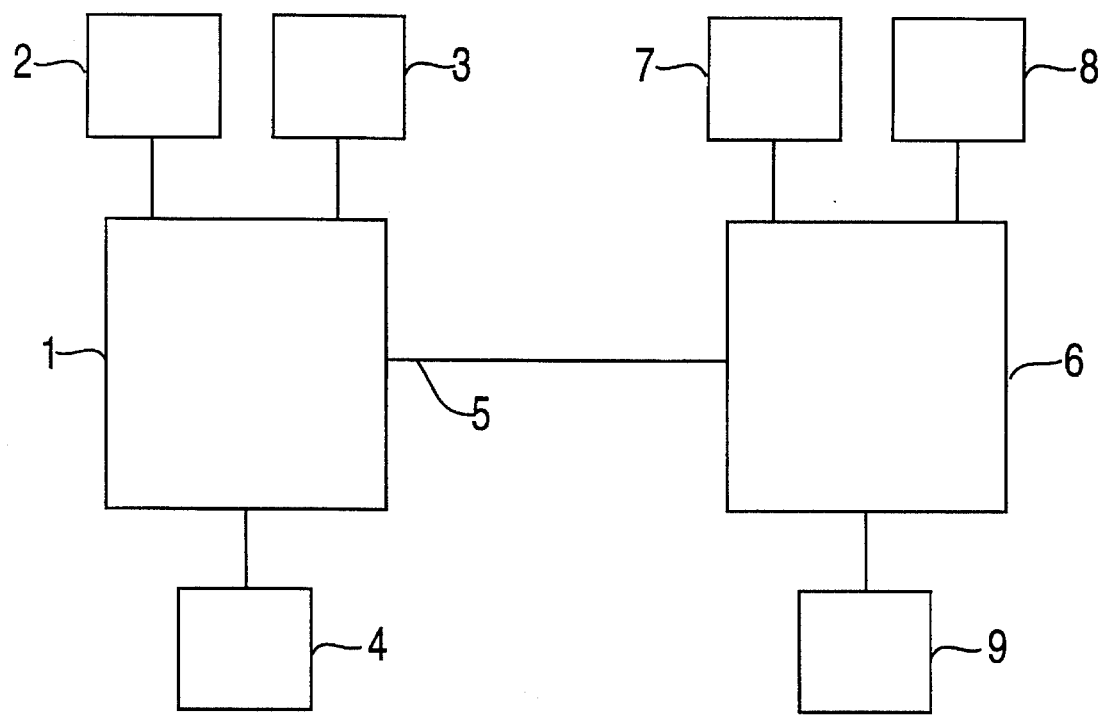
FIG. 1A is a block diagram of the hardware components of utilized by a representative embodiment according to the present invention.

Referring to the drawings, and initially FIG. 1A, there is illustrated in block diagram form the hardware components that can be utilized by the present invention. A computer processor 1 is coupled to an input device 2, an output device 3, and a memory 4. The computer processor 1 can be, for example, an IBM compatible personal or laptop computer running Microsoft Corporation's Windows brand application program on the MS-DOS brand operating system. The input device 2 can be, for example, a keyboard and/or a mouse. The output device 3 can be, for example, a computer screen, and additionally, a printer. In the representative embodiment, a Design Grid 10 is displayed on the output device 3 to enable the entry of information using known graphical user interface techniques.

The computer processor 1 is coupled via a communication line 5 to a second computer processor 6, also having an input device 7, an output device 8 and a memory 9. The communication line 5 may be, for example, a public telephone line or a dedicated wide area network. In the representative embodiment, processor 6 is an IBM mainframe computer or an IBM 486 personal computer on a LAN. In the representative embodiment, processor 6 controls the operation of a Calculation Engine 16 of the present invention, as explained in more detail below.

According to the present invention, the Calculation Engine 16 and the Design Grid 10 can both run on computer processor 1. Thus, there is not need for a communications line 5 to another processor. It is anticipated that this is the most suitable configuration when agents are in the field with clients.

Figure 1B:
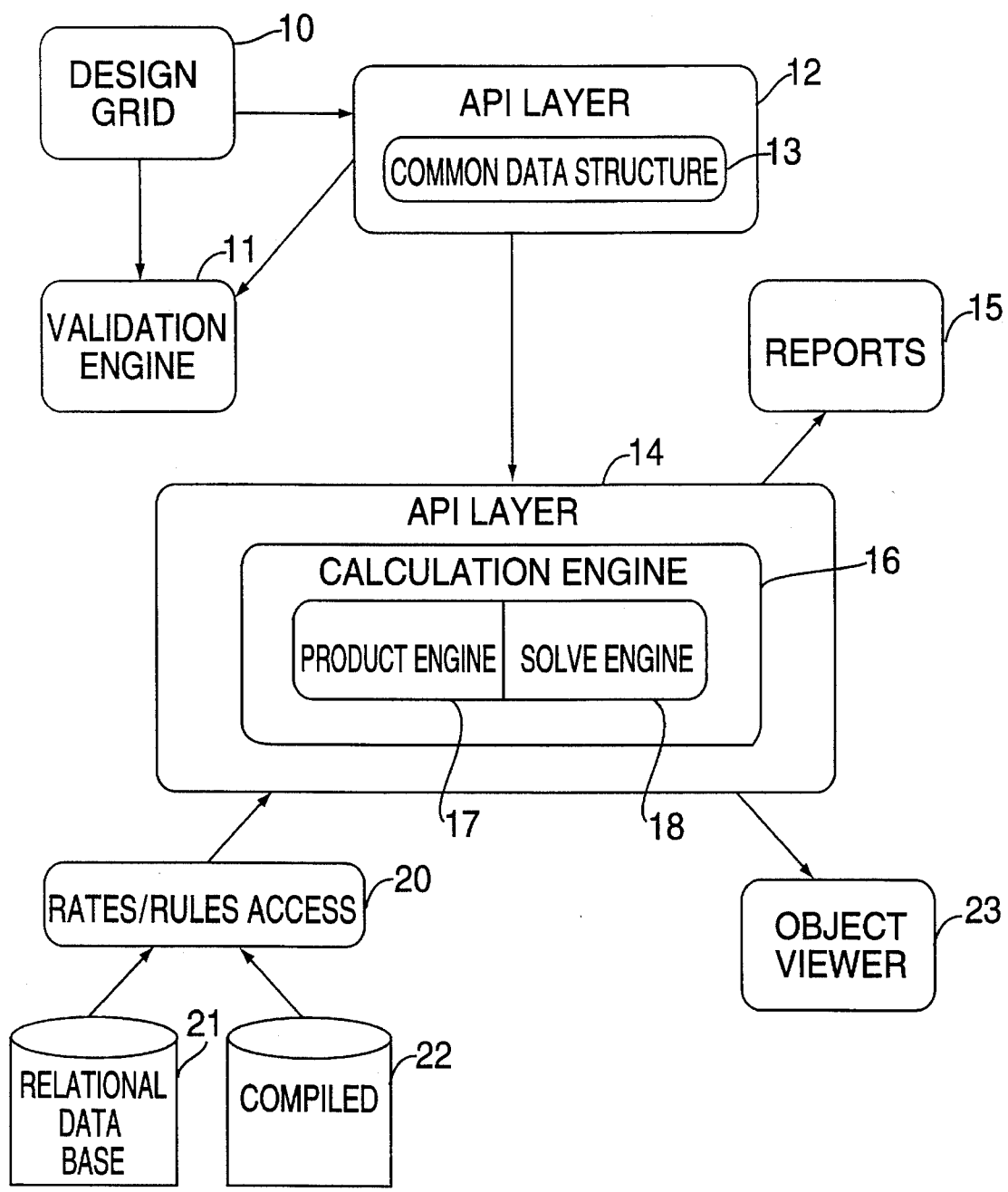
FIG. 1B is an architecture diagram in block diagram form of the modules of a representative embodiment according to the present invention.

Turning now to FIG. 1B, there is illustrated a functional block diagram of the components of a representative embodiment of the present invention. The system comprises the Design Grid 10 and the Calculation Engine 16. Application programming interfaces, hereinafter called an "API", enables communication between components of the present invention.

In the representative embodiment of the present invention, the Design Grid 10 is the primary user interface which can be used to collect the variables necessary to convey information to the Calculation Engine 16. The Design Grid 10 is a user interface for designing a specific instance of an insurance product (herein called a proposal or a policy) according to the present invention. The Design Grid 10 is used to collect from a user the data and information required by the Calculation Engine 16 to generate a proposal.

When a user enters information about an insurance product at the Design Grid 10, a Validation Engine 11 examines whether the information entered represents a valid combination of product components. It is noted that in the representative embodiment, the Validation Engine 11 is separate from the Design Grid 10, thus enabling the Validation Engine 11 to check information entered via other front-end systems (not shown).

Once valid information is entered at the Design Grid 10, API Layer 12 communicates the information to API Layer 14 of the Calculation Engine 16. In the representative embodiment, the Calculation Engine 16 comprises two main components, namely, a Product Engine 17 and a Solve Engine 18, described in detail below. The Calculation Engine 16 can obtain rates and rules data from a Rates/Rules Interface 20. The Rates/Rules Interface 20 can access a Relational Database 21 and a Compiled Database 22 for such compiled rates and rules data, relating to, for example, insurance products.

Figure 11:
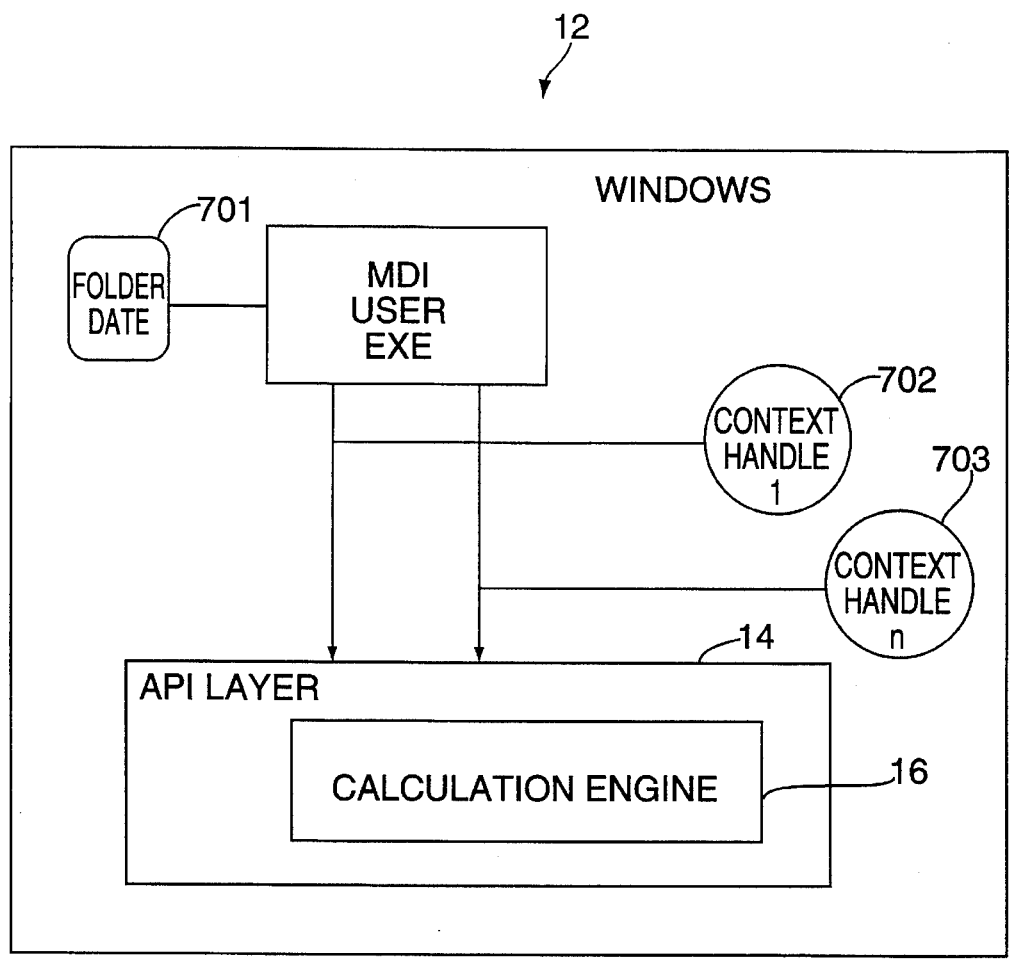
FIG. 11 is a block diagram of the API Layer of FIG. 1B.

API Layer 14 allows the Calculation Engine 16 to be called by multiple applications (i.e., consumer applications which do not employ object oriented technologies) to input and/or retrieve data into and from the Calculation Engine 16. The API Layer 14 is discussed in more detail below at FIG. 11.

The Calculation Engine 16 is also coupled to an Object Viewer 23. As discussed below, the Calculation Engine 16 is implemented using object oriented programming techniques. The Object Viewer 23 can be used as an alternative interface to the Design Grid 10 to view the results of the Calculation Engine 16. Using the Object Viewer 23, the user can "peer into" the objects of the Calculation Engine 16 and observe object attributes as they behave over time.

The Calculation Engine 16 can be coupled to a Report Generator 15. The Report Generator 15 outputs reports resulting from the Calculation Engine 16 calculations.

The API Layer 14 includes code and data. In the representative embodiment, the data is stored in a "common data structure" 13. The common data structure 13 comprises a list of all the data necessary to run an illustration. (As used herein, the term "illustration" has the same meaning as the term "proposal".) The Calculation Engine 16 knows the structure of the common data structure 13, and thus is able to read from the common data structure 13.

The representative embodiment of the present invention is designed for implementation using the Microsoft Corporation's Windows brand operating system. The graphical user interfaces are based on Microsoft Corporation's Windows Multiple Document Interface ("MDI") implementation. This allows a user to simultaneously work with several insurance proposals. In addition, the interfaces adhere to Microsoft Corporation's Application Style Guide to provide consistency between user interface components within the system and with other Windows applications. However, the present invention is not limited to this operating system and can be implemented using other graphical user interface operating systems and programs.

The object oriented paradigm of the Calculation Engine 16, in the representative embodiment, is implemented in the C++ programming language. However, any programming language now existing or hereinafter developed which supports object oriented principles can be utilized.

Figure 2:
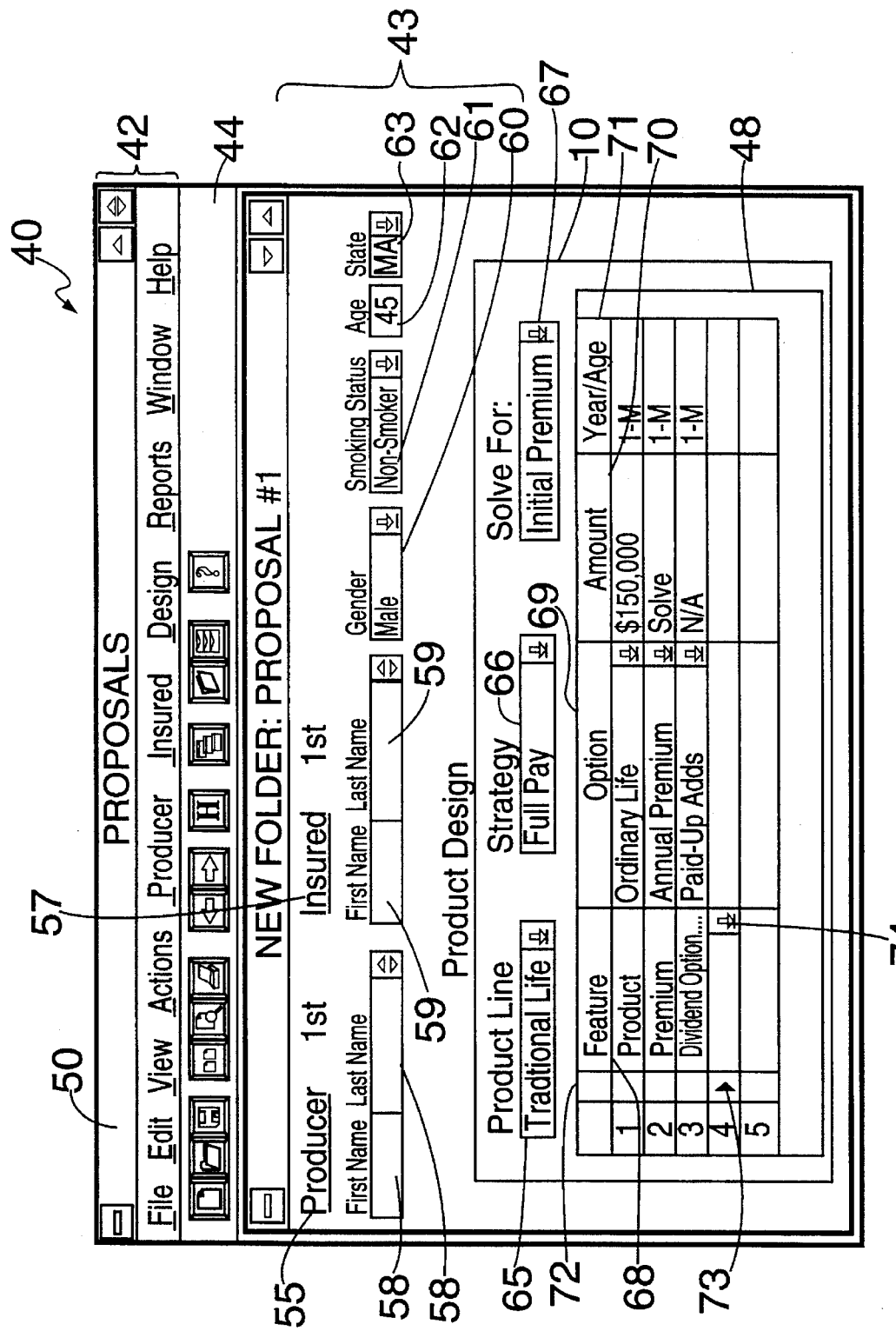

Referring now to FIG. 2, there is illustrated a screen display 40 that includes an exemplary Design Grid 10. The screen display 40 can be displayed on the output device 3. The screen display 40 includes a menu bar 42, a tool bar 44, and the Proposal Window 50. The menu bar 42 allows a user to select commands from a menu of listed commands. The tool bar 44 comprises buttons that represent more commonly used commands. Each proposal created using the Design Grid 10 can be displayed in the Proposal Window 50. In the representative embodiment, one proposal is displayed at a time. FIG. 2 shows a partly completed proposal entitled "Proposal #1".

The Proposal Window 50 has two main parts, namely, an insured/producer section 46 and the Design Grid 10.

A new instance of a proposal can be created automatically upon booting of computer processor 1 or by one of several user initiated methods. For example, the user can select a "File New" option under a "File" menu option in the menu bar 42 or select a "New" button in the toolbar 44.

The Proposal Window 50 in the representative embodiment is a MDI implementation with multiples allowed. The window caption can contain the name of the proposal being created (in FIG. 2, "Proposal") followed by an instance count if more than one Proposal Request has the same name (in FIG. 2, "#1"). In the representative embodiment, multiple Proposal Windows 50 can exist simultaneously, allowing the user to switch between and view input or output from multiple illustrations.

The Proposal Window 50 can be used to gather data from the user and, based on that information, display or print computer generated illustration reports and associated output pages. The Proposal Window 50 can operate, in the representative embodiment, in one of two modes at any point in time. The first mode is a data entry/validation mode in which data is entered and displayed on the Proposal Window 50. The second mode is an output mode which allows the operator to view on-line (using command Print Preview) or print in hard-copy (using command Print) a generated proposal report.

The insured/producer section 46 of the Proposal Window 50 allows entry of information about the person for whom the proposal is being created (this person is called the insured—see reference numeral 57) and, if required, about the agent who is entering the information (called a producer—see reference numeral 55).

In the representative embodiment, the information entered in the insured/producer section 46 of the Proposal Window 50 includes the name of the producer 58, which is entered in box 58. The information that is entered about the insured includes the name of the insured (box 59), gender (box 60), smoking status (box 61), age (box 62) and state of residence (box 63).

The Proposal Window 50 can allow entry or selection of field instances using edit and spin controls. Displaying multiple instances of a field or box (e.g., ownership by more than one producer) can also be accomplished using the well know graphical user interface edit and spin controls.

The Design Grid 10 is used for designing a proposal for the insured named in box 59. The Design Grid 10 can contain several list boxes and a Design Lattice 48. List boxes allow the user to select a parameter from a given list of available parameters. In the representative embodiment, the Design Grid 10 has three list boxes, namely, a Product Line box 65, a Strategy box 66, and a Solve For box 67. The choices made in these list boxes, in combination, directly affect the available choices presented in the Design Lattice 48, as constrained by the products that are available.

The Product Line box 65 can display a single selection of all available product lines. In the representative embodiment, available product lines include: Variable Annuities, Fixed Annuities, Traditional Life, Universal Life, and Disability Income. Similarly, the Strategy box 66 and Solve For box 67 can display a single selection of all available strategies for the product line chosen (i.e. Full Pay, Borrow, Flex Pay, Limited Pay and Vanish) and all available "solves" for the product line and strategy chosen.

In the representative embodiment, available solves include Solve for Initial Premium, Solve for Base Face Amount, Solve for Retirement Income, Solve for Variable Surrender, Solve for Variable Loans, Solve for Base Plan/ YRT Rider Mix, Solve for Annual Paid-up Additions Rider- Contributions (PUAR), Solve for Lump PUAR Contributions, Solve for Base/Flexible Term Rider (FTR) Mix, Solve for Base/Flexible Term Rider (TIO) Mix, Solve for Natural Vanish, Solve for NN Pay, Solve for PUAR Assisted Vanish, Solve for Side Fund Assisted Vanish, Solve for Borrow Cash Value Increases, Solve for Pay Interest Only, Solve for Automatic Zero Outlay, Solve for Best Level Outlay, Solve for Modified Endowment Contract (MEC) Avoidance, Solve for Graded Payments, Solve for Level Face Amount, Solve for Level Payment, Solve for Best Level Outlay, Solve for Variable Outlays, and Solve for Assumed Interest Rate.

The Design Lattice 48, in the representative embodiment, can be regarded as a table having rows, columns and cells. Once the Product Line box 65, the Strategy box 66 and the Solve For box 67 have been completed by the user, the user enters information in the Design Lattice 48 about the proposal that is being designed.

In the representative embodiment, the Design Lattice 48 of the Design Grid 10 has four columns and an unlimited number of rows. The four columns in the representative embodiment are a feature column 68, an option column 69 and amount column 70 and a year/age column 71. Each row in the Design Lattice 48, apart from the rows with the column headings, can be numbered.

Once a user has entered information about the policy being designed in the Product Line box 65, the Strategy box 66 and the Solve For box 67, the present invention automatically enters information in the feature column 68. For example, for a product in the traditional life product line with a full pay strategy, information that is required when designing a policy is the name of the product, the type of premium and the dividend option. Accordingly, the present invention automatically enters in the feature column 68, on separate lines, the terms "product", "premium" and "dividend option". In these rows, the user can then enter or select the required information under the option column 69, the amount column 70 and the year/age column 71. For example, for the "product" row (row 1 in FIG. 2), the user has entered "ordinary life" as the option, "$150,000" as the amount, and "1-M" (year one to maturity) as the year. (Examples of products available in the representative embodiment include Variable Life, Annuities, Universal Life, Ordinary Life, Ten Payment Life, Twenty Payment Life, Life Paid-up at 65, Graded Premium Life, Survivorship Life Select, Executive Plan Life to 65, Increasing Whole Life 10, 401(k) Ordinary Life, Mass Marketing Ordinary Life, Yearly Renewable Term to 95, Yearly Renewable Term to 70 (New York), Five Year Renewable and Convertible Term, Five Year Renewable and Convertible Term (New York), Yearly Renewable Term, and Life Paid-up at 95.) In the "premium" row (row 2 in FIG. 2), the user has entered "annual premium" as the option, and "solve" as the amount. This signifies that the user wishes the Calculation Engine 16 to determine the annual premiums for the designed policy.

A column 72 of the Design Lattice 48 displays the state of each row. These states can be defined as Errored Row (indicating that there are errors in the row) and Hidden Row (indicating that the row is hidden). If a row is in error (invalid parameter or cell), a warning icon (e.g., "!") is displayed in column 72. If a row is hidden the hidden row icon (e.g. "H") is displayed in column 72 for that row.

Further, the Design Lattice 48 allows the user to add features to the policy that is being designed. The user selects an arrow icon 73 from column 72, as explained below at FIGS. 2A–2C. Thus, the present invention indicates to users that additional data entries constituting parameters of a field can be added to a proposal. The arrow icon 73 as a visual clue that users can add additional features to the proposal. In the representative embodiment, the arrow icon 73 is be present at all times at the end of column 72.

The Design Lattice 48, in the representative embodiment, can be regarded as a matrix that permits immediate access to top and second level proposal data collection lattices and windows. Often, more detailed information is required from a user when designing a policy. Additional levels of collection can be accessed using detail dialogue boxes, as discussed below.

Further, the cells in an given field of the Design Lattice 48 can contain dropdown boxes or lists giving the user choices for entry in that cell. The choices that a user can enter into a cell may vary, depending, for example, on input in the other cells of the Design Lattice 48. As an example, as seen in FIG. 2, in the option column 69, each cell has a down arrow to the right of the cell that indicates that a dropdown box is available that lists options for this cell.

Referring now to FIGS. 2A–2C, there is illustrated a sequence of screen displays giving an example of how a user adds a feature to a proposal. In the example illustrated in FIG. 2A, the proposal consists of an ordinary life product, with a face amount of $100,000, and a dividend option of paid-up additions. In addition, the user has clicked on the arrow icon 74, resulting in the display a dropdown list box 75, which contains a list of available features that can be added to the proposal under design. It is assumed from this example that the user selects the rider feature, which is now displayed, as per FIG. 2A. The selection of the rider feature from the dropdown list box 75 causes the word "Rider" to appear in that cell in the feature column 68.

Accordingly, in the option column 69, a new dropdown list box 76 is displayed, presenting the list of the Riders that are available, given the selected product feature. In addition, the exclamation point appears in column 73 in row 4, signifying that an entry must be made in the options column 69. It is assumed that the user selects an Annual PUAR rider as the option. This is shown in FIG. 2C. (The user has decided to purchase some additional death benefit protection by making contributions to an Annual PUAR.)

The user must now select the dollar amount for the additional protection, and the number of years. In FIG. 2C, the user has selected $10,000 as the amount and 1–5 years. Accordingly, the user wants to make annual contributions of $10,000 per year for the first five years of the policy.

Next to the word "Rider" in the feature column 68 of FIG. 2C an indication has been added by the present invention that a Detailed Dialogue box 100 is available for this feature. In the representative embodiment, the indication is ". . . ", i.e., "Rider . . . ".

In the representative embodiment, the Design Grid 10 is implemented using FarPoint Professional Toolbox For Windows ('Drovers') by Farpoint Technologies Inc. of Richmond, Va.

Referring to FIG. 3, there is shown an exemplary Detailed Dialogue box 100 of the Design Grid 10. While the Design Lattice 48 can provide the user with the top level functionality necessary to collect proposal data for the majority of proposals, for some proposals and/or features, additional detailed data needs to be collected at a secondary level, for example, varying face amounts, varying death benefit options, varying loan interest rates, substandard ratings information, rider details and the like. The Design Grid 10 can provide users with a Detailed Dialogue box 100 for secondary level data collection as part of the proposal data collection process. In addition, the Detailed Dialogue box 100 can contain a Grid 101 as a quick and easy way of entering, viewing and keeping track of such data.

Indicating to users the existence of the Detailed Dialogue box 100 and presenting the users with access to the Detailed Dialogue box 100 for a field of the Design Lattice 48 can be way of a combination of visual clues. For example, in the representative embodiment, if an entry in the feature column 68 (e.g. Dividend Option, as shown in FIG. 2) is followed by an ellipses (i.e., "Dividend Option . . . ") and the text (i.e., "Dividend Option") is light-faced, Detailed Dialogue box 100 or a series of Detailed Dialogue boxes 100 exist for that feature. If the feature is followed by an ellipses and the text is bold-faced, this indicates that a Detailed Dialogue box 100 or series of Detailed Dialogue boxes 100 exist for the parameter and that data has previously been collected.

In the representative embodiment, the user can access the Detailed Dialogue box 100 by, for example, placing the cursor on the feature with ellipses and selecting the "Row Detail" command from the "Design" menu option in the menu bar 42. In an alternative embodiment, a cell can included command buttons that are displayed when a Detailed Dialogue box 100 exists for a cell.

The Detailed Dialogue box 100 includes Grid 101 for displaying variable information for the selected field. The Grid 101 can be an editable matrix with direct manipulation capability. The Grid 101, in the representative embodiment, has four columns, namely, a year column 105, an age column 106, an option column 107 and an amount column 108. The Detailed Dialogue box 100 also comprises an Option box 69a, an Amount box 70a, a Year/Age box 71a, a Modify command button 104, an OK command button 109, a Cancel command button 110, and a help command button 111.

Modifying the cells of the Grid 101 can be accomplished using the Option box 69a, the Amount Box 70a, and the Year/Age box 71a.

The Option box 69a itself is a dropdown list box that can list all valid options (e.g., for a premium feature, the valid options are annual premium, specify, and ALBO) for the field. In the representative embodiment, modifying the option column 107 can be accomplished through the Option box 69a. If there is only one valid option, the list box will change to a text display field where the valid option can be displayed and the option column 107 header text will change to gray indicating that the option cannot be modified.

The Amount box 70a is also a dropdown list box, and can list all valid amount selections (e.g., for a premium, the valid selection is a solve) for the field. Modifying the amount column 108, in the representative embodiment, can only be accomplished by the user keying in valid amounts.

The Year/Age box 71a allows a user to key in the year or age range desired.

The Modify command button 104, upon being selected (e.g., clicked upon), can update the Grid 101 based on the selections and entries in the Option box 69a, the Amount box 70a and the Year/Age box 71a.

The year column 105, the age column 106, the option column 107 and the amount column 108, in the representative embodiment, are editable display columns if more than one valve is allowed. The year column 105 can display the life years of the policy beginning at year "1". The age 106 column can display the insured's age during each policy year. The option column 107 can display the feature selected by the user. If only one option is available, this column can be left blank. If multiple options are selected, this column can display the option selected for the range specified (e.g., for years 1–5, if the user has selected annual premium, each cell for years 1–5 in the options column 107 will contain "Annual Premium").

The amount column 108 can display an amount for a specific range (e.g., for years 1–5, if users select solve as the amount, each cell in the amount column 108 for years 1–5 will contain "Solve").

The OK command button 109, when clicked, will cause the modifications to be processed, e.g., passed to the common data structure 13 for processing. The Cancel 110 command button, when clicked, can cancel any and all modifications made to the Grid 101 during the current sessions and return the user to the Proposal Window 50 with the cursor on the cell/field from which the Grid 101 derived.

The Detailed Dialogue box 100 and its Grid 101 can therefore allow the user to modify the primary and secondary level data in the fields of the Detailed Dialogue box 100. When changes are made in the grid 101, the first entry in the grid 101 will de displayed in the cell/field which references the Grid 101.

Figure 3A:
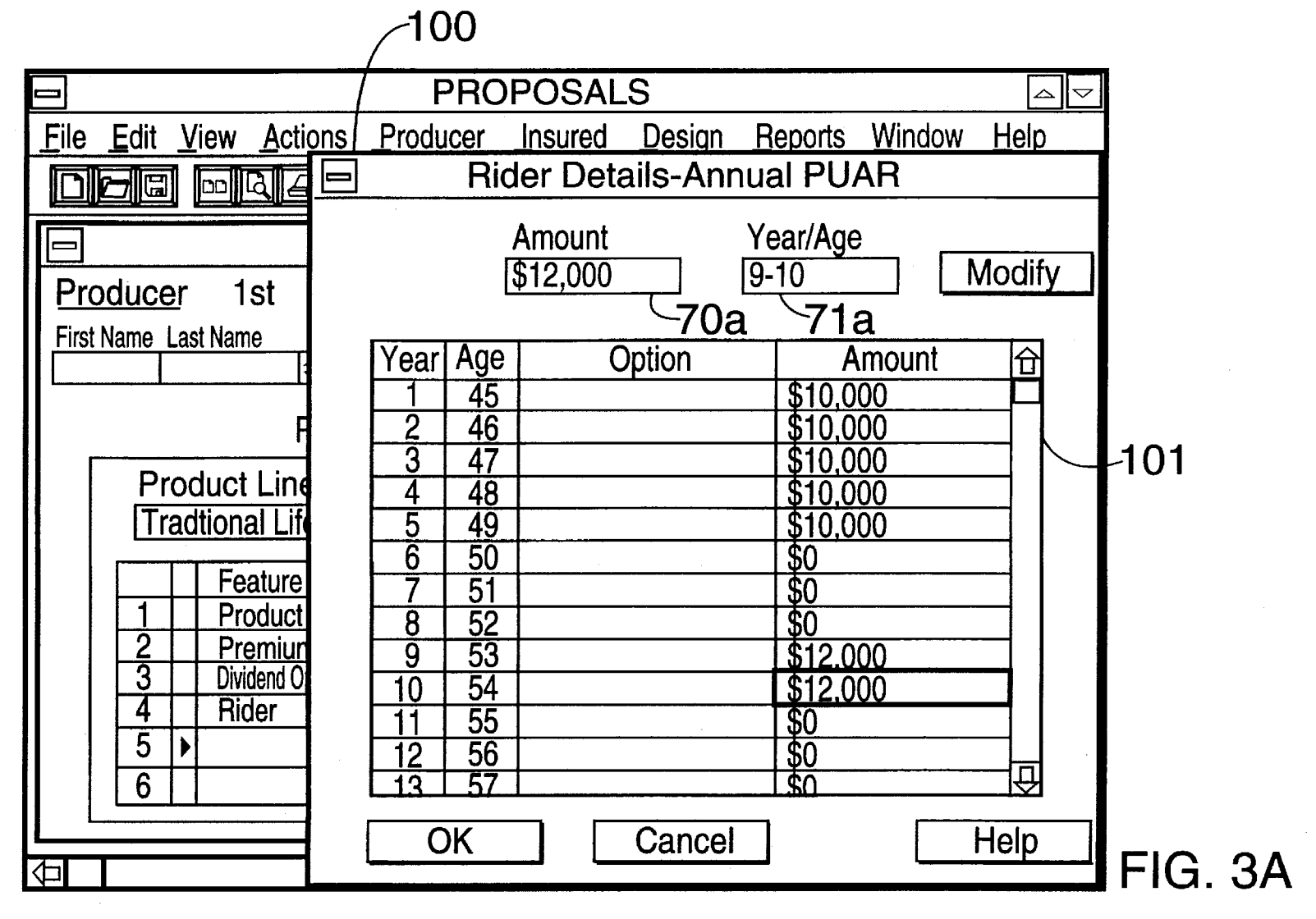

Taking the example in FIGS. 2A–2C, assume that the user decides to enter a more complex stream for the rider than is available on the Design Lattice 48. The user may select the Detailed Dialogue box 100 for the rider feature, causing the Detailed Dialogue box 100a of FIG. 3A to be displayed over the screen display 40. The Grid 101 of FIG. 3A is automatically filled with rider information, should five annual payments of $10,000, as shown in the Design Grid 10. Suppose, the user wishes to add a $12,000 contribution for years 9 and 10. The user will enter $12,000 in the Amount box 70a, and "9–10" in the Age/Year box 71a. Upon pressing a Notify Button, the Grid 101 is updated accordingly, as shown in FIG. 3A.

FIG. 3B shows the Grid 101 if the user selected "Premium . . . " from the Design Lattice 46, and entered "specify" in the Option box 69a, "1000;2000" in the Amount box 70a and "1–5;6" in the Age/Year box 71a. If the user then entered "annual premium" in the Option box 69a, "solve" in the Amount box 70a and "7–10" in the Year/Age box 71a, the result is as shown in FIG. 3C. (The Design Lattice 48 would show "Premium . . . " in the feature column 68, "specify" in the option column 69, "$1,000;2,000" in the amount column 70, and "1–5;6" in the Age/Year column 71.)

FIG. 3D is a continuation of the example of FIG. 3C. Here, the user has selected "Premium . . . " from the Design Lattice 46, and entered "specify" in the Option box 69*a*, "5000" in the Amount box 70*a* and "A55" in the Age/Year box 71*a*. ("A55" means "age 55".)

Figure 4:
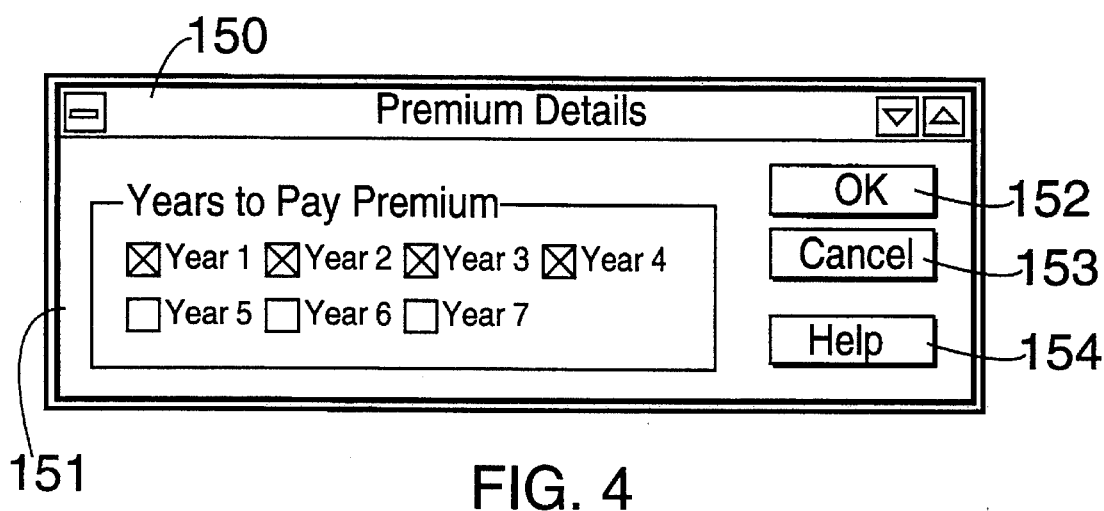
FIG. 4 is a screen display showing a third exemplary detailed dialogue box.

Referring to FIG. 4, there is another representation of an example of Detailed Dialogue box 150. This Detailed Dialogue box 150 is displayed when the user (if allowed) selects "premium . . . " from the feature column 68 of the Design Lattice 46. (It is assumed that the Strategy box 66 is "borrow", the Solve For box 67 is "Pay Interest Only", the Option column 69 is "solve" and the year/age column 71 is "1–4".) The Detailed Dialogue box of FIG. 4 allows the user to select which years the user wishes to pay premiums. (In the representative embodiment, Year 1 must always be selected, as the insured must pay a premium in the first year.)

Figure 5:
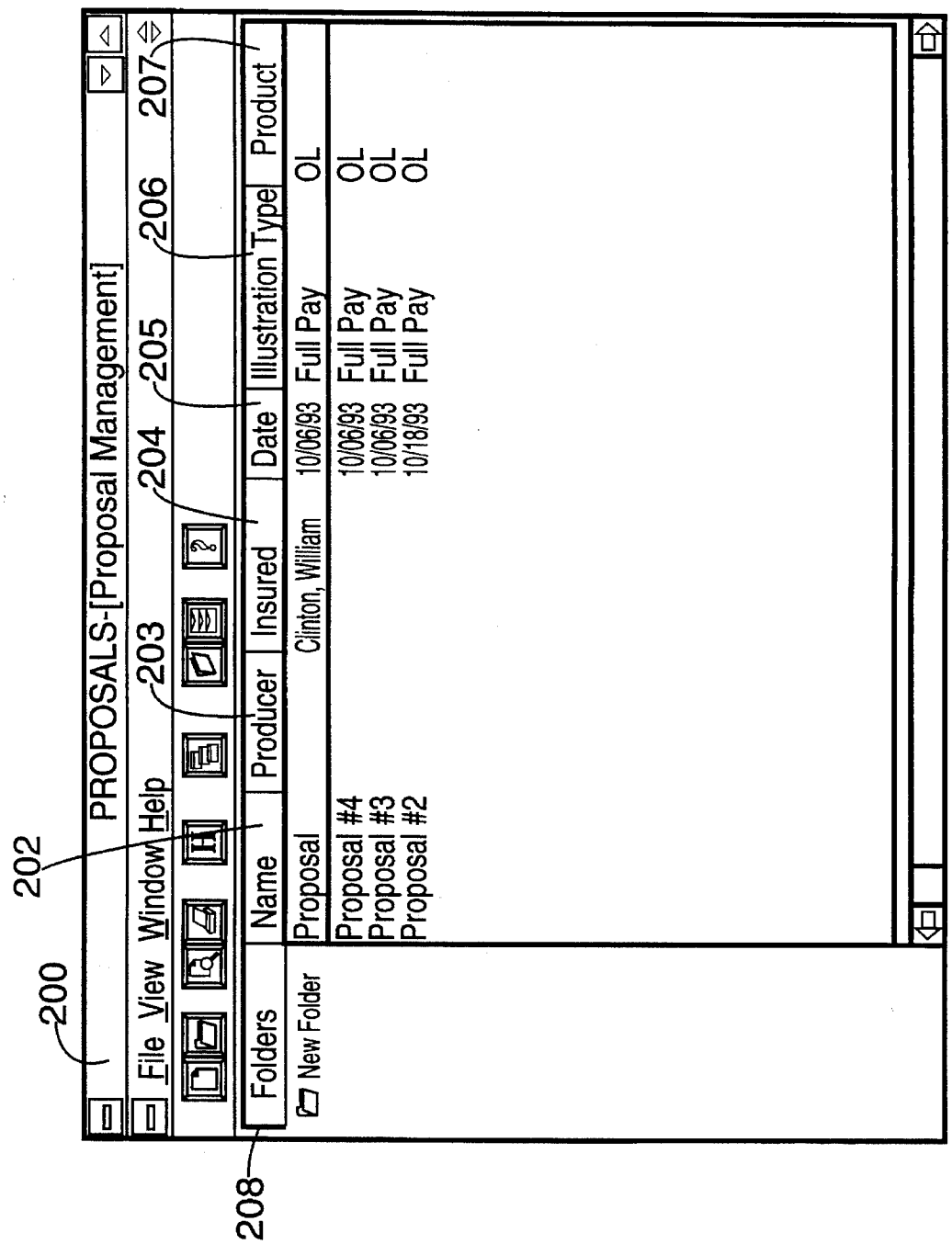
FIG. 5 is a screen display showing an exemplary Proposal Manager Window.

In the representative embodiment of the present invention, each proposal created using the Proposal Window 50 can be stored for later use and reference. Management of stored proposals is via a Proposal Manager Window 200, as shown in FIG. 5. The Proposal Manager Window 200 provides a container for saving proposals. Proposals are "stored" in sub-containers, called Folders 208, which can be given names by the user. In the representative embodiment, the Proposal Manager Window 200 consists of a list of user-named Folders 208 in the left window pane and a table of contents, including a Name 202, a Producer 203, a Insured 204, a Date 305, a Illustration Type 206 and a Product 207, for the selected Folders 208 in the right window pane. In the representative embodiment, only one Proposal Manager Window 200 can exist at a given time in the proposal application due to its function of saving proposal requests. In addition, the Proposal Manager Window 200 can be created when the parent application is started and can be closed when the parent application closes. (The user can move, size, minimize and maximize this window but not close it.) If the user selects the "Close" option under the "File" menu option, the Proposal Request Window 50 is minimized instead. This behavior is consistent with other Microsoft-Windows MDI applications.

The Proposal Window 50 is implemented utilizing the MDI (Multiple Document Interface) standard within the Microsoft Corporation's Windows brand program. As such, the present invention can support the concurrent existence of multiple Proposal Windows 50. Essentially, this requires that the present invention allocate and maintain information relative to a variable number of proposals and to be able to collect information associated with each request any time a particular Proposal Window 50 becomes "active" (that is, the one the user is presently working within).

To maintain the appropriate set of information relative to each proposal, a set of data structures (as discussed below, and set forth in Appendix A attached hereto and expressly incorporated herein) is used as the repository for the information.

Appendix A sets forth, in C and C++ notation, the complex data type descriptions of a proposal of the representative embodiment. The Proposal structure is the "container" object for each of the other complex data types. A linked list of Prop data members is created and maintained as a global application variable allocated at application initialization. As each Prop member of that list is allocated/deallocated, it is added to/deleted from the list. The handle to the linked list node (POSITION) is stored in the window extra bytes of each proposal request MDI child window. Addressability to the specific node for each proposal request MDI child is obtained by dereferencing the handle (AtPos) each time the child window processes a message.

The Prop structure is allocated at the creation of any proposal MDI child. In the representative embodiment, this can occur at several points such as, for example: application initiation if passed a work folder identification, upon a request selection from the Proposal Manager window 200, upon the file/new menu selection from either proposal manager (when focus is on the request side) or from within a proposal, upon instantiation of a request from an inforce download request, and the like. The Prop structure is deallocated upon the closing of an Proposal MDI child window.

All of the other imbedded data members described in Appendix A are allocated and deallocated under the same conditions in which the proposal data object is allocated/deallocated.

A complete linked list of all possible design aspects (see Appendix A) is allocated each time a proposal MDI child window is created (i.e., at the same time a Proposal data structure is allocated). The term "design aspect" applies to the technical manifestation in volatile memory of a DESIGNASPECT d2gridata type. The user interface term when an aspect is displayed in the Design Grid 10 is "Feature"; these two terms refer to identical data objects and may be used interchangeably.

In the representative embodiment, when this list is created, a node is allocated for each possible instance of every design aspect. That is to say, some aspects (e.g., Riders, Withdrawals, Withdrawal Limits) are multi-occurring. A node exists in the list for the maximum number of occurrences a design aspect can have. The number of occurrences for each aspect is held in a global array named "gAspectMaxInstances."

A design aspect has associated with it various behaviors which are "triggered" by certain events. The behaviors which an aspect are able to exhibit are as follows: A design aspect knows how to "load" its persistent values from the Proposal structure (see Appendix A) and exhibit them appropriately in the Design Grid 10. A design aspect can collect user entry values, validate them, format them appropriately, redisplay them on the Design Grid 10, and update the Proposal structure accordingly. When selected by the user from a "Feature" dropdown list box 75, a design aspect can do any initialization work unique to it. When selected by the user from the "Feature" dropdown list box 75 or if there is a change in the product line/strategy/solve boxes (65–67), a design aspect can determine if it has default values and whether or not those default values should be set. A design aspect "knows" if it is to display itself as the result of a change in the product line/strategy/solve boxes (65–67). (This is referred to as an "auto-show" situation".) A design aspect also "knows" how to remove itself from the Design Grid 10 as the result of a user request for deletion, how to reset its values back to the 'default' state and how to update the Proposal structure accordingly. Each of the above behaviors is controlled by pointer-to-function attribute types within the design aspect or cell validation data structures.

Depending on the nature of the design aspect, two pieces of information may be required to establish its identity: the aspect id (lpAspect->id) and its instance id (lpAspect->nInstanceId). Aspect ids are assigned at design aspect list creation time. Aspect instance ids are initialized to the manifest constant IGNORE_VAL. For single occurring aspects this identification is sufficient. For multi-occurring aspects, the instance id is assigned at the time an "Option" value is selected into the Design Grid 10 option cell.

Assigning the id at that time then establishes which "instance" of that aspect type is resident on the design grid row. Option values can therefore be assigned at the time the user selects from the option cell, or at the time an aspect "auto displays" itself as the result of a product line/strategy/ solve combination change.

In the representative embodiment, design aspects are loaded into the Design Grid 10 as the result of any of three events. First, when a persistent work folder is loaded from disk and the Proposal structure for that workfolder has data which causes a design aspect to be displayed in the Design Grid 10. Second, when a user selects a design aspect from the Design Grid 10 "Feature" dropdown list box 75. Third, when a user changes a selection in any of the product line/strategy/solve boxes (65–67) and the design aspect is to "auto display" itself based on that combination.

When the user selects a design aspect from the Design Grid 10 "Feature" dropdown list box 75, a message is sent to the MDI child window procedure for that proposal. This invokes code which first locates the appropriate node in the design aspect "list" for the Proposal window 50 and then dynamically calls the embedded functions (pSetAspectFunc, pStrategyFunc, pAmountFunc, and pYearsFunc) inside of that node. These calls will result in the "grid" object "Feature" for corresponding to that design aspect to be painted and initialized appropriately into the user interface's "grid" object.

When the user changes a selection in any of the product line/strategy/solve boxes (65–67), a message is sent to the MDI child window procedure for that Proposal. This invokes code which does the following processing: The complete list of design aspects is passed, and any aspect which has a valid pointer to a pAutoShowFunc will have that function called. Each design aspect's "auto show" function decides whether, for this particular combination of Product Line/Strategy/Solve values, it should add itself to the "grid" user interface object. If so, appropriate functions specific to each design aspect are called to initialize the grid "feature" appropriately.

Once a Feature is displayed it is responsible for collecting and processing user input relative to itself, validating that input, and redisplaying the results of that validation back to the user. The collection and redisplaying of input is accomplished in the following manner: The Proposal is an MDI child window. As such, there is a child window procedure which is responsible for processing "user events" passed to it by the Windows brand operating system. Among these events can be notification messages from the Design Grid 10 that a data collection activity has occurred (e.g. the Design Grid 10 has been edited). The child window procedure detects that an "edit" event has occurred. Information is passed to the child window procedure with the event notification that allows the child window procedure to derive which grid object "Feature" has been edited. Once this is determined, the address of the correct node in the design aspect "list" can be derived. Each design aspect node has, as members within its structure, the address of functions to call to process user input for each of the columns ("option", "amount", "year/age") within that particular grid object row. This allows features to either share common input processing code or to implement unique processing depending upon the requirements of the design aspect being referenced.

The user deletes a row or item from the Design Grid 10, an event message is passed to the child window procedure for the Proposal window. The processing for this event is quite similar to that described for edit events in that essentially the same processing steps are performed: the child window procedure derives which grid object feature is to be removed, the address of the correct node(s) in the design aspect list are derived, and the child window procedure dereferences the pRemoveFunc function pointer inside the design aspect data type which causes "remove row" processing suitable for that particular design aspect to be invoked. This action does not cause nodes in the link list container to be deleted—rather they are reset to their "initialized state" and made available for reselection by the user.

The Proposal Front End maintains many internal data structures for the purposes of Design Grid 10 population, front-end validation, and Calculation Engine 16 data collection. Appendix A describes the most important of the structures and their primary usage.

The Proposal ("PROP") data structure, set forth in Appendix A, is the primary "container" structure for Calculation Engine 16 input needs. It contains other complex data types pertaining to Calculation Engine 16 input. In addition, it contains higher level data required to keep track of the proper processing of Proposal (e.g. "undo" data).

The "request window" structure, set forth in Appendix A, maintains certain information required to paint and control the behavior of the request window MDI child screen properly.

The design aspect data structure, set forth in Appendix A, is the complex data type used to maintain relevant information pertaining to a specific Design Grid "feature". These attributes maintain the state, and control the behavior, of these features.

The proposal structure, set forth in Appendix A, is the primary data input container for the Calculation Engine 16. Its contents are "scrubbed" by full validation and then passed to the Calculation Engine 16. This structure constitutes most of what is known as a proposal "workfolder" or a "proposal".

A grid rider structure, as shown in Appendix A, is a list of all available riders. It essentially constitutes a list of all available riders regardless of plan. This list is different from the calculation engine's list of riders in that it maintains a node for each rider as it is presented in the Design Grid 10. Each node in the list is then used to maintain appropriate information about the rider (e.g. its name and mnemonics) and information relative to the availability of the rider for the existing plan selected into the request and whether or not the rider is presently used by a design aspect.

Cell validation data members, as defined in Appendix A, maintain information relative to each Design Grid cell for the design aspect to which they are attached. This complex data type indicates such things as: default values, valid values, and functions to call to set defaults and validate data entry.

Calculation Engine

The Calculation Engine 16 of the present invention models the behavior of insurance and other financial service products over their complete life cycle. Such modeling is based on a set of inputs describing a client's potential purchases over a time period. Complicated interactions occur between the various components of these financial service products. The Calculation Engine 16 "models" these interactions.

The Calculation Engine 16 is accessed via API Layer 14 which allows it to be called by multiple applications, i.e., the Report Generator 15 and the Object Viewer 23.

Figure 6A:
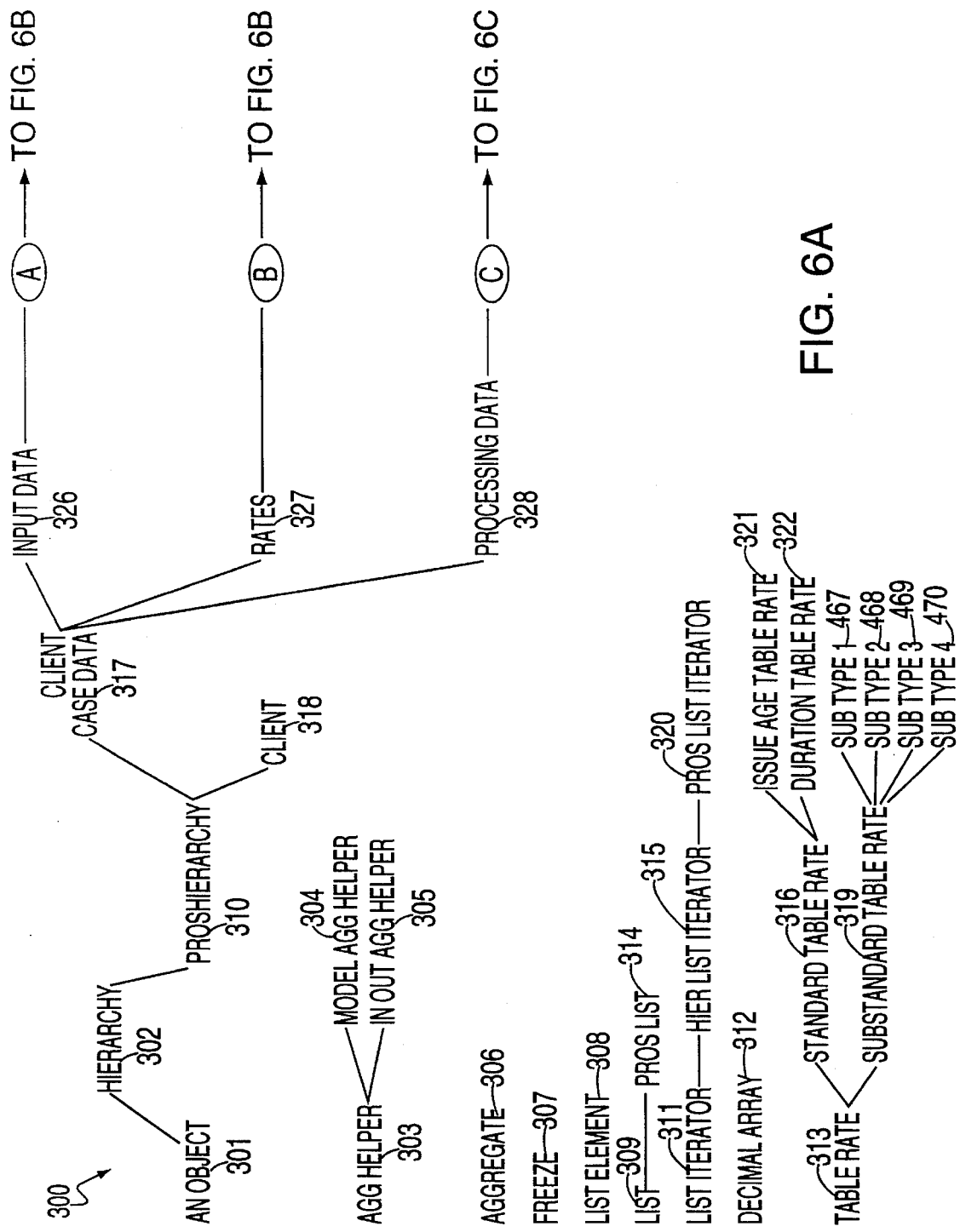
FIGS. 6A, 6B, and 6C together show an exemplary class lattice utilized by the calculation engine of FIG. 1B.
Figure 6B:
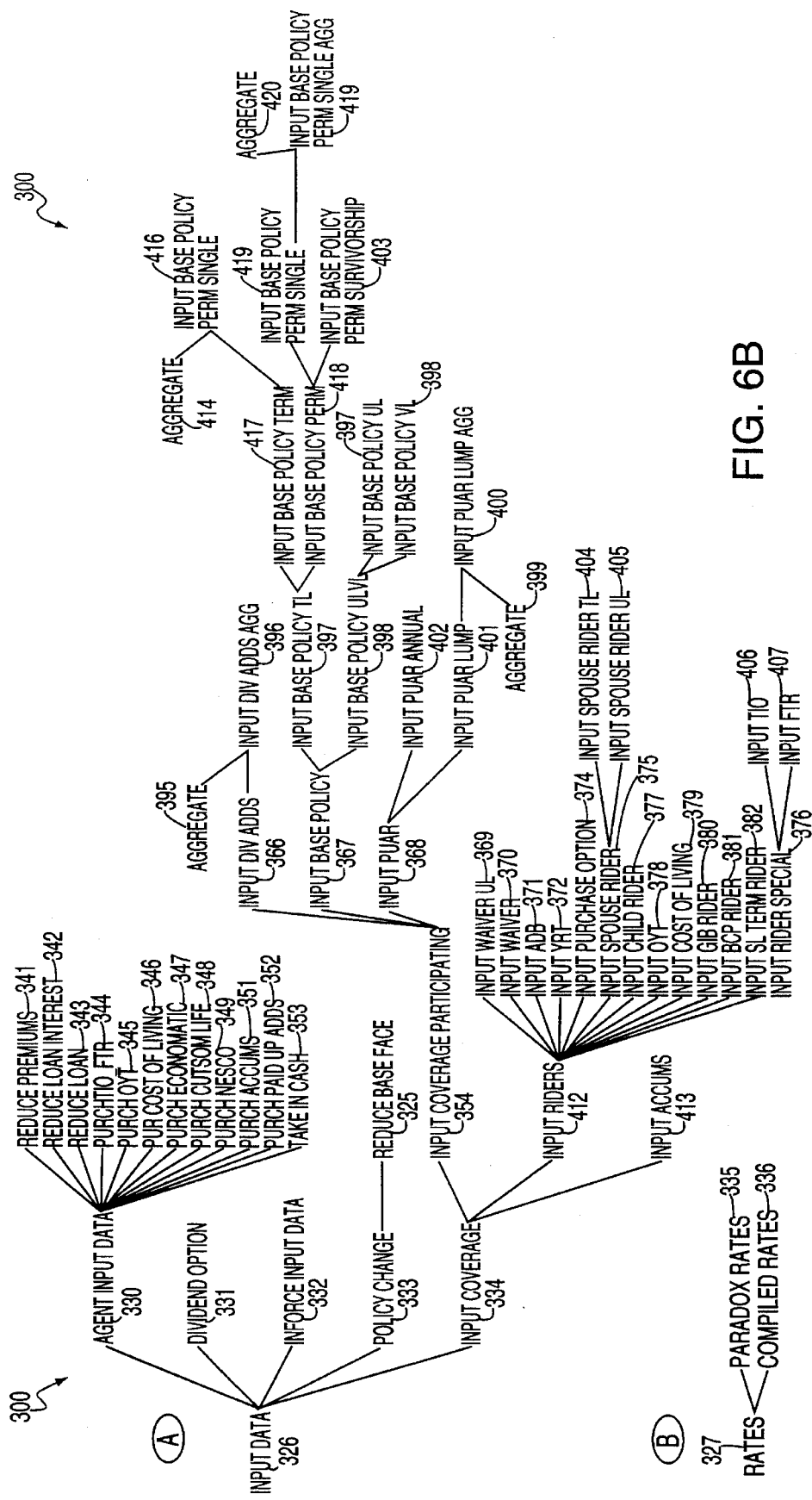
Figure 6C:
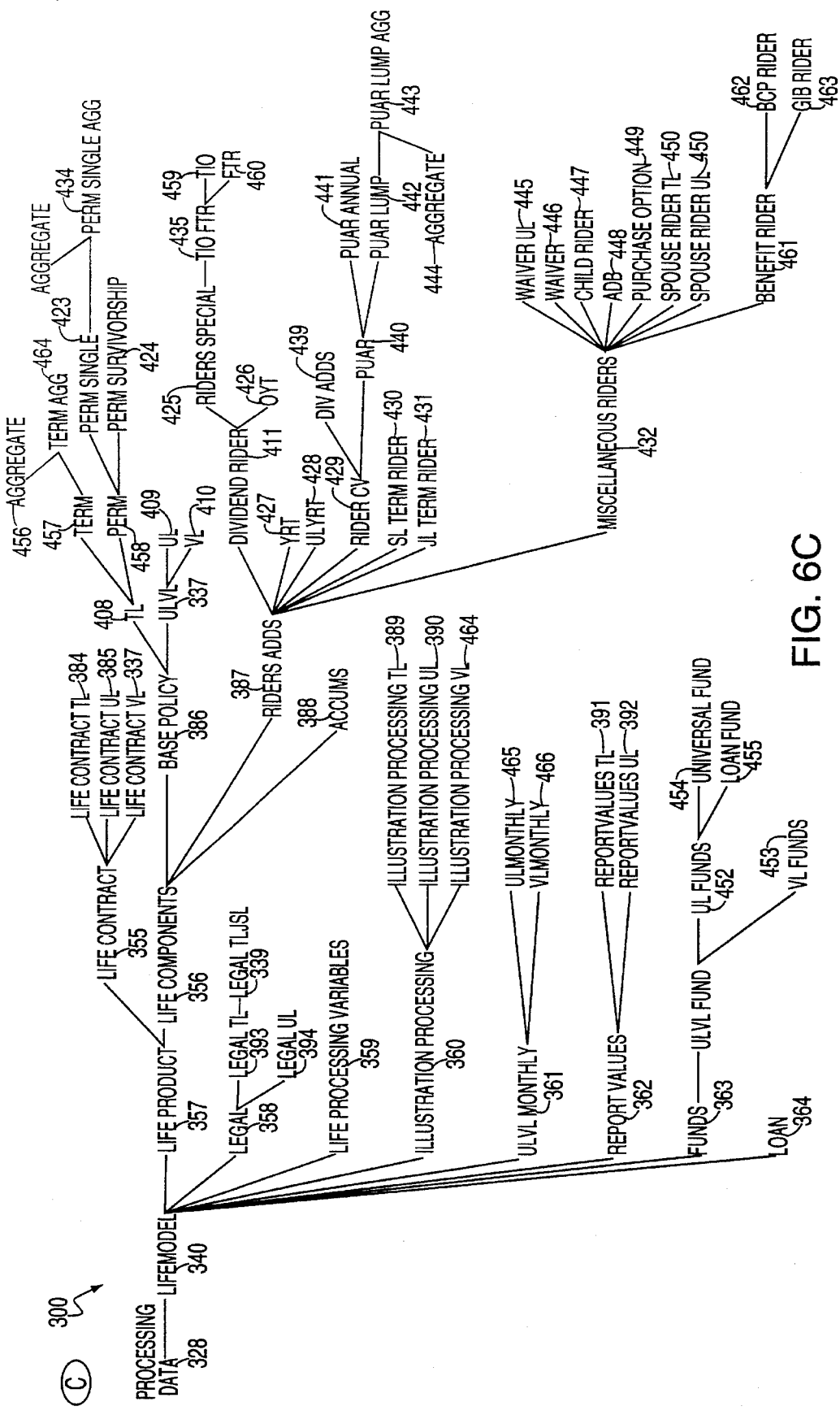

As stated above, the Calculation Engine 16 is implemented using object oriented programming techniques. Accordingly, the Calculation Engine 16 can be regarded as comprising a plurality of objects, or, as called herein, classes. In FIGS. 6A–6C, there is illustrated a graphical depiction of a Class Lattice 300 which shows the hierarchy of classes of the Calculation Engine 16. Each node on the class lattice 300 represents a class. Classes exhibit the behavior of their real-world counterparts in the insurance and financial service domain and the relationships between their counterparts. The class lattice 300 not only supports financial services products, but can also provide utilities to simplify the complex interactions of the products and their component parts.

The class lattice 300 can be structured by the relationship between its classes and can be described by the terms sub-class, super-class and leaf class. The super-classes (sometimes called abstract or generic classes) are generalizations of their sub-classes and appear to the left of their sub-classes in the class lattice 300. Examples of the super-classes with respect to their sub-classes, in the representative embodiment, are: a DividendOption class 331 is a super-class to its sub-class, a ReducePremiums class 341; a LifeContract class 355 is a super-class to its sub-class, a LifeContractsTL class 384.

The term leaf class refers to classes to the far right of the class lattice 300. These classes have the most specific behavior. Leaf classes have no sub-classes and are the objects that actually get created (instantiated) in the model. Examples of leaf classes, in the representative embodiment, are: a InputBasePolicyTermAgg class 416, a InputBasePolicyPermSurvivorship class 403, a Waiver class 446, and a GIBRider class 463. The leaf classes represent real-world objects whose behavior is modeled. However, most of the code implementing the leaf classes actually exists in the more generic classes, further up (i.e., to the left in FIGS. 6A–6C) the class lattice 300.

A feature of the class lattice 300 is the inheritance network that it provides. That is, general behavior defined at the super-class level can be inherited down (i.e., to the right in FIGS. 6A–6C) the Class Lattice 300. In the representative embodiment, a leaf class will inherit all the behavior defined in its super-class, unless specifically overridden. This allows for the reuse by sub-classes of common behavior of super-classes.

An instance of a class is similar in concept to a populated record of a particular record definition. It is an actual occurrence. (Thus, as a general example, a class could be a traditional life policy product, and an instance could be Mrs. Smith's traditional life policy.) Instances of classes may or may not be present for a particular client case. In addition, there may be multiple instances of some of the classes, while others may only allow one instance per record of data within the class (called domain restriction).

The class lattice 300, in the representative embodiment, has three basic types of classes: model classes, input data classes and solve classes. Model classes perform the basic product calculations. Input data classes interface with the external data. Solve classes perform solve processing.

In the representative embodiment, model classes are those classes below ProcessingData class 328 in FIG. 6C. For the most part, these classes are composed of time-series type attributes, which allow modeling their behavior for every year in the illustration. These can be either data members declared as arrays, or functions that take year as a parameter. There are three types of model classes in the representative embodiment: coverage classes, contract classes and other miscellaneous processing classes.

The contract class includes subclasses, such as, for example, a LifeContract class 355, an AnnuityContract class, an InvestmentContract class, and a DisabilityContract class (not shown). For simplicity of discussion, only the LifeContract class 355 is discussed herein, i.e., the contract class of the representative embodiment is in effect the LifeContract class 355. The principles discussed relating to the LifeContract class 355 also apply to other contract sub-classes.

Components of a contract are called coverages. Coverage classes are defined under LifeComponents class 356 and represent the coverages in the financial model. These include TL class 408, UL class 409, VL class 410, and PuarAnnual class 441 etc. These classes (also called objects) can mimic the real-life behavior of the corresponding coverage in the contract. Each such class has the ability to provide information for a series of time. That is, a cash value of TL class 408 is computable for any year of a policy. (As is known in the insurance industry, coverage is usually purchased through one or two mechanisms. Either a face amount or contribution can be specified. For example, in the representative embodiment, a base policy under BasePolicy class 386 is purchased by specifying a face amount, where additional dividends under DivAdds class 439 and Puar under a PUAR class 440 are purchased by making a contribution.)

The LifeContract class 355 can serve as an accumulator of the individual coverage for a client. Other behavior such as loan modeling and outlay calculations are performed at the contract level in the representative embodiment.

Other classes belonging to the model classes also exist, as shown in FIG. 6C. For example, in the representative embodiment, a LifeProcessingVariables class 359 houses some of the key variables used during processing. Input data classes are shown in FIG. 6B below InputData class 326. Input data classes are the receivers of the data input via API Layer 14. They are also be responsible for retrieving the data stored in the relational database 21. In the representative embodiment, importing of data into the classes is done by the classes themselves. In addition, in the representative embodiment, only classes defined under a InputData class 326 can receive or read external data.

For example, AgentInputData class 330 can contain information about the scenario to model. Examples are outlay information (monies to be paid into the contract) and face amounts. Client class 318 can contain data about the client. Classes defined under InputCoverage class 334 can reflect the input data for the various coverages, including rates, product information and purchase criteria.

In the representative embodiment, each of the InputCoverage classes 334 have a corresponding instance under the LifeComponents class 356. For example, InputBasePolicy class 367 has a corresponding TL class 408 instance. Similarly, InputPuarAnnual class 402 has a corresponding PuarAnnual class 441 instance. By isolating the input data from the processing model, external data stores can be changed more easily.

With respect to the third type of class in the class lattice 300, solve classes perform the processing for meeting a specific target. For example, in the representative embodiment, VanishSolve class 815 finds the earliest year that the policy becomes self-funding and premiums no longer need to be paid. Solves are executed by the solve engine 18. Solves iteratively invoke the Calculation Engine 16, query results and restart accordingly. Solves classes are discussed in more detail below with reference to FIG. 13.

The class lattice 300 also depicts classes whose behavior provides easy access to complex rate files and other reference data stores which support the financial basis of the products. These classes, which do not inherit behavior from the model classes, appear on the bottom left hand side of FIG. 6A and are referred to as helper classes. For example, Freeze class 307, ListElement class 308, and ListIterator class 311 are helper classes.

The behavior of each class in the class lattice 300 can be defined in a class specification which contains three elements: actions, functions and variables. In the representative embodiment, classes are coded in the C++ programming language. The following discussion uses terms known by programmers familiar with C++, and it is assumed that the reader also is knowledgeable as to the C++ programming language.

Actions, in the representative embodiment, are coded as member functions, but they differ in concept in that they alter the intrinsic data (or state) of the instance. For example, BuyFace() is the action which models the purchase of an insurance coverage. Likewise, Surrender() removes cash value from the instance. Once these actions have been executed, the values (magnitude) of the target instance are intrinsically different. (These functions are discussed in more detail below.)

In the representative embodiment, functions are C++ member functions that return a value. They do not alter the underlying magnitude value of the instance. These are backward-chaining functions because they produce a value on demand and invoke other functions, if necessary. For example, a request for the death benefit of a traditional (TL) whole life insurance policy in year five would result in a DeathBenefit() function being invoked on the TL instance. This, in turn, would need to call a Units() function and a DBValuePerUnit() function. Function calls would continue in a backward fashion until all the necessary computations are retrieved.

Finally, variables are data members in C++. The object oriented term, encapsulation, specifies that the internal data of an object instance is not accessible externally. The design of the Calculation Engine 16 follows the principal of encapsulation. Data can be classified as private, protected or public. Private data can be accessed only by objects instantiated from this class. Protected is similar to private, but also allows access down the inheritance network. Public data can be accessed by any object. In the Calculation Engine 16, according to the representative embodiment, the majority of data is classified as protected.

The Calculation Engine 16 further comprises an object manager to facilitate object creation, deletion, and access. A method of run-time type identification is used to facilitate object management and iteration. For example, it is possible to iterate on any node of the class lattice 300. In addition, it is possible to query if a particular object is derived from a particular abstract class via a function call. This feature, although very powerful, is used sparingly in the representative embodiment as it requires traversal of a long list of objects.

The Calculation Engine 16 can also support multiple models. This allows multiple Calculation Engine 16 runs to be performed for one set of input data. For example, it is common when running an insurance illustration to want to see values based on a number of dividend scale scenarios. If the input data is run on multiple models, the object manager would now have multiple instances of each class in memory that would be managed based on the model that the class belongs to.

The object manager can facilitate the interaction between objects and API Layer 12 of the Design Grid 10 (or other such consumer application drivers), as well as the interaction between objects. API Layers 12 and 14, consumer application drivers and many of the objects need to be able to access other objects.

Therefore, in the representative embodiment, a means for obtaining the address of objects/classes resident in the memory 9 is provided. This is accomplished as follows in the representative embodiment: Each class is assigned an integer value called a manifest constant. This is done by defining an integer variable which will represent the class. A unique integer must be used. The convention for the variable name is the class name in all capital letters. For example, TL class 408 is assigned the manifest constant TL=310. On the new class, the following member functions are defined: isA()—returns the manifest constant defined above; nameOf()—returns a string identical to the class name. In this example, isA() returns TL, nameOf() returns "TL". The TL object is added to the list of objects via a function call which passes TL as a parameter.

As stated above, a user can create and design a particular product (or "contract") for an insured (or "client"). This contract may include a number of components or riders. For example, a life contract may have a traditional life component, a Puar annual component and a dividend additions component. The present invention stores information about particular contracts for particular clients using what is termed a container. Whenever information about a contract is required, navigation through the components of the contract, as represented by instances of classes in the class lattice 300, is required. The present invention provides a container/iterator mechanism and data structure, as shown in FIG. 10, to perform this function.

A client instance 652 (of client class 318) is created for each client. A ProList Container 651 (an instance of ProList class 314) is also created for each client. The responsibility of the ProList Container 651 is to manage all of the instances created for its particular client, and facilitate navigation among these instances.

For every other instance of ClientCaseData class 317 that is created, a corresponding instance of the ListElement class 308 is created. List Element instances 657–660 are connected together in a linked list. Each ListElement instance 657–660 points to its corresponding instance of ClientCaseData class, i.e., 653–656.

Figure 10:
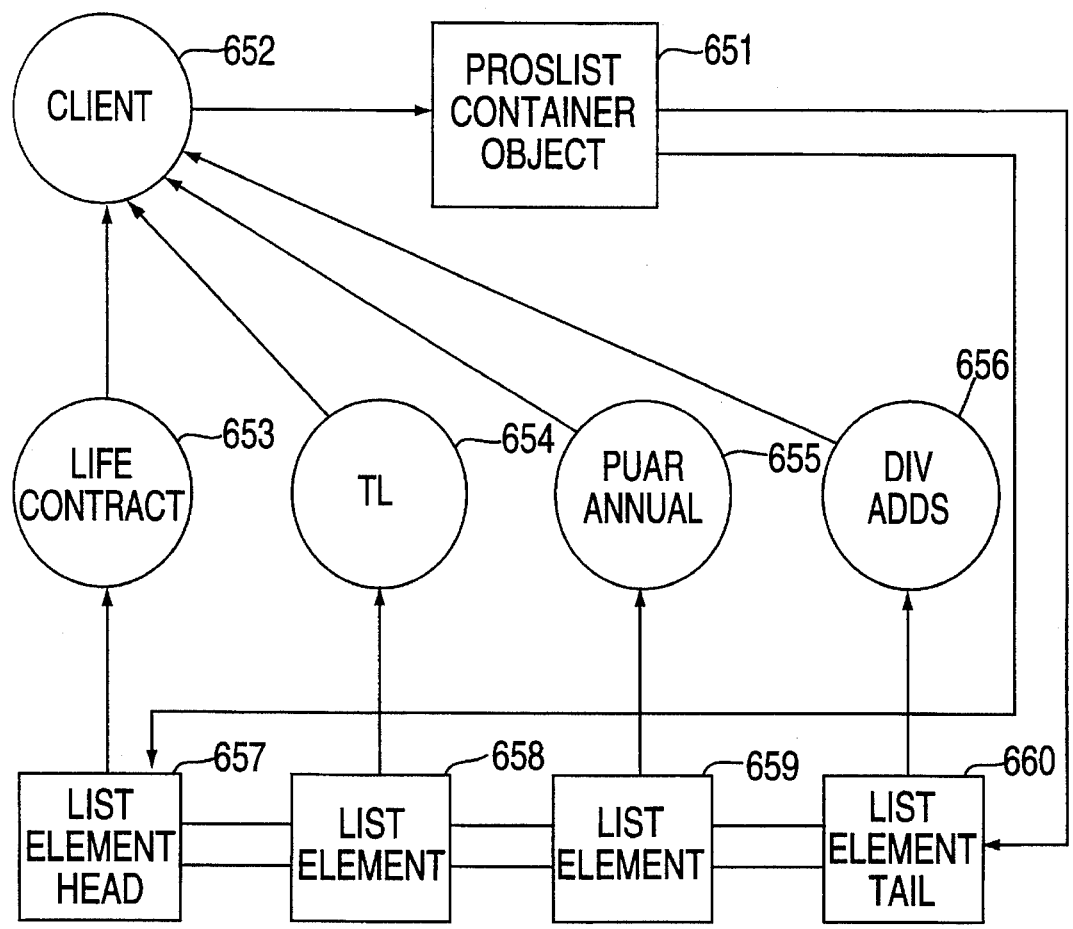
FIG. 10 is a block diagram illustrating the structure of object container/iterators utilized by the calculation engine of FIG. 1B.

In the example in FIG. 10, the ProsList Container 651 is managing a list of elements that includes a Life Contract instance 657, a Traditional Life instance 658, a Puar Annual instance 659 and a Dividend Additions instance 660. The ProsList Container 651 keeps track of the List Element Head 657 (beginning) and List Element Tail 660 (end) and the number of nodes in the list. The client instance 652 has a pointer to the ProsList Container 651.

Iterators are used to traverse the list of elements by their business name. In the representative embodiment, each instance created contains information about its inheritance hierarchy. An instance 'knows' what type of class it is an instance of, as well as all of its ancestors back up the hierarchy of the class lattice 300.

For example the TL instance in FIG. 10 knows that it is a TL instance. The TL instance also knows that it is a kind of the BasePolicy class 386, which is a kind of the LifeComponents class 356, etc. This information can facilitate processing because it enables filtering of instances. The LifeContract class 355 accumulates various attributes of all of the LifeComponents class 356. The iterators can step through the instance list and perform some operation only on those instances of the LifeComponents class 356.

For example, the total cash value of a life contract is the sum of the components that contribute to cash value. The container/iterator mechanism allows the contract to accumulate the cash value of its components at an abstract level. The contract, which is in fact an object, does not need to have knowledge of how many components it has or whether these components contribute to the contract cash value or not. Therefore, if a new kind of insurance component is introduced that contributes to cash value, the contract object would require no changes in order to include it.

The Container/Iterator can be implemented as an object and packaged into a class library for use by other applications. The underlying complexity of managing the list via pointers is completely shielded from the user of these infrastructure objects.

The iterator mechanism, included within the Container/Iterator Object, provides a method of navigation among the instances that is informal in that the address of any object can be obtained by using the Container/Iterator Object. In some cases, formal or buried pointers are used to establish a direct one-to-one link between two instances. This method is fast, since no processing is required to find the address of related instances.

Figure 7:
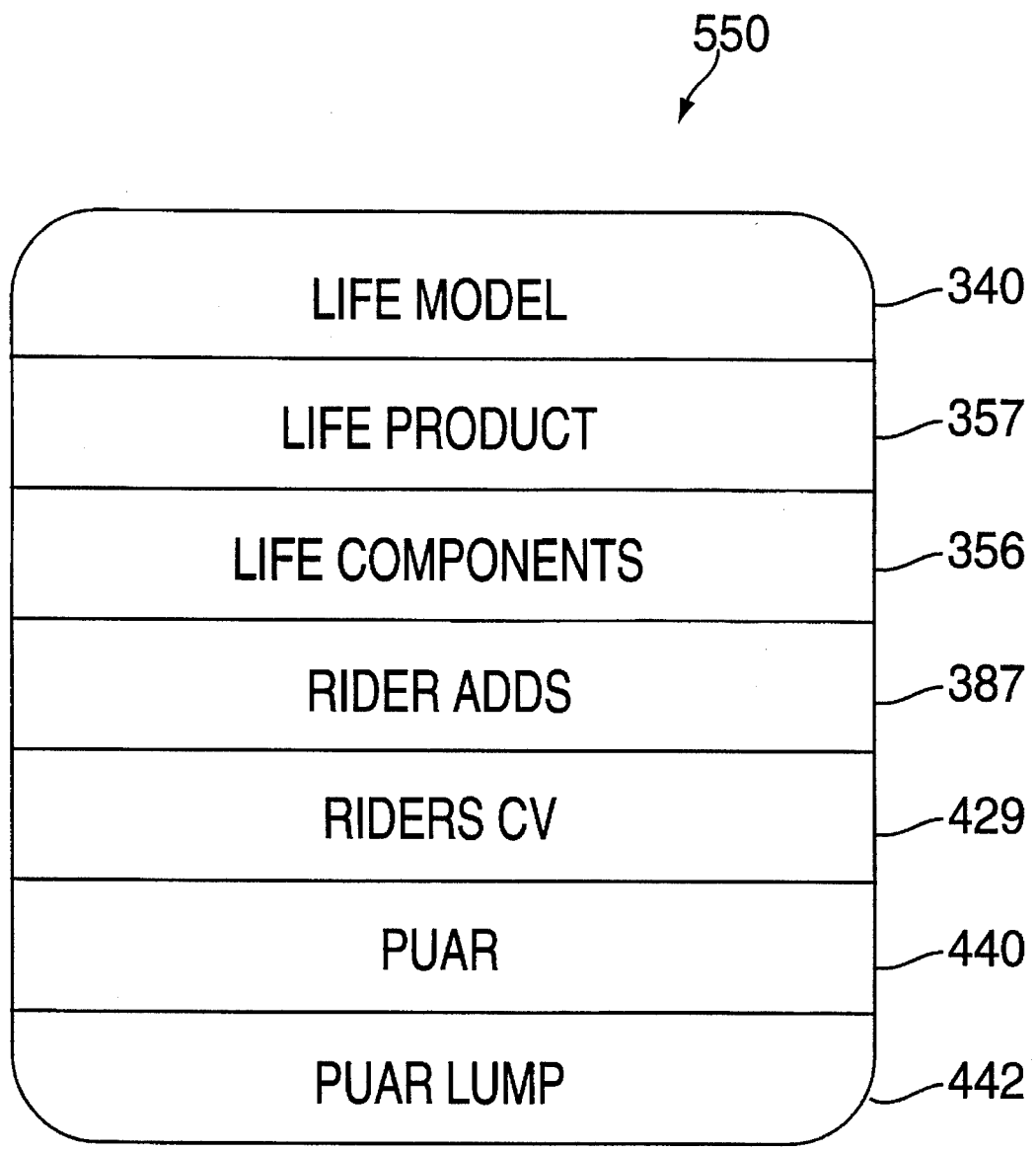
FIG. 7 is a digram of an exemplary instantiated leaf node object.
Figure 8:
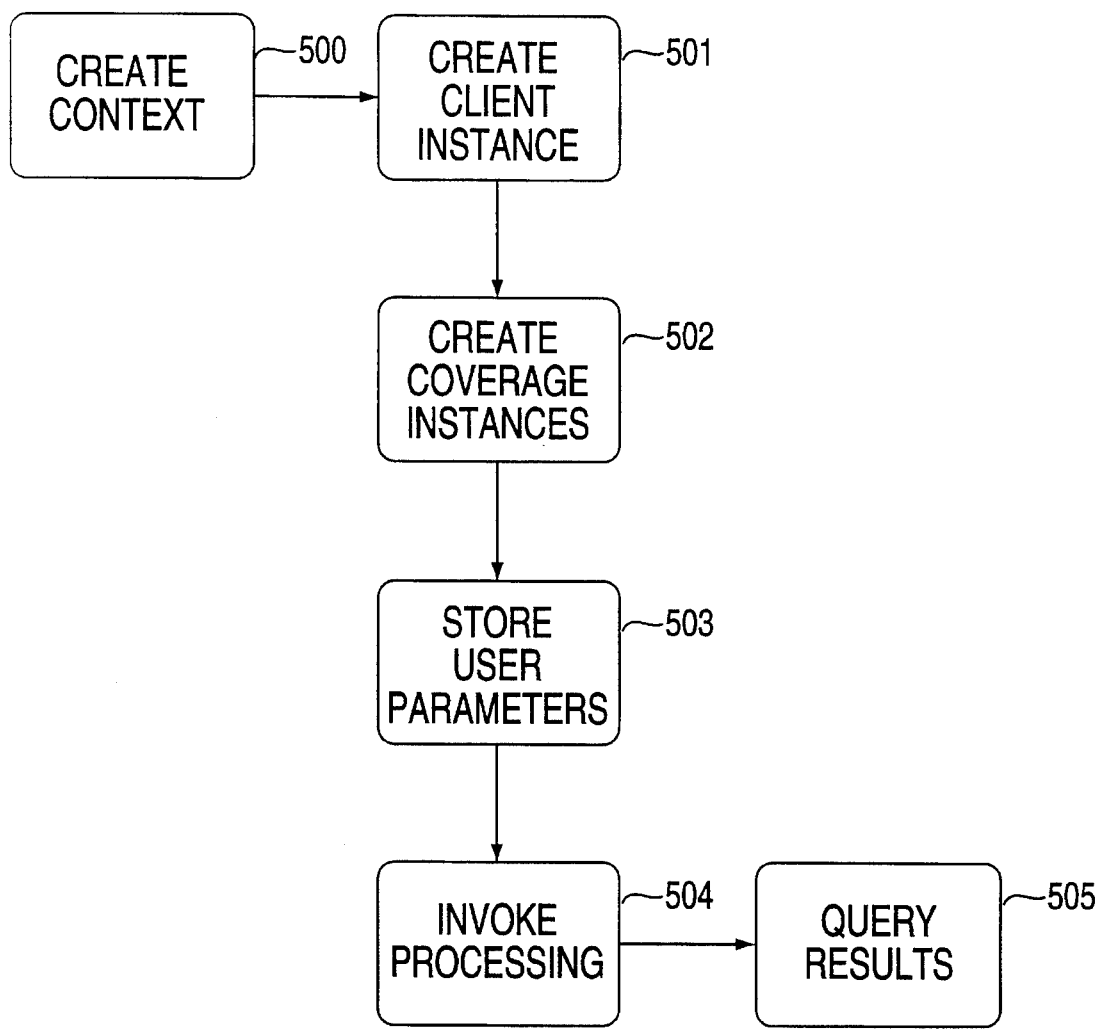

As would be appreciated from FIGS. 6A–6C, the class hierarchy provides substantial reusability thought the sharing of common functions and data. Each object includes its own processing capabilities, and also processing capabilities that are inherited from other classes in the hierarchy. FIG. 7 illustrates the objects that comprise a leaf node of FIGS. 6A–6C, for example, in FIG. 7, the Puar Lump instance of the PuarLump class 442 of FIG. 6C.

In the representative embodiment, a deep class hierarchy is implemented. Each object inherits attributes from higher objects in the hierarchy, and when a new object is added to the class hierarchy, most of its behavior can be inherited from the more abstract classes.

For example, in the representative embodiment, a Puar-Lump instance 550 (within the PuarLump Class 442) is actually comprised of the attributes of seven classes (see FIGS. 6C and 7). The PuarLump instance 550 assumes most of its behavior from the LifeComponents class 356. In object terminology, the PuarLump instance 550 is described as a kind of the Puar class 440 which is a kind of the RidersCV class 429, which is a kind of the RidersAdds class 387 etc.

The present invention also takes advantage of another principle of the object oriented paradigm called polymorphism. This allows different objects to respond to the same message. Utilization of polymorphism allows the main application to remain generic. For example, each component of a contract knows how to compute its premium, but another component of the same contract may calculate its premium differently than others (for example, it may include a policy fee). When a generic request for premium is made, an individual component that calculates premiums differently can override the more general behavior of the abstract class.

Reuse in the system is facilitated by utilization of these techniques and the fact that interaction with the Calculation Engine 16 is through business terminology. This enables other applications to more readily interface with the Calculation Engine 16, if required.

It is noted that the class lattice 300 of the representative embodiment is designed based upon the real-world products offered by an insurance company. The objects in the class lattice 300 include the processing capabilities to calculate and compute all information that may be required for all products that are offered. Thus, the class lattice 300 can be considered to be a model of all the products that are available. Because new products are often based upon existing products, new objects can easily be added to the class lattice 300, and these new objects can utilize the processing capabilities of existing objects.

The Class Lattice 300, as shown in FIGS. 6A–6C, illustrates the structure of the generic pieces of insurance products. The design of the Class Lattice 300 takes into account the fact that many investment and insurance products have overlapping and similar components. Accordingly, the Class Lattice 300 has been designed so that most of the computer code is not at the leaf level.

Figure 8:
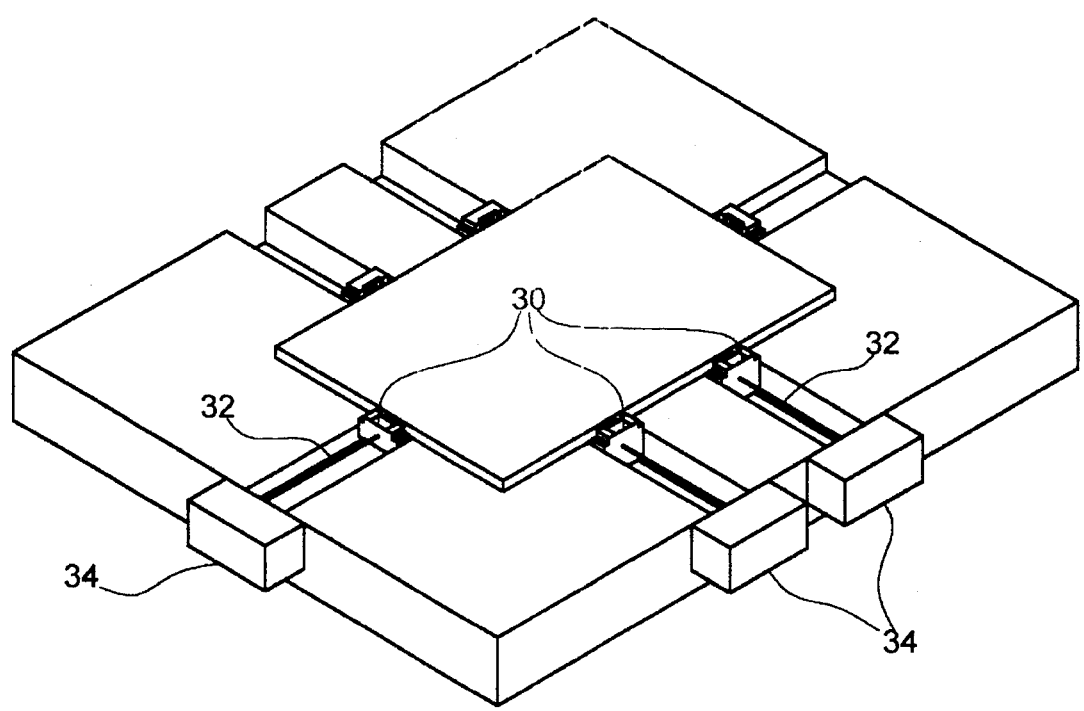
FIG. 8 is a flow chart illustrating the processing flow of the calculation engine of FIG. 1B.

Since the majority of the insurance calculations are contained within the object oriented structure, the main processing logic is fairly concise. FIG. 8 depicts in flow chart form processing logic used by the Calculation Engine 16. First, a new client case is created (step 500). (317; see also 801 of FIG. 13, discussed below). Next, information about the client is stored as a client instance (step 501). This is an instance of client class 318 of FIG. 6A, and is represented in FIG. 10 at reference numeral 652.

New coverage instances, corresponding to coverage selected at the Design Grid 10, are created (step 502). (See e.g. 334 of FIG. 6B and 657–660 of FIG. 10). Product data and rates are retrieved via the Rates/Rules Interface 20, for input to the instances. A corresponding instance of a Life-Model 340 is created. Where required, additional instances of the LifeModel class 340 are created.

The user parameters are stored (step 503). New client case information is stored into an AgentInputData instance. (See 330 of FIG. 6B).

Usually processing is required (step 504). Either solve processing or an annual processing function is invoked. In both cases, control is passed to the required solve objects (325 and FIG. 13). If there are Solves, control will be passed to the first solve instance, which will in turn pass control to an Annual processing function. Both functions will eventually call the Execute() function on IllustrationProcessing 360.

In more detail, in the representative embodiment, the Calculation Engine 16 is controlled by a function called RunManager. When control is passed to the Calculation Engine 16, the RunManager function determines if there are any Solves to be processed; if so, control is passed to the Solve Engine 18. The Solve Engine 18 will perform the required Solves for some or all of the illustration years. If needed, the Solve Engine 18 will "run out" the illustration to the end of the illustration, by calling the annual processing function. When the Solves are done, control is returned to the Calculation Engine 16. If there are no Solves, the Calculation Engine runs the illustration annual processing function, from the start year to the end year.

Once the Calculation Engine 16 has run, the results of the processing are available for querying, for example, by the Object Viewer 23, the Report Generator 15, or the Design Grid 10 (step 505).

Figure 9:
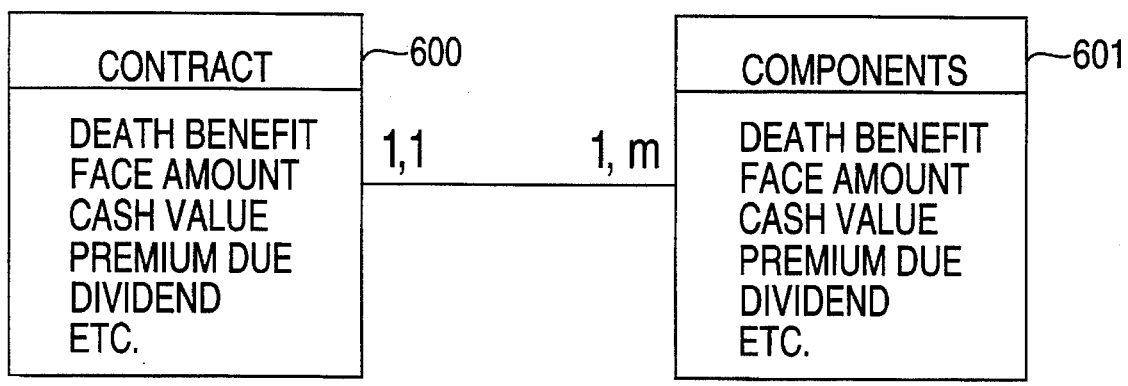
FIG. 9 is a block diagram illustrating the relationship between a contract object and a component object.

The super-classes on which most of the business processing in the Calculation Engine 16 is based are LifeContract class 355 and the LifeComponents class 356. Referring to FIG. 9, there is an illustration, in block diagram form, herein called an object model, of the relationship between a LifeContract object 600 (i.e., of LifeContract class 355) and a LifeComponents object 601 (i.e., of LifeComponents class 356). In the representative embodiment, the LifeContract object 600 can have "one to many" (i.e., , "1, m") LifeComponents objects 601, but each LifeComponents object 601 can belong to only one of LifeContract object 600. It is noted that some attributes of each object 600, 601 are the same. This is because, for example in relation to the death benefit component, the LifeContract object 600, has a death benefit which represents the total for the policy, and the LifeComponent 601 can also have its own death benefit which contributes to the LifeContract object 600 total. However, FIG. 9 shows only a subset of the features for the LifeContract class 355 and the LifeComponents class 356. There can also be features that are different. In a many cases, each have many different attributes.

In the insurance and financial services products world, an insurance contract is generally comprised of a base policy and a selection of riders. Many of these riders can contribute to the overall values of the contract. The Class Lattice 300 in FIGS. 6A–6C shows that most of the classes can be derived from the LifeContract class 355 and the LifeComponents class 356. In the representative embodiment, 70–80% of the code in the insurance model is inherited from the LifeContract class 355 and the LifeComponents class 356. In the object paradigm, a relationship between objects in which one is comprised of the other is called an aggregation.

These classes are supported by other classes that model the behavior of things such as loans (Loan class 364), tax monitoring and reporting (Legal class 358) and the investment funds which support variable life and universal life products (Funds class 363).

The Calculation Engine 16 can be thought of as a network of objects that all have certain knowledge and can perform certain functions. The objects must collaborate in order for business functions to be carried out. Objects communicate with each other by sending messages back and forth, requesting that certain functions be performed.

In the Calculation Engine 16, knowledge of the sequential processing that must be accomplished is itself a class of objects. In traditional insurance and financial illustrations, processing revolves around yearly administration called anniversary processing. This processing credits dividends earned, applies premiums, executes any policy changes, etc. Anniversary processing differs by product line. For example, UL and VL products require monthly valuation, but other processing is common to all product lines.

The IllustrationProcessing class 389 is the abstract class that contains data and functions that apply to all product lines. An IllustrationProcessingTL class 289, an IllustrationProcessingUL class 390 and an IllustrationProcessingVL class 464 are all leaf level classes that handle specific product line differences.

For example, if the LifeContractTL object 384 is asked for the balance of an outstanding loan, it will in turn send a message to the Loan object 364 asking it for its current balance. If the LifeContract object 355/600 is asked for its total death benefit, it will ask each of its components for their death benefit and return the total.

Object Viewer

The Object Viewer 23 allows testing and product development users to directly "peer into" the objects (classes) and observe the object attributes over calculation durations. The user can view objects (i.e., each class in the Class Lattice 300) and their operations on one or more Object Viewer Screens 900 (see FIGS. 15–18). All classes in the Class Lattice 300 can be viewed as objects using the Object Viewer 23. An Object Viewer Screen 900 can show, in a very simple and straightforward way, the complex interactions of financial products over their entire life cycle.

The majority of Object Viewer 23 functionality resides inside the Calculation Engine 16. However, the interface to the Object Viewer Screen 900 can be, e.g., in the representative embodiment, a standard Windows C-SDK interface. The Object Viewer 23 can be initiated from the Design Grid 10 by selecting a file menu option.

The Object Viewer 23 provides access into a significant number of detailed calculations relative to insurance and investment information at a fine level of detail. (Previous insurance calculation software programs do not provide access or viewing of calculations at such fine detail.) This facility, in conjunction with the basic object metaphor, is especially useful to system testing and product design specialists. The functionality of the present invention which calculates the values makes this level of detail available for display by the Object Viewer 23.

In the representative embodiment, when the Object Viewer 23 is selected for an object, the selected object is displayed in a window. The selected object can be displayed along with other "popular" objects on the Object Viewer Screen 900, as shown in FIG. 15. The screen display of FIG. 15 shows, inter alia, the LifeContractTL object 384. At quick glance, one can easily see in this example that the contract is for $100,000 of death benefit at an annual premium of $2,120. In addition, the title bar 901 shows the year of the object being viewed, i.e., Year 1. By selecting the "Next Year" command 903 on the file menu option, the user can traverse the LifeContractTL object durations until maturity and see all appropriate values.

Figure 16:
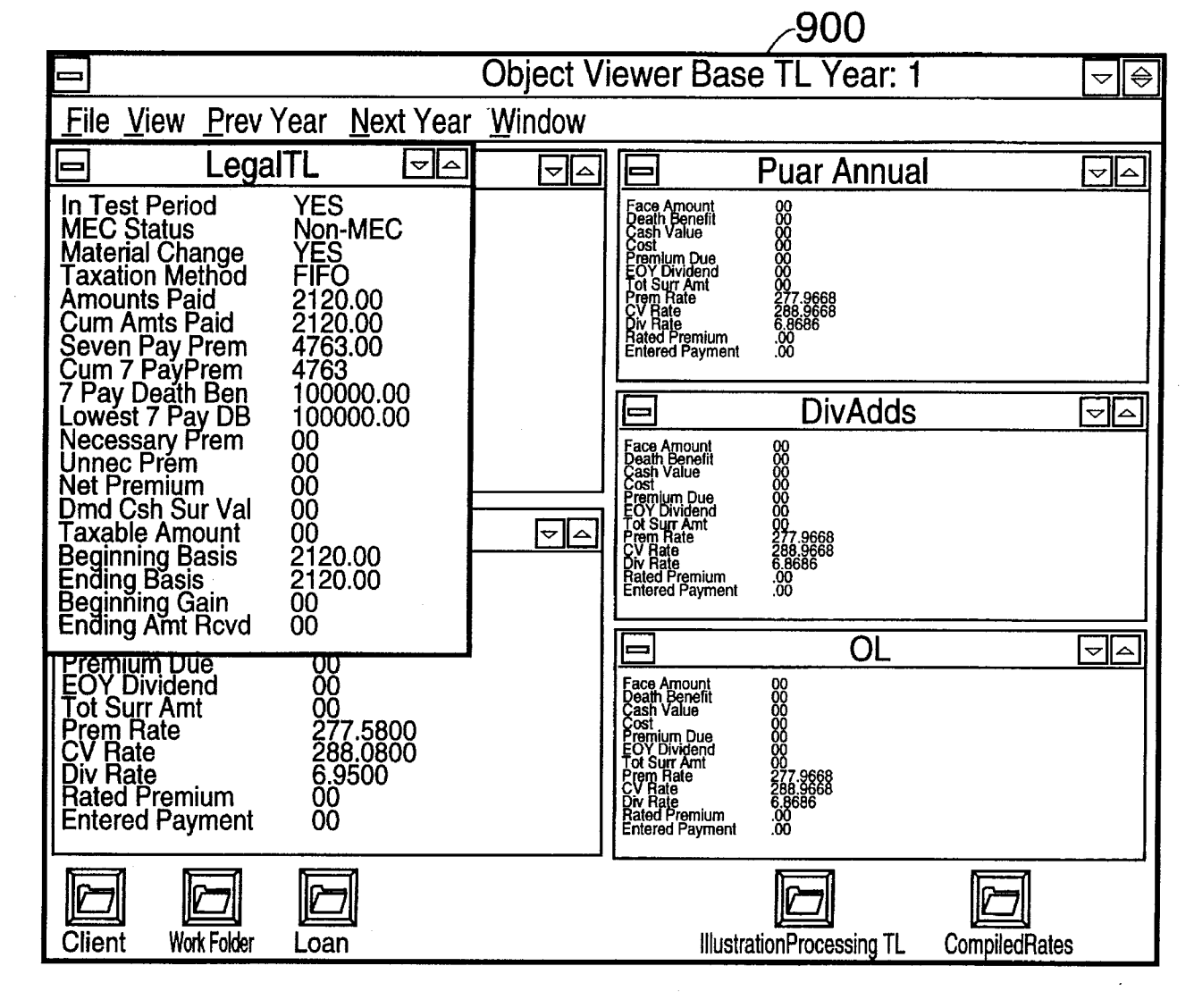

Edit controls employed in the Microsoft Windows application can be utilized in the present invention to manipulate individual and/or several windows of the Object Viewer Screen 900. The implementation of such edit controls is well known to those skilled in the art. For example, objects that are initialized in a minimized state can be brought into a window by double clicking on the icon. FIG. 16 shows the result of double clicking on the Legal object icon, showing in FIG. 15 at the bottom of the window. In the representative embodiment, the Legal object monitors the contracts compliance with TAMRA legislation. As shown, important tax related information is quickly available through this object and its current status as shown. In this example, the contract status is Non-MEC (Modified Endowment Contract), which means that it is compliance with the TAMRA legislation and will continue to be taxed on a favorable basis.

Since the Object Viewer Screen 900 can become cluttered when many objects are maximized, the individual window can also be maximized for easier viewing. For example, FIG. 17 shows the result of clicking on the up arrow on the LifeContractTL object window.

The Object Viewer 23 provides visual proof of the real power of object technology as implemented according to the present invention. Through it, the user can see real-life objects, such as the ClientWaiver object, and how it behaves over time. The power of the LifeContract class 356 can also be clearly visible. If the premium of each of the components is added up, that will match the total premium for the Contract. FIG. 18 shows the Object Viewer 23 for an instance of the LifeContractTL class 384. The contract is composed of an OL (Ordinary Life) base policy and a Waiver Rider. The premium due for the rider is $91.00 and the premium due for the base OL component is $2,120.00. The LifeContract object (at the left of the window in FIG. 18) shows that the premium due for all components is $2,211.00.

The combination of the Design Grid 10, the Calculation Engine 16, the Object Viewer 23, and the Class Lattice 300 of the present invention enables the performance of many functions which could otherwise be too complex to execute. Two examples of these functions, as performed by the representative embodiment of the present invention, follow.

EXAMPLE 1

In example one, an agent designs a proposal for a client with complex rider conditions. First the agent utilizes the Design Grid 10 of FIG. 2 to collect the required data. The agent selects Traditional Life (the Product Line 65), Full Pay (the Strategy 66), and Initial Premium (the Solve For 67). In this example, the agent requests an Ordinary Life policy (the Product entered in the option column 69) with $100,000 of death benefit (entered in the corresponding Amount column 70) for the years "1-M" (i.e., years one to maturity, entered in the corresponding Year/Age column 71). The agent wishes the present invention to "solve for" the required annual premium, (i.e., by entering "Annual Premium" in the option column 69 and "solve" in the Amount column 70, both on the same line as "Premium"). Further, the dividend option selected is "paid up" (entered in the option column 69 on the same line as "Dividend Option").

The agent wishes to add a Rider to the proposed scenario. A row is added to the Design Grid 10 to request a Rider. (See discussion at FIGS. 2A–2C above.) The agent sees the available Riders based in the data entered on the Design Grid 10 thus far, selects Annual PUAR (see, e.g., FIG. 2B) and is prompted for the required premium amount. The agent enters $10,000 for "1–5" (years 1 through 5). Since a more complex Annual PUAR (the Option 70) contribution pattern is desired, the Rider row (being row 4 on FIG. 2C) is accessed second time and a contribution for 9–10 (years 9 and 10) of $12,000 (the Amount 70) is selected (see FIG. 3A).

Historically, this type of "dialogue" was handled in prior art systems by entering information field by field in a computerized form, which was either selected for a particular product (thus requiring many differing forms) or was so general that the operator has the burden of determining allowable input. In contrast, the Design Grid 10 gives the user one simple "form" to fill in, and at the same time gives the user the flexibility to create complex products. The Design Grid of the present invention leads the operator through the data collection process while conditionally responding to operator requests, thus providing an easy and simple to use method to handle complex proposal scenario data collection.

EXAMPLE 2

In example two, a proposed product pricing change's impact on product performance is analyzed by a marketing specialist, in this example, at the home office of an insurance company. Special rates are prepared by an actuary and entered into the Data Base Rates table 21 (and also 750 of FIG. 12). These rates effect the Annual PUAR dividend values of Example One above. The marketing specialist, using the proposal stored in a New Folder in the Proposal Manager Window 200 (see FIG. 5), requests a new proposal. Folder data 701 is passed to the Calculation Engine 16. Because the Data Base Rates table 750 contains rates (typically rates are only stored in the Compiled Rates table 753 in a compiled format (See FIG. 12), the Calculation Engine 16 accesses the new rate structures stored in the Data Base Rates table 750. The Calculation Engine 16 utilizes the ProsList Container 651 (see FIG. 10) to store values about the life contract, the TL (Ordinary Life) policy, the PUAR Annual Rider, and the Dividend Adds (Paid Up Adds).

The marketing specialist utilizes the Object Viewer 23 to analyze the impact of these rate changes on various product components (see FIGS. 15–17). A summary impact view is made available first (See FIG. 15). The marketing specialist seeks out the detailed impact on the caused by tax law by examining the LegalProcessing object 358, as shown in FIG. 16. The impact to the base policy is observed by viewing the Base TL object 408, as shown in FIG. 17. A composite view of the impact is seen across three product components in FIG. 18.

Figure 14:
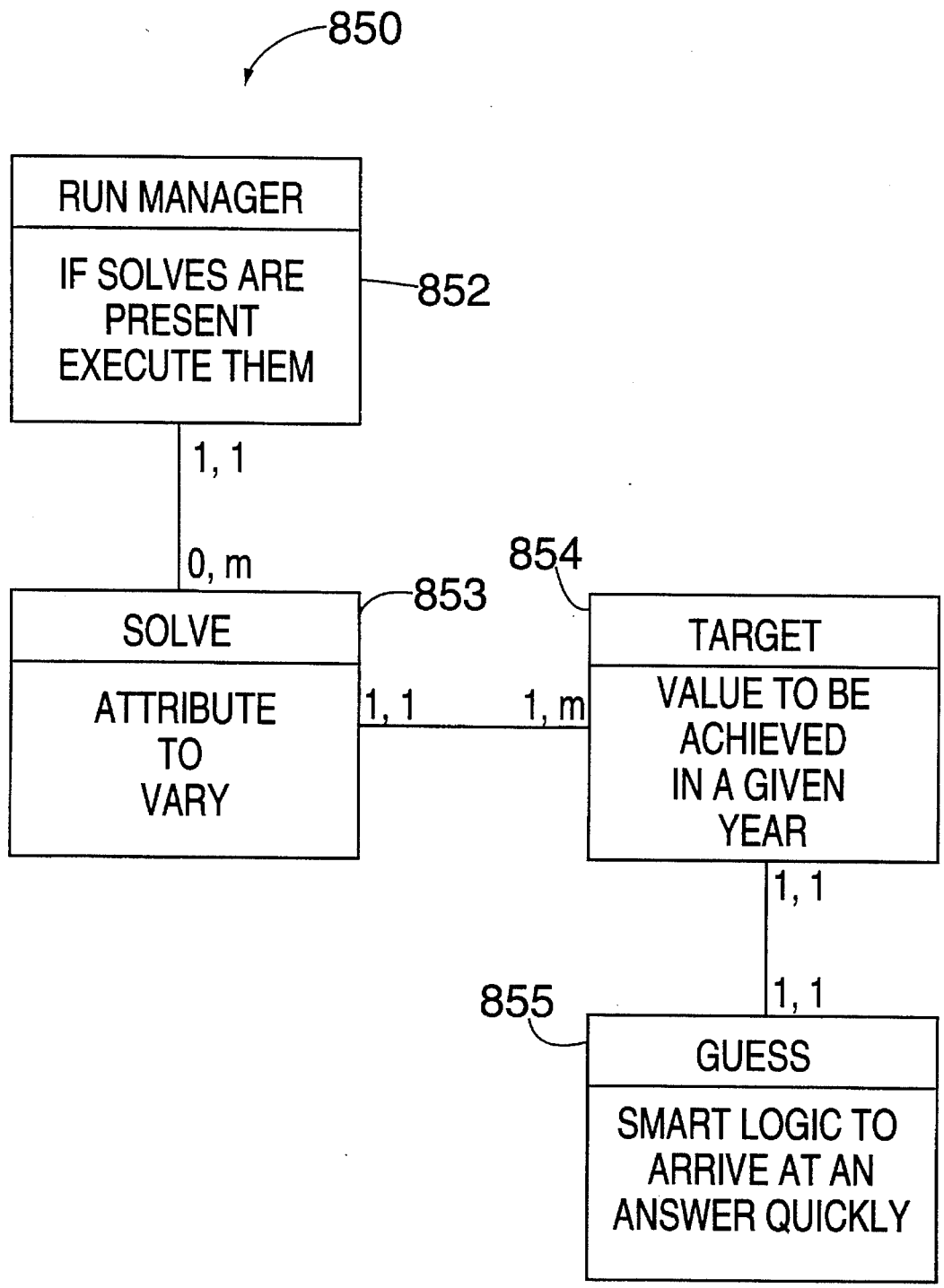
FIG. 14 is a block diagram illustrating the Solve Engine object model utilized by the solve engine of FIG. 1A.

Historically, the above process of analyzing a product pricing change on product performance was often done by hand. It was often impossible to interactively determine and observe proposed rate changes on selling scenarios. As shown in FIGS. 14–15 and 18, the present invention can display results in the same format as the original proposal prior to executing the rate change.

In this example, the Class Lattice 300 controlled the required rate access by analyzing the input data, determining that rate data was present in the Relational Database 21, and processing the corresponding life model given the requested coverage, rider, and dividend option.

Calculation Engine Processing Models

Although many leaf classes are instantiated in the Calculation Engine 16, much of the data and behavior of the objects can be defined at the abstract (super-class) level. Sub-classes can provide more specific behavior. In the representative embodiment, the LifeContract class 355 and the LifeComponent class 356 provide a significant portion of the functionality of the representative embodiment of the present invention. Accordingly, the functionality defined by the LifeContract class 355 and the LifeComponent class 356 are described in detail. The leaf classes are described in terms of their specific behavior. It should be noted that the leaf classes inherit all of the data and member functions that are defined by their super-classes in the Class Lattice 300.

(a) LifeContract Class

This section identifies some of the calculations and data that are common across contracts. In the insurance model, the contract represents the aggregation of a base policy and any attached riders. It includes those that are specified at the contract level. Accordingly, much of the processing operates at the contract level. The contract may, in turn, perform additional operations of its own.

For example, borrowing is facilitated at the contract level. A request to borrow would initiate the appropriate procedures. The contract model retains the ability to present values and initiate operations in a given year. The following is a description of the calculations and data performed by the LifeContract object 355 in the representative embodiment:

Reduce Premium with Dividends—This process is invoked by the application of dividends allocated to the contract in a given year. It receives an amount as a parameter. The amount of money allowed for premium reduction is limited an any year by the net premium due for the contract.

Reduce Loan Interest—This process is invoked by the application of dividends and if performing reduce paid up in the year. It receives an amount as a parameter. The amount of money allowed for loan interest reduction is limited in any year by the loan interest from the prior year.

Pay Dividends in Cash—This process is invoked by the application of dividends in a year. It receives an amount and there is no limit to the amount to be applied.

Borrow Process—This process is initiated by a request to borrow an amount in a year. The amount to be borrowed is limited by the maximum loan value of the contract. This process will determine the amount that can be borrowed and initiate the Borrow process on the Loan model by passing it the loanable amount.

Surrender Process—This process is initiated by a request to surrender an amount in a year. Normally, amounts surrendered leave the contract. If performing reduce paid up processing, however, the money that is surrendered is returned to the contract through the purchase of an alternative policy. First the maximum surrender value of the contract is determined. Then value is surrendered from the coverages in the order Accums, Div Adds, Lump Puar and Annual Puar.

Fund Premium—This process is initiated by a request to fund for an amount in a given year. This process applies for traditional life base policies. It is invoked whenever it is determined that a deficit exists between the required cash outlay of the contract and what the client desires to pay that year. The process is performed based on the selected funding option which has been chosen (user parameters). The valid funding options are surrender, borrow, surrender then borrow and borrow then surrender.

If unable to fund the entire amount, the process will return the unfunded amount as the remainder. All options abide by the contract and/or user specified limits.

Funding Option Surrender—This process will try to surrender the desired amount from the contract. It will return the remainder. The amount that can be surrendered is limited to the maximum surrender value of the contract at a given point in time.

Funding Option Borrow—This process will try and borrow the desired amount from the contract. It will return the remainder. The amount that can be borrowed is limited to the maximum loan value of the contract at that given point in time.

Funding Option Surrender then Borrow—This process receives a deficit amount in a year. It will first attempt to surrender the amount limited by the basis, from the contract to fund the need. If there is any remainder from the surrender process, then the borrow process will be invoked to fund the balance of the need.

Funding Option Borrow then Surrender—This process receives a deficit amount in a year. It will attempt to borrow first to fund the need up to the surrender cap of the policy. If there is any remaining need after the borrow process, then the surrender process will be invoked to fund the balance.

Fund Need—This process is initiated when a need amount has been entered. Needs are expressed as either a surrender objective or a loan objective. The determination of which need to satisfy first is based on the funding option in effect. If the funding option is either surrender or surrender then borrow, then the engine will attempt to satisfy the surrender objective by invoking the surrender process. Any unfulfilled amount will be ignored. No attempt to borrow will be made. If a loan objective has been entered, this request will process next. If the funding option is borrow or borrow then surrender, the engine will attempt to satisfy the loan objective by invoking the borrow process. Any unfulfilled amount will be ignored. No attempt will be made to surrender.

Dispense Loan Interest—This process receives a year and if the year is greater than the first contract year, there may be loan interest to dispense. There are two options available and the desired one is specified by the client in the user parameters. The client can be billed for the interest or the amount can be rolled over into the loan. If unable to roll over into the loan because of limits, the amount must be billed.

Repay Loan—This process receives a year. If there is a repayment amount specified for the year, that amount will be applied to the loan by invoking the Repay process on the Loan model.

Cash Value—This represents the total end of year cash value for the contract. It is the total of the cash value of all of the individual coverages present for the client. This calculation is performed on an annual basis.

Beginning Cash Value—This represents the cash value at the beginning of the year. It is used in the Unloaded Cash Value calculation which is used to determine the Maximum Surrender Value (partial) of the contract in a year, since surrenders are performed at the beginning of the year. It is computed as the sum of the beginning cash value of all of the individual coverages and is performed on an annual basis.

Death Benefit—This is the total of the death benefit of all of the individual coverages that contribute to the contract death benefit. The calculation is performed on an annual basis.

End of Year Total Death Benefit—This calculation, which is performed on an annual basis is the sum of the Death Benefit plus the Terminal Dividend plus the End of Year Dividend. This figure is used for output purposes and is targeted by the Solve Engine.

Premium Due—This calculation provides the Total Premium Due for all of the individual coverages contained in the contract. Premium Due reflects the cost of coverages which have not already been funded in some way. Basically, only coverages funded by dividends (OYT, FTR, TIO) and those funded by dollar contributions (Puar, Div Adds, Accums) will have a premium due less than their cost. This calculation is performed annually and will be zero if beyond the premium duration of the base policy.

Maximum Premium—This is the total of the maximum premium of all of the individual coverages and is performed on an annual basis.

Net Premium Due—This is calculated as the Premium Due of the contract minus dividends used to reduce premiums and is performed on an annual basis.

End of Year Dividend—This is the total of the end of year dividend of all of the individual coverages less any loan adjustment of the contract. The calculation is performed annually.

Guaranteed Cash Value—This is the total of the cash value of all of the individual coverages that are guaranteed and is performed on an annual basis.

Guaranteed Death Benefit—This is the total of the death benefit of all of the individual coverages that are guaranteed and is performed on an annual basis.

Maximum Surrender Value—This figure represents the total amount of money that is available for partial surrender from the contract at a given point in time. It is used in the surrender process to potentially limit surrendering. For illustrations, surrendering takes place at the beginning of the year. The amount returned is the total of the maximum surrender value of the individual coverages. This amount may be lowered depending on the unloaned cash value of the contract since it is only possible to surrender unborrowed value. The result is further limited by any surrender cap that was entered through the user parameters.

Maximum Loan Value—This calculation is performed on an annual basis and represents the total maximum loan value of all of the individual coverages. This amount is limited by the balance of any existing loan and the interest due on the loan.

Unloaned Cash Value—This calculation represents the amount of cash value at the beginning of the year that exceeds the existing loan balance less interest due.

Cash Outlay—This represents the actual flow of money that can be compared to the stated objective and is performed on an annual basis. It is computed as the Total Premium Paid minus the Total Surrender Amount from the contract minus the Total Borrow Amount from the contract.

Total Premium Paid—This represents the total money paid in to actually support the contract. It differs from the objective in that it is the amount actually paid.

Loan Adjustment—Some products use a direct recognition approach in calculating the dividend to be paid. Dividend rates are calculated assuming a zero loan balance. The Loan Adjustment adjusts policy dividends to more accurately reflect the actual contribution of the policy to investment earnings.

Average Daily Loan Balance—Since the system in the representative embodiment only initiates loans at the beginning of the year, this figure is equal to the Loan Balance in the previous year. For in force business, this is calculated as the interest due divided by the annual loan interest rate.

Cash Outlay Objective—This represents the payment stream into the contract that the client would like to make and is based on the input item cash outlay objective in the user parameters. The stream in the Contract model is potentially modified based on external Solve logic. For example, if trying to vanish the premium in the eighth year, this computation would be zero in year nine regardless of the input by the user. If not beyond the vanish year, the cash outlay objective is computed as the planned premium payment plus any lump or annual Puar payments. The planned premium payment can be either entered as a number or optionally entered as "P" which means pay the Premium Due for the contract instead of an input amount. The calculation is performed on an annual basis.

Cash Dividends—This is an annual figure and represents the money from dividends that will be paid directly to the client in the form of a check.

Money Out—This calculation is used only by the Object Viewer 23 and represents the Total Borrow Amount plus the Total Surrender Amount. It visually indicates the outflow of funds from the contract.

Unfulfilled Cash Out of the Contract—This figure is computed annually and represents the amount of money that was not successfully pulled out of the contract. For example, if borrowing or surrendering was limited, this figure will represent the amount that was not attainable. This figure is used by the Solve Engine 18 to detect if a solve scenario was unsuccessful.

Paid Up Status—This attribute is determined on an annual basis and could be any of the following: Contract Paid Up, Reduce Paid Up and Not Paid Up. When a contract is Paid Up, no further premiums are due.

Discounted Premium—A discount is given for early payment of premiums and up to twenty premiums may be discounted. No discount is given for the first year premium. An amount equal to the present value of future premiums due is calculated as the discounted premium amount.

Mec Status—This attribute represents the status of the contract with regard to the way withdrawals will be taxed. A contract that is classified as a MEC (Modified Endowment Contract) will receive less favorable tax status than one that is not. Most of the processing resides in the Legal model.

LifeComponents

This section identifies some of the calculations and data that are common across multiple coverages. Accordingly, the following is a description of the calculations and data performed by an instance of the LifeComponents class 356 in the representative embodiment:

Buy Face Amount—This process models the purchase of a coverage given the desired face amount in a given year. The process increases the face amount of the coverage by the face amount of the year which is specified. Many coverages are purchased through the application of input data which is sent to the Calculation Engine 16 via the API Layer 14. Others are purchased as the result of internal processing, such as the application of dividend monies.

Make A Contribution—Some coverages are purchased by depositing money. The current traditional life examples are Annual Puar, Lump Puar, Dividend Additions and Accumulations. The amount to deposit in a given year is specified both by input data and processing logic. Deposits are subject to minimums and maximums for some coverages.

Compute Premium—This process is used to convert a desired face amount to a corresponding premium. It is applicable for most coverages. It receives a face amount and a year. The computation method is identical to that for Premium (described later) except that the face amount divided by 1000 is used in place of units.

Compute Face Amount—This process performs the inverse of the above. It converts a dollar amount that is desired to be paid to a corresponding face amount that could be achieved if the dollar amount specified was paid. It accepts an amount and a year and is applicable for some of the coverages. Coverages that apply a load or include a policy fee defying their own method.

Surrender—This action surrenders cash value from a coverage in a specified year. Some of the coverages, like Puar, treat current contributions and existing values differently. That is, they can surrender one or the other, or both portions. If the requestor does not supply a portion, then both is assumed. If surrendering from both, the current payment will be surrendered first, followed by any existing value.

Cash Value—The common calculation of cash value is to multiply the number of coverage units by the cash value rate. The rate is retrieved from the appropriate table and units is the entered face amount divided by 1000 as described above.

Face Amount—For most of the coverage models, the face amount is determined by the amount that was purchased in the year. Therefore there is no calculation. The value is simply the amount that was bought.

Units—This is computed as face amount divided by 1000. Many of the other calculations use this figure to derive their value.

Death Benefit—The common calculation is units multiplied by 1000 rounded to a whole dollar amount. Some coverages provide an increasing or decreasing death benefit. In these cases, the common calculation would be overridden by more specific processing down the class hierarchy.

Premium Due—This is computed annually. It is the difference between the premium that is calculated for the coverage (below) and the money already paid for the coverage. In general, coverages that are funded by dividends can have money already paid. Also, Puar will not have any premium due since it costs whatever you pay for it.

Premium—This is the common calculation for premium for all traditional life coverages. When different, the individual coverage will supply the appropriate method. Premium calculation rules have added to reference data files so that the processing can handle multiple coverages. The standard calculation is standard premium rate times the number of coverage units, rounded to the nearest penny. The rate is retrieved from a reference data file, e.g., 22. Rated premium is calculated as table premium plus permanent flat extra premium plus temporary flat extra premium. Premium is standard premium plus rated premium (if any).

Wavier Premium—This premium is computed annually. It is performed for the client and perhaps the spouse (if a survivorship product). It computes the charge associated with having waiver on this coverage. The basic calculation is waiver rate times the number of coverage units.

End Of Year Dividend—The dividend to be applied to a coverage in a given year is computed as the dividend rate times the number of coverage units. The dividend rate is read from the appropriate coverage table. Also, depending on the nature of the coverage and the processing year, either the premium paying or paid-up rate will be used.

Maximum Surrender Value—The results of this calculation provide the amount of money that is able to be surrendered in a given year. Some coverages treat current contributions and existing values differently (Puar). This is taken into consideration in arriving at the value.

Maximum Loan Value—This calculation determines the amount of value in the coverage that is loanable in a given year. Loans do not directly reduce the individual coverages. The accounting for the current loan balance and interest due is performed by the MaximumLoanValue calculation on the LifeContract model. Only coverages that have a cash value contribute to the maximum loan value, except for Accums. If the coverage is borrowable, then the cash value is computed for the coverage in the given year.

Vanish Year—Vanish year is defined as the last year in which premiums are paid. This year is either input or set by the Solve Engine 18 when a vanish solve is requested.

Other classes in the Class Lattice 300 of FIG. 6A–6C are now discussed.

Accums 388

This model represents the money that is accumulated through the application of the Accums dividend option. It is treated as a coverage since it has many of the same attributes as other coverages and can be surrendered and borrowed against. It can be thought of as a savings account attached to the policy where dividend money can be accumulated.

The primary functions of the Accums model are to accept a contribution in a given year and to calculate the cash value in a given year.

ADB 448

This coverage provides a death benefit in the event of the accidental death of the insured. Along with electing this rider, the face amount is also specified. The face amount entered applies for all years for the coverage duration. ADB has no cash value and is rated independent of the base ratings.

ChildRider 447

This rider provides level term coverage on the life of each insured child. Each child is insured until his/her attained age of 25, or the expiration date of the rider, if sooner. Along with electing the rider, age of the youngest child and face amount are specified. Table premiums are calculated differently for this rider.

CostOfLiving

This rider coverage utilizes policy dividends to provide one year term coverage which will be adjusted in accordance with changes in the cost of living as measured by the Consumer Price Index for urban wage earners and clerical workers as published by the United States Department of Labor. The portion of the policy dividend applied to purchase one year term insurance is determined so as to provide a total target death benefit. If that amount is insufficient, the remaining cost is billed to the client. If there is excess, the money is returned to be applied to the next dividend option.

DivAdds 439

This coverage models the purchase of paid-up additional insurance that is funded by policy dividends. The model accepts a deposit or contribution as input, rather than specifying a face amount. This coverage has a face amount and cash value and can be surrendered. No premium is charged for this coverage as any dividend money deposited pays for the corresponding face amount.

OYT 426

This coverage provides one year term insurance. It is purchased by the application of dividend money through the Purchase OYT dividend option. The amount that can be purchased in a given year is limited.

Along with the dividend money, the cash value of any Accums is available for purchasing OYT. This total figure is converted into a corresponding face amount of OYT coverage. It is limited to the face amount equal to the guaranteed cash value of the base policy.

Puar 440

Clients often desire to contribute extra funds into their insurance policy to provide for excess cash value to help fund future financial needs or to arrive at an early vanish of premium. This coverage models purchases through the Paid-Up Additions Rider. The model accepts a deposit or contribution as input and a face amount of insurance is determined. Other models interact with Puar by specifying contribution amounts or requesting surrenders. A load is applied on Puar purchases.

Puar may be purchased either by user specification or by the AnnualProcess model when it is determined that funds are available internally. In automatic issue situations where the AI limit is exceeded, multiple Puar models will exist to support different premium, dividend and cash value rates.

PuarLump 442

This model handles Puar contributions that are to be made by the client in lump sum fashion. For example, the client wants to put in $3000 in year five and $5000 in year 10.

PuarAnnual 441

This model supports Puar contributions that are to be made on a regular annual basis. For example, the client may want to put in $2000 per year for ten years. Annual Puar payments cannot exceed the amount of the previous year.

PurchaseOption 449

The purchase option rider grants to the client the option to purchase additional insurance, without evidence of insurability, on certain policy anniversaries. The user specifies the face amount when electing this rider. This model will exist if the Purchase Option rider has been elected on input.

SpouseRiderTL 450

This rider provides level term insurance to age 65 on the spouse of the insured under the base policy to which the rider is attached. This model will exist when a spouse rider has been elected on a TL policy. A face amount for the rider is specified as input.

The spouse rider has a residual value that enables the leveling of premium, although this cash value is not illustrated or available for surrender.

TIO_FTR 435

This coverage is a rider that provides a death benefit from a combination of One Year Term (TIO or FTR) and Paid-Up Additions (DivAdds). These coverages are purchased by the annual dividend available through the PurchaseTIO_FTR dividend option. Additional funding may come from surrendering the cash value of other coverages (DivAdds, PuarAnnual, PuarLump), when the dividend is insufficient to even purchase all term insurance.

For each year, while the dividend option is in effect, the portions of TIO/FTR and DivAdds that are purchased are a function of the additional protection required and the money available. This model provides the complex purchase processing that figures out how to spend the money available.

Waiver 446

The waiver of premium rider provides that upon total disability, the Company will waive policy premiums for the duration of the disability. The coverage may be on the insured or the applicant. Waiver may be attached to the base policy and to rider coverages. The actual cost of Waiver is computed by each coverage to which it is attached.

WaiverUL 445

Universal Life products charge a monthly cost of insurance that is deducted from the UL fund. This rider models the waiver or the monthly deductions in the event of total disability.

YRT 427

This coverage provides level term insurance for one year and is automatically renewable nine more times. The premium rate increases on each renewal date. The user can specify the dollar amount of coverage, ask the system to compute the maximum amount or ask the system to determine the appropriate mix of term and permanent insurance to meet a particular need. This model provides the processing required to calculate the table premium for rated cases.

ULYRT 428

This coverage for Universal Life products provides level term insurance for one year and is automatically renewable on a yearly basis. The coverage can run until an attained age of 95 is reached. This model provides specific processing required to calculate the table premium for rated cases.

BCPRider 462

The Benefit Completion rider provides payments to a 401K benefit plan in case of disability. This rider can only be issued in conjunction with the Waiver of Premium rider. The user specifies the monthly benefit when electing this rider. The ComputePremium function receives the monthly benefit and year as parameters and converts it to a corresponding premium.

GIBRider 463

The Guaranteed Income Benefit Rider provides payments in the case of disability. The user specifies a monthly benefit and optionally a substandard factor. The ComputePremium function receives the monthly benefit and year as parameters and converts it to a corresponding premium.

SLTermRider 430

This coverage model handles two term riders for survivorship products. One rider is level term, while the other is decreasing term. The decreasing term rider decreases its face amount rather than death benefit per unit. The riders can be purchased for either insured and unisex rates can be specified.

The face amount is initially entered and then calculated in the remaining years. This coverage does not contribute to the contract death benefit since it is on a single life rather than joint lives. Substandard premiums are calculated based on the individual life of the insured covered by this rider.

JLTermRider 431

This coverage model handles a joint life term rider available on survivorship products. It covers both insured for a maximum of four years. The death benefit is paid at the death of the second insured. The coverage does not contribute to the contract death benefit. This model provides the substandard premium amounts based on a blending of the two individual situations.

Loan 364

The loan model supports loans against policy values. It monitors the loan balance and interest due. While the Loan model will rollover an existing loan balance from year to year, it does not do anything with the interest due. This burden is placed on the annual processing.

The primary Loan functions are Borrow, Repay, Balance and Interest. Borrow receives a request to borrow an amount in a year and will increase the loan balance. Repay will reduce the loan balance based on a repayment amount and a year to repay. Balance computes the current loan amount as last years balance plus any borrowing minus any repayments. Interest is computed as the loan balance multiplied by a loan interest rate.

Policy Change 333

A policy change is a series of steps that is performed at some point in the life of an insurance contract. When a policy change is executed, the various coverage models will be altered to reflect the desired change. The Reduce Case Face policy change is the only one currently supported. The cash value released by the face reduction is returned to the RecognizeSurrenderAmount process on the LifeContract model unless the option to spend the money on Lump Puar has been specified.

Annual Process

This process is performed for every year throughout the duration of the contract for which calculated values are required. It transacts the annual administration of a financial product. It is supported by the IllustrationProcessing class and its sub-classes. This processing will vary depending on the type of product that is being illustrated. For example, a Traditional Life insurance contract will process differently than a Universal Life contract. These differences will manifest themselves in the sub-classes IllustrationProcessingTL 389 and IllustrationProcessingUL 390.

The Calculation Engine 16 processing has been described as a network of objects that must collaborate together to provide the functionality required by the system. It is sometimes difficult to see the end to end processing flow that is being followed. The IllustrationProcessing class 360 provides that sequential flow. An object of this class triggers the appropriate processing and transfers control to the object responsible for that behavior in a specific order until all required processing has been completed. The primary functions performed for Traditional Life (TL) contracts are listed below.

Paid-up Processing

The first function performed in the annual process is to determine if the contract will pay-up (no more premiums need to be paid) or is already in a paid-up state. If the policy will pay-up, specific processing is performed based on whether it is contractually paying up or is being forced to because of the entry of a reduced pay-up year.

Determine Appropriate Amount and Type of Coverage

This process is performed if the contract is not paid-up or going to pay-up this year. Base coverages are modeled per their face amount stream, while riders are modeled per their input information. The processes BuyFaceAmount, MakeAContribution and BuyMonthlyBenefit are invoked for the appropriate coverage models.

Perform Policy Changes

This process determines if any policy changes apply for this year. Currently the only policy change supported is the reduce base face change. If there is a policy change for the given year, the Execute function is called on the Policy Change model.

Apply Dividend

The appropriate dividend phase is determined based on priority. The policy can have up to three dividend options. The engine will iterate through the dividends in priority order until all the money is spent by executing the Apply process on the appropriate dividend object.

Dispense Loan Interest

Any interest due on a loan from the previous year needs to be dispensed. The interest can be billed or rolled into the existing loan. The Dispense Loan Interest function on the LifeContract is initiated.

Repay Loan

Any portion of a loan can be repaid in a given year. This process is present mainly to support in-force processing. Control will be passed to the RepayLoan process on the LifeContract model.

Spend Excess Money on Puar

If the Client's cash outlay objective (what they would like to pay) exceeds the cash outlay of the contract (what is required to be paid), then excess money is available for spending. The excess will be contributed to Annual Puar by invoking the MakeContribution process. If unable to contribute the full amount, due to limits or maximums, the rest will be contributed to Lump Puar in the same manner.

Premium Deficit

If premium deficit exists (cash outlay required > Client's cash outlay objective) the Calculation Engine 16 will attempt to fund any deficit based on the funding option that has been selected by the Client. The FundPremium process will be invoked on the LifeContract.

Need Deficit

Needs are expressed as either loan or surrender objectives. If either has been specified for the given year, then funding for the need is performed. The FundNeed process is invoked on the LifeContract.

MEC Status

In each year of the Annual Process, insurance contracts are checked for compliance with TAMRA (Technical and Miscellaneous Revenue Act) legislation. The knowledge of this tax act is contained in a class of objects called the Legal class 358. The MecStatus function on the Legal class 358 is invoked.

Client Model 318

This model serves as the repository for all static Client and Spouse (if required) related information. This model will always exist for the Client, and the Spouse will exist if the Base Policy is Survivorship.

Age—An age is entered for the Client and for the Spouse if required.

Table Rating—A table rating is entered for the Client and the Spouse (if Survivorship).

Healthier Insured—If the Base Policy is not a joint plan, then the Client is the Healthier Insured. Otherwise the Healthier Insured is the one with the least total substandard extra.

Whenever there is equivalent substandard, the Client is the Healthier Insured.

User Parameters Model

This model serves as a repository for all user parameters entered through the Design Grid 10 or other input mechanism. It is supported by the ClientCaseData class 317. This model always exists.

Cash Outlay objective—This is a stream of values that indicated the desired premium payment for a given year in the illustration. Individual annual entries can be either numeric or codes. Valid codes are:

P—Pay Premium

T—Pay Target Premium

M—Pay Minimum Premium

G—Pay Guideline Premium

S—Pay Single Premium

Surrender Objective—This is a stream of values that indicates the desired surrenders (withdrawals) in a given year to satisfy some need of the Client. This amount is in addition to any shortfall required for the contract. The entries can be either numeric or a code. Valid codes are:

M—Maximum Allowable

Loan Objective—This stream of values indicates the desired loan amounts in a given year to satisfy some need of the Client. This amount is in addition to any shortfall required for the contract. The entries can be either numeric or a code. Valid codes are:

M—Maximum Allowable

Target Death Benefit—A single numeric field used in combination with TIO/FTR. This figure less the face amount of the base policy defines the beginning Additional Protection Need.

Face Amount—The face amount of the Base Policy. Traditional contracts may enter a single value, Universal Life products may enter a stream.

Annual Puar Amount—This stream indicates the Client's desired Annual Puar payments in a given year.

Lump Puar—This stream indicates the Client's desired Lump Puar payments for a given year.

ALBO Option Indicator—This indicates if there is Automatic Level Billing Option on the contract.

Term Option Increase—This indicates the percent increase for the FTR rider.

Loan Cap—This field is used to limit the size of any loans that can be taken.

Surrender Cap—This field limits surrendering to a cash value ceiling. The limit is applied at the contract level and any attempts to surrender by the engine will honor the limit.

Payment Mode—This field is used to indicate the payment mode of the contract.

Loan Interest Pay Option—This indicates if loan interest should be billed or added to the existing loan balance (if applicable).

Funding Option—This indicates the method to be employed when funding a premium shortfall. It also provides the priority for funding specified needs (surrender objective, loan objective). Valid selections are:

Surrender

Borrow

Surrender then Borrow

Borrow then Surrender

The complex options will shift when a specified cap is hit.

Use Unisex Code—Indicates that Unisex rates should be used.

Reduce Paid Up Year—This field indicates the desire to perform reduce paid-up processing (RPU) in the year input. The engine will pay up in the beginning of the next year.

Hypothetical Dividend Scale—This field indicates the desire to run multiple TL models. When input, two additional models will be run, hypothetical above and hypothetical below.

Automatic Issue Limit—This indicates the maximum face amount that can be issued on an Automatic Issue basis. Entry of zero indicates all Underwritten.

Freezing

Some of the functions within objects can be recursive in nature. Generally, there are two types of recursion, direct and indirect. In direct recursion, the function actually calls itself. For example, PuarAnnual's FaceAmount() is dependent on last year's value. In indirect recursion, one function calls another, which in turn calls the former in a different time period. Also, many of the functions can be accessed repeatedly within a year. In order to avoid possible memory problems and improve efficiency, a freeze flag array was developed. This technique is possible because annual processing does not alter any value in a previous year.

The instance of the LifeProcessingVariables class 359, in the representative embodiment, has a freeze flag array. The indicator for a particular year is flipped following processing for that year. Functions that are either recursive, or do not calculate themselves repeatedly, define a corresponding data member which is a pointer to a freeze object. The attached freeze object comprises the value of the function as computed in the frozen year. It also comprises a flag array that indicates if the value has been frozen.

When a function is called that has a freeze object, the freeze flag is checked to see if the value for the requested year has already been frozen. If it has, the frozen value is returned and the function need not be executed.

Pointers and Arrays

Object behaviors can be changed, in certain areas, at run-time. For example, pointers to different function definitions can be switched at run-time to illustrate the result of a different rate structure on a proposal.

The present invention in the representative embodiment has Smart Array objects, that allocate memory only when their value changes from their default value. This conserves memory, since the use of many arrays are mutually exclusive, but not determinable at object creation time.

API Layer 14

Since the Calculation Engine 16 is required to be open to multiple consumer applications which may or may not employ object oriented technologies, a wrapper has been developed which maps the public interfaces of the C++ objects and makes them available to non-C++ implementations. This wrapper is called the API (Application Programming Interface) Layer 14 and is illustrated in the block diagram form in FIG. 11.

The API Layer 14 provides a standard C function interface to the Calculation Engine 16. It provides clearly defined functions for initializing and/or retrieving data into and from the Calculation Engine 16. The API Layer 14 provides multiple illustration processing via memory context handles, e.g., 702 and 703. These handles provide a road map to a unique object list.

Rates Access

Much of the behavior of the insurance and investment product objects, such as, for example, calculating premiums, cash values and dividends, rely on complicated rates data. The rates data, traditionally is stored in large mainframe IMS databases. Rates data (or a sub-set thereof) can additionally be stored on a personal computer in a relational data base for access by the requisite processing functions. However, even the relational data base stored on the PC is large enough to slow performance of the application.

This problem is solved by having a second set of rates data available for performance enhancement, if desired. The compiled rates approach provides improvements in access speed and disk space utilization. Accordingly, in the representative embodiment, rates data is stored in a relational database 21 and a compiled database 22. For every relational data base 21 file, there can be a corresponding compiled rate 22 version. The compiled database 22 tables/files can share the same name as the relational data base 21, but with a different extension.

Traditionally, the application would have to be knowledgeable of what rate files were being used in order to correctly access them. However, in the Calculation Engine 16, rate file access has been encapsulated through the use of rate objects. See FIG. 6A, for the rates objects 327, namely Paradox Rates class 335 (relational database) and Compiled Rates 336 class (compiled version).

Figure 12:
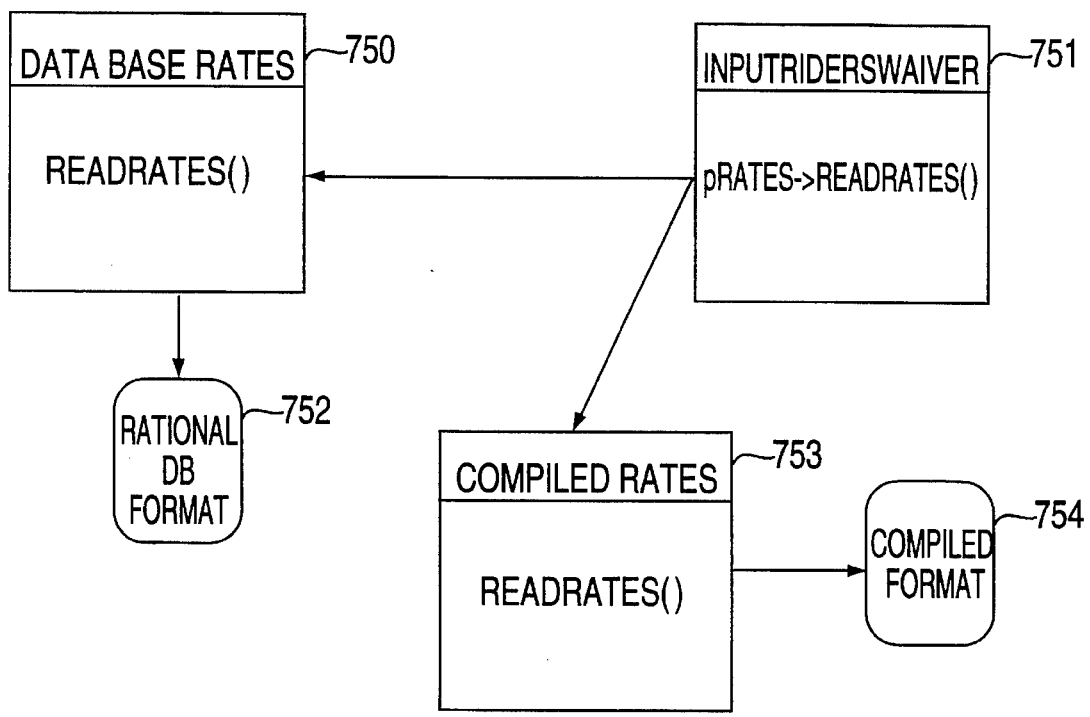
FIG. 12 is a block diagram illustrating the relationship between input objects and the rate databases.

FIG. 12 illustrates in block diagram form, as an example, the interaction between an InputRiderWaiver object 653 (see also 370 and 412 of FIG. 6B) and a relational database rate access object 651 and a compiled database rate object 752. The InputRidersWaiver object 751 (see also 412 and 370 of FIG. 6B) simply sends a message asking that the waiver rates be read, regardless of which rate files are being used. (Typically, the user can select the database to be used on installation.) This technique is utilized by the Calculation Engine 16 in order to shield the Calculation Engine 16 from the implementation details pertaining to access of the rates databases and their internal structures.

Solve Engine 18

In the representative embodiment, within the Calculation Engine 16 is the Solve Engine 18. The Solve Engine 18 processing, although independent of the Calculation Engine 16, operates on the Calculation Engine 16. The Solve Engine 18, in the representative embodiment, is implemented using object oriented techniques. The design of the Solve Engine 18 can be based on a classification hierarchy called a Solve Lattice 800.

Figure 13:
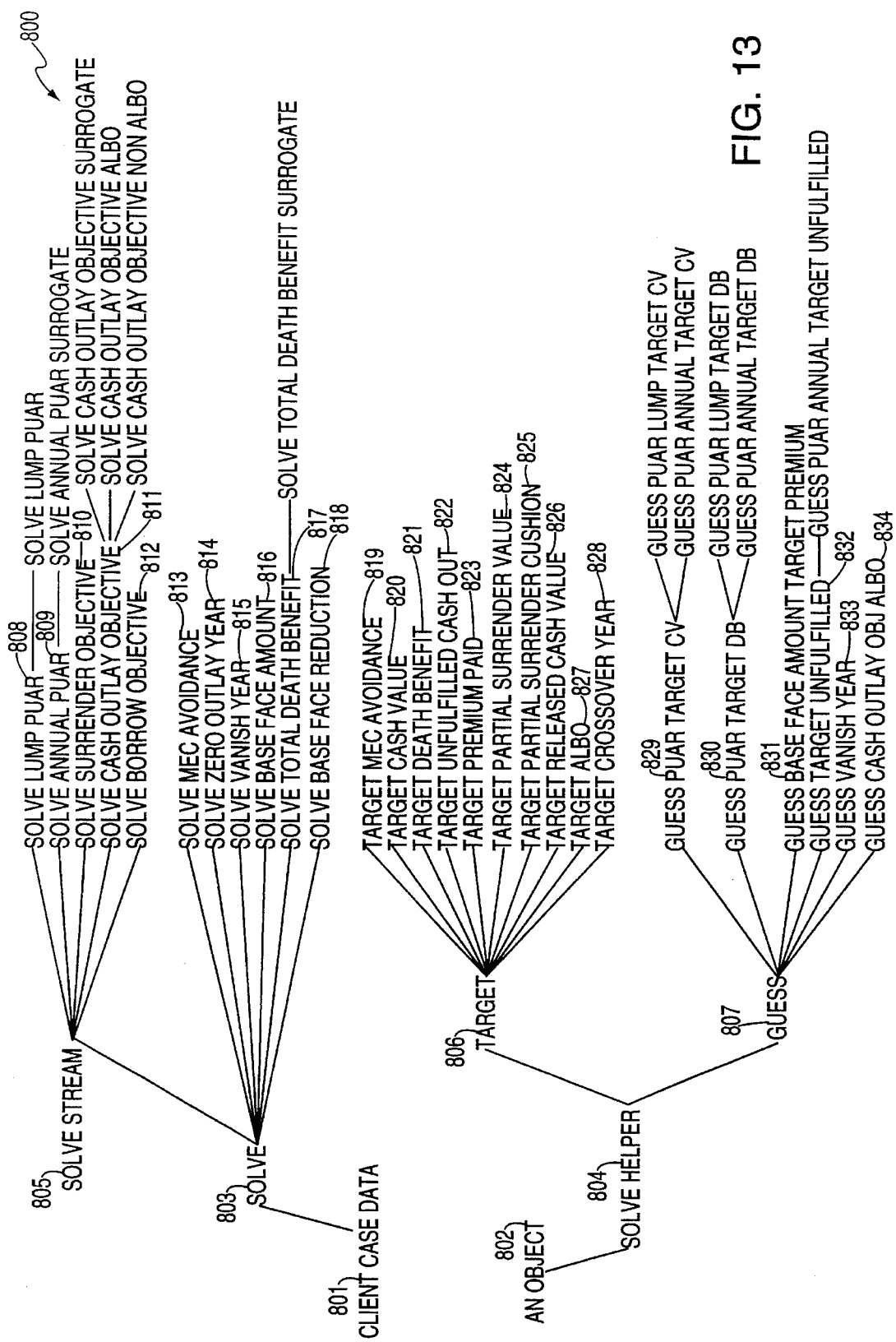
FIG. 13 is an exemplary Solve Lattice utilized by the Solve Engine of FIG. 1B.

Referring to FIG. 13, there is illustrated an exemplary Solve Lattice 800. The Solve Engine 18 is "governed" by the classification hierarchy of the Solve Lattice 800. Like the Class Lattice 300 of the Calculation Engine 16 (see FIG. 6), the Solve Lattice 800 processing resides in several super-classes. The super-classes, in the representative embodiment, are a Solve class 803, a Target class 806 and a Guess class 807. The Solve Lattice 800 depicts how specific sub-classes inherit their behavior from these super-classes. As in the Class Lattice 300, most of the processing takes place at one of the three super-class levels.

At the macro level, a solve involves varying some input parameter in order to achieve one or more targeted values. For example, it may be desirable to achieve a $150,000 contract cash value in year 20, by varying annual cash value rider contributions. Since there is not always a linear relationship between the amount being varied and the contract value that is trying to be achieved, an iterative approach is used. In order to minimize search time, solve routines are designed to use smart logic, thereby arriving at a solution quickly.

A particular solve usually consists of the thing that is being varied (input), the thing(s) that are being targeted and the smart logic to establish the guesses (tries). Multiple solves may be requested for a given illustration, and a solve may have multiple targets that need to be met. Referring to FIG. 14, there is illustrated a model of a Solve Engine object 850.

A RunManager object 852 of the Calculation Engine 16 determines if any solves are present, and if so, passes control to the Solve Engine 18 so they can be executed. A solve object 853 can have one to many target objects 854 attached. However, for each target object 854, there is only one guess object 855. In the example of FIG. 14, the target object 854 represents a valve to be achieved in a given year. The guess object 855 comprises the smart logic to arrive at the "answer" to this target quickly.

The Solve Engine 18 provides powerful capabilities for the dynamic modeling of a client's complex needs and then producing an illustration where an attempt has been made to satisfy those needs.

Some illustration requests require the execution of the Solve Engine 18 while others simply require that the Calculation Engine 16 be run. When it is determined that the Solve Engine 18 is needed, the request is further interpreted to arrive at the appropriate Solve Engine 18 models.

In the representative embodiment, the Solve Engine 18 includes a Solve Interpreter. The Solve Interpreter is invoked whenever a request is made by the Design Grid 10 to produce an illustration. The Solve Interpreter can first determine if either an implicit solve or a custom solve has been specified by the user. It also detects the presence of targeting information and selects the appropriate guess routine based on the item being solved for and the target being tested.

This process determines what is to be varied by the Solve Engine 18. The first type of solve that will be processed is an implicit solve. An example of this kind of solve would be finding the appropriate face amount from an entered target premium.

When a custom solve is specified, the solve type will determine what is to be varied and in the case of streams of input values, what years to vary. Stream inputs are those that allow entry of amounts for multiple years. In some cases the input to be varied is determined by searching a subset of the input data for coded information. This is indicated, for example, by entering −999 somewhere in the input. Those items that can be solved are uniquely identified. Input in this manner allows considerable flexibility in both the selection of targets and indicating exactly what to vary.

After determining what is being solved for, the Solve Interpreter searches the input data to find what values are being targeted. (See 853). The selection of solves types generally imply that certain targets will be provided. (See 854). Then a guess model is created that directly reflects the solve and target models. (See 855). This is done so that smart routines can be provided.

The solve process 853 is high-level driving process of the Solve Engine 18. It is possible to have more than one solve present in the request. The Solve Engine 18 will iterate through the solves in priority order (implicit solves first) and transfer control to each solve's "Perform Solve" routine which will accomplish the solve. The Solve Engine 18 runs the Calculation Engine 16 until the last illustration year.

The Perform Solve function is invoked once for a particular solve and will terminate when either an acceptable solution has been found or no such solution exists. The basic processing involved in a solve as controlled by the Perform Solve function is:

(1) taking a guess;
(2) inputting the guess into the Calculation Engine 16;
(3) running the Calculation Engine 16;
(4) evaluating the targets;
(5) updating the values;
(6) stop if successful or go back to step 1.

This process will terminate when two successive tries are the same. If multiple targets are in play, a try has to satisfy an earlier target before testing a later target. Some targets are not absolute in that a particular try (guess) may satisfy a target, but exceed above what is necessary. For example, if a stream of surrenders was specified, a sizable Lump Puar dump-in might allow the target of $0 in surrenders not met to be achieved. However, a smaller dump-in may also achieve that goal. In this case, the size of the dump-in will be ratcheted down until the smallest amount that achieves the target is found.

Once the solve processing is completed (no more solves in the list), the last target year is checked to see if it is less than the last illustration year. If it is, the Calculation Engine 16 is run until the last illustration year is reached.

Due to the interactive nature of the solve process, the instances of classes below the LifeModel class 340 have their internal arrays re-initialized for each solve pass. That is, after a failed solve attempt, each instance under the Lifemodel class 340 is re-initialized beginning at a particular year, called the restart year. Years prior to the restart year are left unchanged.

The ability to restart in a given year is what allows the Solve Engine 18 to make successive attempts (tries) at arriving at an acceptable solution without corrupting the original data values.

The following is a description of the individual Solve Objects 853 (FIG. 14) as illustrated in FIG. 13:

Solve Lump Puar 808—This allows solving for one or more Lump Puar contributions that satisfy the specified targets. If multiple contributions are desired, the annual payment amount will be level.

Solve Annual Puar 809—This allows solving for one or more Annual Puar contributions that satisfy specified targets. If multiple contributions are desired, the payment amount will be level.

Solve Buy Face Amount—This allows solving for the face amount of the base coverage. The total contract premium is generally supplied, but other targets could drive the solution process as well. A variation of this solve involves solving for the product mix. If the total death benefit is specified, the amount of TIO/FTR will be determined. Additionally, if some other rider's face amount is indicated as SOLVE, this amount will be determined.

Solve Surrender Objective 810—This allows solving for the maximum amount of withdrawals from the contract while satisfying targets. Typically, the main target involved here is the Unfulfilled Cash Out target, which specifies that all desired withdrawals must be achieved. A solution is allowed for multiple years and will be level.

Solve Borrow Objective 812—This allows for the maximum amount of loans while satisfying targets. Typically, the main target involved here is the Unfulfilled Cash Out target, which specifies that all the desired withdrawals must be achieved. A solution allows for multiple years and must be level.

Solve Vanish Year 815—This allows solving for the earliest year in which the policy can become self-funding (no more premiums need to be paid by the client).

Solve Total Death Benefit 817—This allows solving for the total death benefit of the contract using the Term Insurance Option rider or the Flexible Term Rider. The base face amount of the contract is specified.

Solve Cash Outlay Objective 811—This allows solving for the amount of money that the client wishes to pay while satisfying targets. One alternative, when the outlay is positive, is to find a level premium that can be paid. This is effective for increasing premium products. The second alternative is to solve for a withdrawal. Since negative amounts require the Solve Engine 18 to perform premium funding, the funding option is used. The Solve Engine 18 can alternate between surrenders and borrows per the funding option. This method typically arrives at larger outlays than solely doing one or the other. The typical target here is Unfulfilled Cash Out which specifies that desired withdrawals are achieved. A solution is allowed for multiple years and will be level.

Solve MEC Avoidance 813—This allows for solving for a contract tax status which is not a Modified Endowment Contract as classified by the TAMRA tax legislation. This solve will vary the total death benefit of the contract if within the first seven years and reduce payment amounts in subsequent years in order to prevent a MEC status. MEC status generally occurs when there is a desire by the client to dump extra funds into the contract via Lump or Annual Puar.

The following is a description of the individual targets (i.e., 854 of FIG. 14), as illustrated in FIG. 13:

Target Cash Value (820)—With this target, you can specify cash value in a given year. Then the Solve Engine 18 will try to achieve this value by looking at the contact's Net Cash Value. This target is absolute in that it can not be higher or lower than the tolerance.

Target Death Benefit (821)—With this target, you can specify the Death Benefit in a given year. The Solve Engine 18 will try and achieve this value by looking at the contract's Death Benefit. This target is absolute in that it cannot be higher or lower than the tolerance.

Target Premium Paid (823)—With this target, you can specify the premium to be paid in the first year. The Solve Engine 18 will try and achieve this value by looking at the contract total premium paid. This target cannot be higher or lower than the tolerance.

Target Crossover Year (828)—With this target, you can specify where the term coverage for a TIO or FTR will disappear. That is, all paid up additions can be purchased while still supporting the required death benefit protection amount. The target ensures that this situation is met in the specified year and all years following it.

Target Partial Surrender Cushion (825)—With this target, you can specify a Partial Surrender value that must remain in the contract in a given year and thereafter. The cushion can be Premium, in which Premium Due of the contract is used. Also, the year can be after Vanish, thereby floating the start year of the target to be after the vanish. This target is useful for lessening the impact of future dividend scale reductions.

Target MEC Avoidance (819)—With this target, you can specify that the contract tax classification remain not a Modified Endowment Contract. This status must apply to all contract years in that once a contract is classified as a MEC, it will always be a MEC.

Guess Processing Model

As explained above, the Guess objects 854 (FIG. 14) handle all guesses made during the Solve process. When appropriate, they provide as smart a guess as possible based on the item being varied and the target being used. There are currently three types of Guess routines that a particular Guess object 854 might employ.

Smart Guess Interpolative—This routine arrives at a new guess based on the relationship between the targeted value, the actual value, and the previous value and guess. It may be employed for a fixed number of attempts and this routine is generally generic for all guesses.

Smart Guess Non-Interpolative—This routine is useful to arrive at a good guess before an interpolative guess can be made. This routine can be specialized for a particular solve and target.

Binary Guess—Binary guesses are most effective once the high and low range has been narrowed. They simply identify the right amount by performing a bi-section on the guess amount relative to the previous amount and the actual result. This logic is common to all uniquely defined guesses.

In addition, guesses keep track of previously attained values (for use in interpolation), the relationship between a guess and the result and the number of smart guesses to allow.

Guesses may exist that are uniquely defined for a particular solve amount and a particular target value. (Alternatively, more generic guess objects can be utilized). Uniquely tailoring a guess to a particular solve and target will allow for optimal search logic, thus reducing processing time. The decision on whether to specialize guess objects for pairs of solves and targets will depend on the expected frequent of use, and the presence of smart algorithms.

For example, a guess object defined for the combination of Lump Puar (solve) and Cash Value (target) might use the cash value rate of Lump Puar in the target year and the premium rate in the first year to derive a first year payment which would yield the targeted cash value for the Lump Puar piece in the targeted year. This would likely be good first guess.

Validation Engine 11

The Validation Engine 11 evaluates data entered by the user from the Design Grid 10 (or any other front end system). The Validation Engine 11 is independent of the Design Grid 10 so that any front-end system that desired calculated values could also take advantage of the validation processing. In the representative embodiment, the Validation Engine 11 evaluates data to ensure that it complies with in-house standards according to an Integrated Actuarial Rates Database. Such standards assure that only valid combinations of insurance product components are illustrated and issued. The Validation Engine 11 can return error messages to the Design Grid 10 when it identifies invalid data.

The present invention's use of the graphical user interface (GUI) metaphor enables the user of the system to be the focal point of navigation around the system, rather than the system forcing the navigation on the user. That is, the user is not required to enter data according to an ordered sequence using a stepwise series of refinements. This method of data entry can be used to drive valid combinations of base product plans, riders, etc.

Given the present invention's data entry metaphor, the Validation Engine 11 addresses the problem of determining whether data inputted in the Design Grid 10 complies with the in-house standards.

Figure 19:
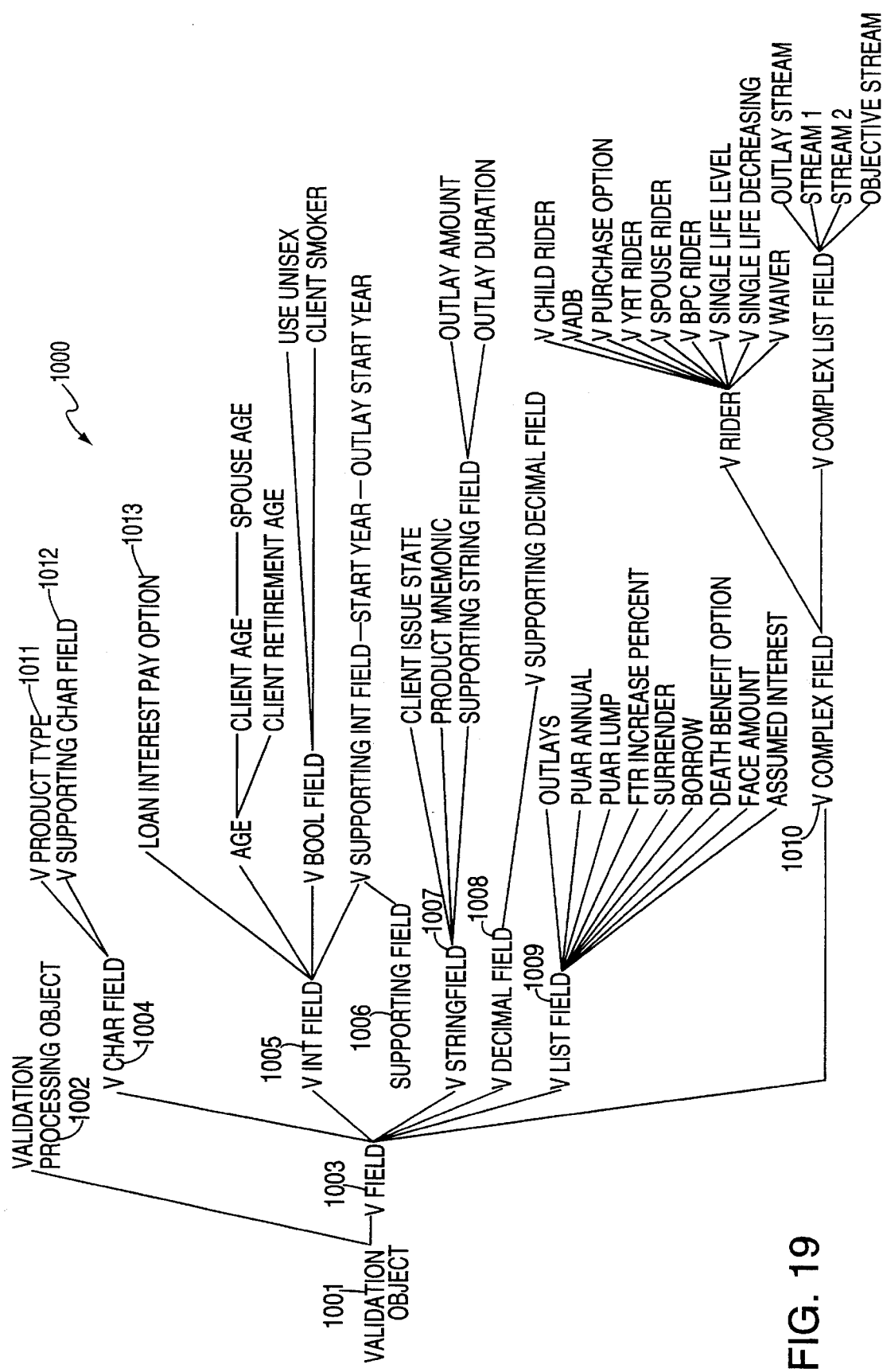
FIG. 19 is an exemplary Validation Engine Lattice utilized by the Validation Engine of FIG. 1B.

The design of the Validation Engine 11 is based on a classification hierarchy called a Validation Lattice 1000, as depicted in FIG. 19. Like the other class lattices of the present invention, the Validation Lattice 1000 processing can be based on primary object classes. In the representative embodiment, there are two primary object classes, a ValidationProcessingObject class 1002 and a VField class 1003.

The ValidationProcessingObject class 1002 is the Object Manager for all validation processing. It keeps track of all of the VField objects 1003 and provides interaction between them. The VField object 1003 represents the Design Grid 10 fields that are entered by the user. There is one VField object 1003 for each field being validated. In addition, any validation object can access any other validation object through the ValidationProcessingObject class 1002.

As in the Class Lattice 300 (of the Calculation Engine 16), the input field leaf objects that get created (instantiated) appear to the far right hand side of the Validation Lattice 1000 of FIG. 19, and inherit behavior from their super-classes as much as possible. Since, in the representative embodiment, the design is based on the Design Grid 10 fields, the leaf classes are derived from the generic VField class 1003. As shown in FIG. 19, a VDecimalFiled class 1008 (decimal field) is a kind of the Vfield class 1003 (VField). In the representative embodiment, there can be a class for each kind of data type supported by the C++ language, which was used to develop the Validation Engine 11. In addition, complex field objects can be made up of other field objects.

The Design Grid 10 fields that appear on the Proposal Window 40 can be the leaf level classes on the Validation Lattice 1000. For example, a LoanInterestPayOption class 1013 is a kind of a VIntField class 1005 (integer field). The LoanInterestPayOption object can inherit all the behavior of a VIntField object. For example, the LoanInterestPayOption object can provide its unique range of values and inherit the generic validation processes provided by its super-classes.

Figure 20:
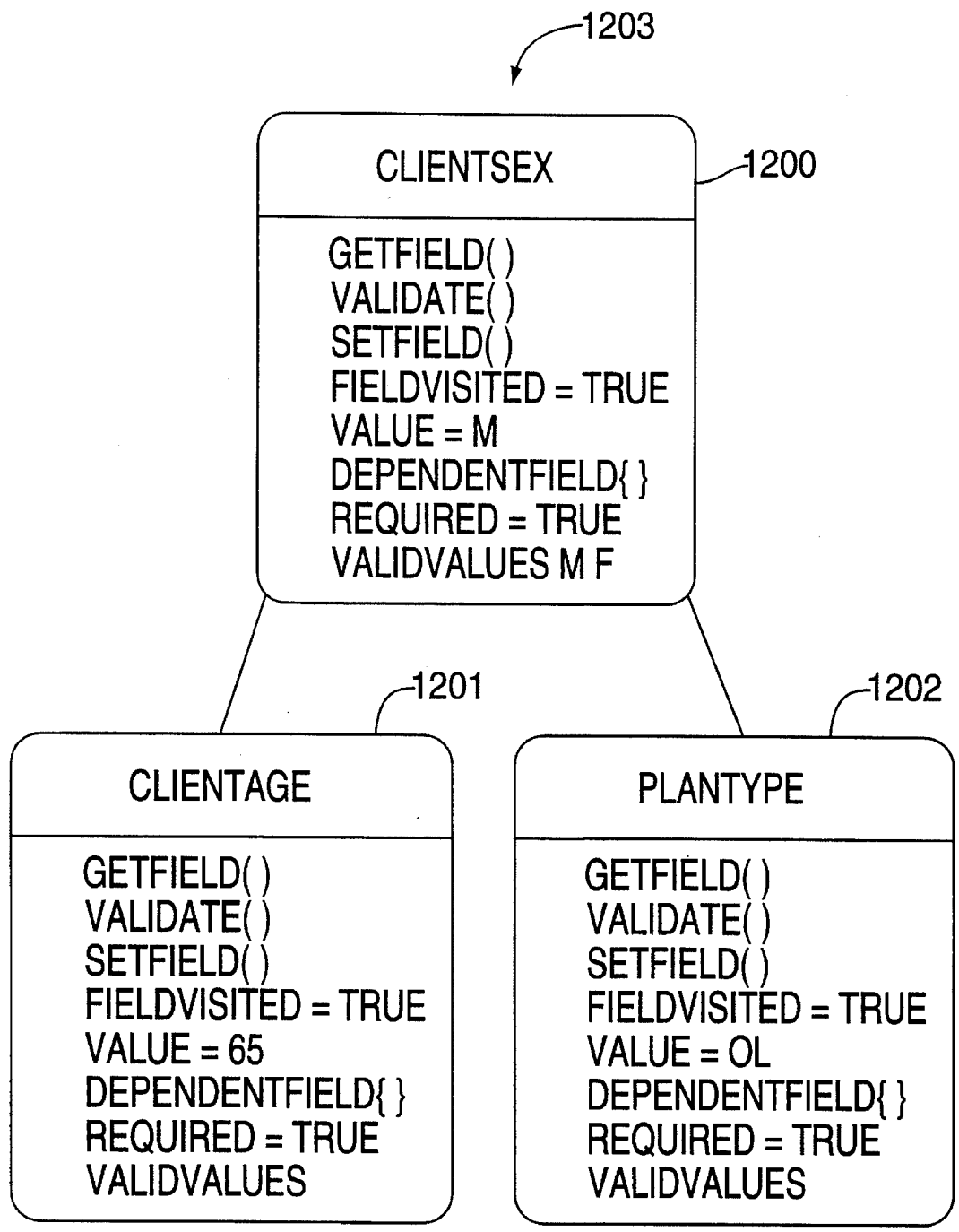
FIG. 20 are examples of Validation Engine objects.

Each validation object "knows" how to validate itself by "knowing" what its valid values are. As seen in FIG. 20, for example, a ClientSex object 1200 knows that its valid values are M and F. It might also know that it is a required field because rate access is based on sex. Each field also knows if has been visited by the user at any given point in time. If it has not, it might provide a default value.

Referring to FIG. 20, there is an illustrated example of validation objects 1203, showing how they can be used for cross field validation. The validation objects 1203 also know how to cross field validate themselves. FIG. 20 shows three validation objects. One object is a ClientAge object 1207 and it has the valve "65". Another object is a PlanType object 1202, which is an OL (ordinary life) insurance plan. In addition, there is, for example, a business standard which provides that the plan OL cannot be issued to a client over 60 years of age.

When the PlanType object 1202 field is visited and OL (Ordinary Life) is entered, the PlanType object 1203 knows that it can ask the ClientAge object 1201 field for its age. If the age violates a regulatory rule, an error can be sent to the Design Grid 10. The user, alerted to the incorrect ClientAge object 1201 and to correct the age, could visit the ClientAge object 1201 and change the data.

The ClientAge object 1201 can also contain a list of related fields (and therefore objects) that must be notified whenever a SetField function is done. For example, the ClientAge object 1201 determines that the PlanType object 1202 must be notified that ClientAge object 1201 has a new value. The PlanType object 1202 re-validates itself and no error is produced. When the ClientAge object 1201 was initially entered and the PlanType object 1202 had not been visited, no error would have been produced.

Validation Processing

The goal in validation processing is to ensure that the present invention will not illustrate a situation (e.g., design a policy or contract) that cannot actually be issued. The validation process accordingly ensures that the combination of insured, plan, available riders, amounts etc. are valid. Due to the difficulties in trying to model the administration process (including underwriting), it is necessary in some instances to take a conservative approach.

In general, the validation done by the system is based on that done by an administrative system that issues the products. The major source of data used for the creation of the rules tables that support the validation process are the various control segments in an Integrated Actuarial Rates Database (or IAR) as known in the art. Illustration, issue and administrative systems all use the IAR as the basis of these product rules and rates.

The validation process is primarily related to areas of an illustration that are impacted by user input or will impact user input (i.e. modify user input). It should be noted that additional validation can be performed within the Calculation Engine 16, which can be used to define the behavior of the various contracts, riders, etc.

Figure 21:
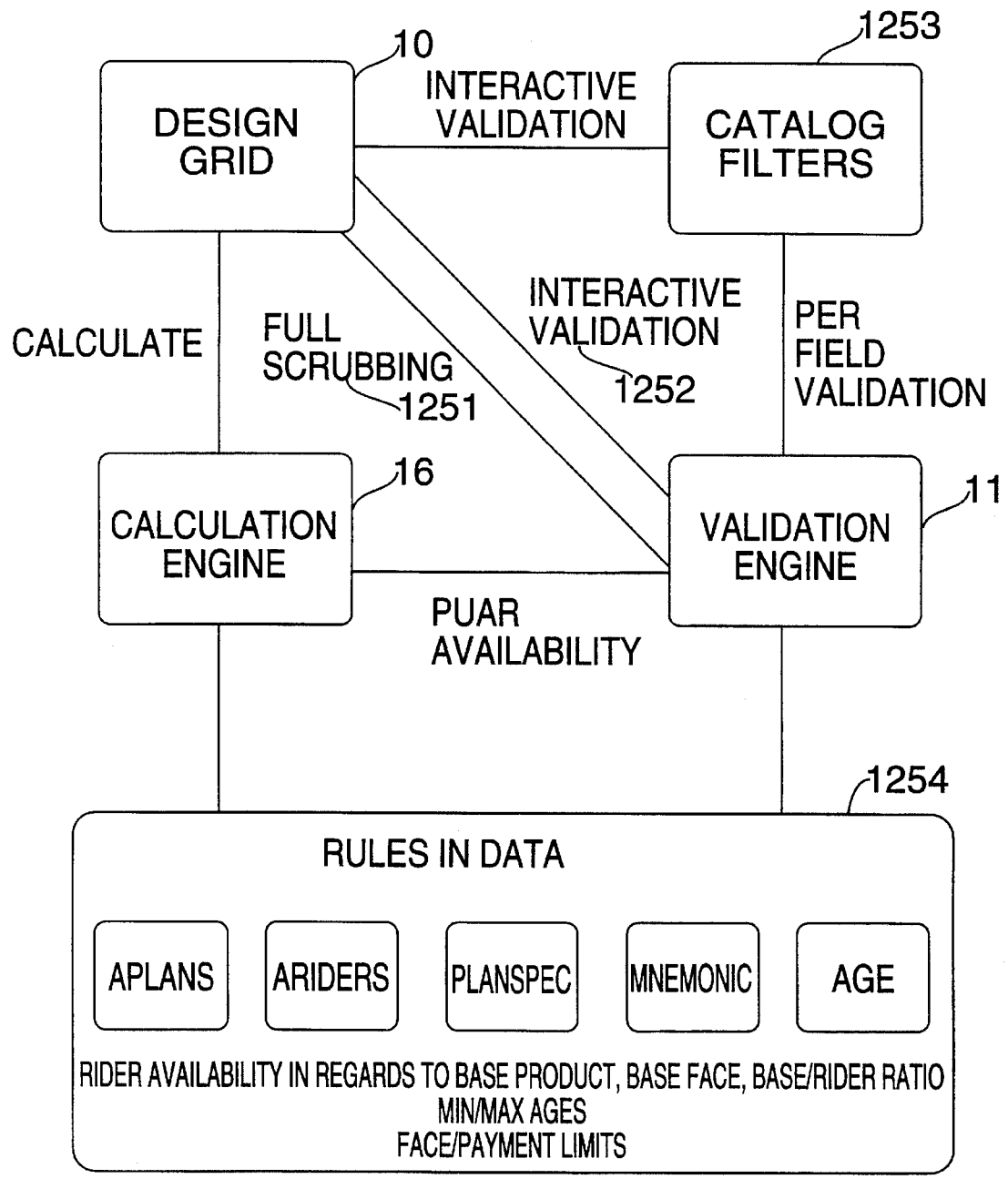
FIG. 21 is a block diagram illustrating the validation process performed by the Validation Engine.

Referring to FIG. 21, there is depicted the primary components of validation processing. The Validation Engine 11 processing can occur at different stages in the input process and errors can manifest themselves in different ways. The Design Grid 10 can work directly with the Validation Engine 11 to perform both an Interactive Validation 1252 and a Full Scrubbing 1251. It can also communicate with the Validation Engine 11 through Catalog Filters 1253 which can limit what is shown as valid selections when selecting options in the Design Grid 10. The Calculation Engine 16 can utilize the Validation Engine 11, for example, for PaidUpAdditionsRider (Puar) availability. FIG. 21 also shows that Rules In Data 1254, which are primarily derived from the IAR, support both the Calculation Engine 16 and the Validation Engine 11.

Interactive Validation

The Interactive Validation 1252 can manifest itself in the Design Grid 10 in a list box or combination box metaphor whereby values in other dependant fields limit the possible candidates that these boxes contain. For example, the selection of the base coverage will in turn determine the riders that appear in the riders dropdown list box from which the user selects appropriate riders.

Many of the allowable entries for list or combination boxes can be driven by a cataloging architecture. Catalogs are basically look up tables. The Catalog Filters 1253 are a way to limit a particular catalog by the value of dependant data fields. It can also allow the easy association of text for a catalog with its internally numeric representation. Since the Design Grid 10 allows the user to visit any field on the Proposal Window 40, in almost any order, this type of validation is limited to only a few areas.

Full Scrubbing

In the representative embodiment, a memory buffer is maintained internally while the user is visiting different fields on the Design Grid 10 and supporting dialogues. Once the user is finished editing the data and chooses to run the illustration, the Design Grid 10, before calling the Calculation Engine 16, can pass the internal memory buffer to the Validation Engine 11 for integrity. This is called Full Scrubbing 1251. The Validation Engine 11 performs the following types of validation: Per field edits (with the use of the Catalog Filters 1253); and Cross field edits, such as: base coverage availability depending on insured(s) age and unisex rates requirement; Rider availability; base face amount or payment stream minimums/maximums; dividend option/phase validation; start year and number of years validation; and valid rider combinations.

Full Scrubbing 1251 errors can be reported to the user in a log type window. If any errors occur from scrubbing then passage on to the Calculation Engine 16 is blocked. The user is then responsible for changing the input. The errors can also be displayed in the log error window and accumulated from run to run.

Examples of Types of Validation in the Representative Embodiment (a) Smoker/NonSmoker Validation The fact that an insured is either a smoker or a nonsmoker can have an impact on the rates (premium, dividend, etc.,) that apply to a policy. However, this distinction in the rates is not made if the issue age of the insured is below age twenty (i.e. there are no special non-smoker rates for these low issue ages). As a matter of convention, the rates for these low ages (0 through 19) have been included with the "smoker" (or historically standard) rates.

The validation process will not produce an error if the insured is less than age twenty and a non-smoker status is chosen (as this could be an accurate description of the insured) but it will assure that the appropriate set of rates is used.

(b) Unisex Validation

The two basic situations which require Unisex rates are:

1. The legal state for the policy requires that all policies be issued on a Unisex basis. Currently the only state that has such a rule is Montana.

2. The proposed policy is to be sold in a market where the Norris decision applies. These are basically situations where the policies are part of an employer sponsored plan.

The general rule is that if unisex rates are requested (or required) than the entire policy including any riders must be based on unisex rates. If a particular coverage (base or rider) or benefit does not have unisex rates available than that coverage or benefit is not available. For Survivorship Life policies (and any rider providing joint coverage) the joint equal age calculation will reflect the request for unisex rates.

(c) Base Plan Validation

The validation that can be accomplished with regard to the base plan of insurance (given an insured and insured information) is issue ages and face amounts.

(d) Survivorship Life

This joint product requires additional process at this stage of validation. In certain situations the individual age of each insured may be increased. This increased issue age will be subsequently used as the actual issue age for all validation and rates access. For the base plan (and riders providing joint coverage) a joint equal age calculation must be completed which will consider the age and sex of each insured and any request for unisex rates.

(e) Rider Validation

The premium payment period of the rider cannot exceed the premium payment period of the base policy. If the premium payment period of the rider does exceed that of the base policy, then the rider would have limited availability for that plan (e.g. Children's Agreement is only available for issue ages 45 through 60 for Twenty Pay Life). In other situations the rider premium for a specific plan reflects the premium payment period for the base policy (e.g. Purchase Option for Twenty Payment Life).

(f) Rider Availability by Plan

Certain riders are available based on the plan of insurance of the base policy.

(g) Rider Availability by Base Face Amount—If the Base Face Amount is less than the minimum, the rider is not available. The maximum base face is only used for validating Waiver of Premium. In a situation involving a request for Waiver of Premium, if the Base Face Amount is greater than the maximum then the waiver rider is not available.

Once Full Scrubbing 1251 has been performed and conveys that the data entered is valid, the Calculation Engine 16 can be passed the same memory buffer that was passed to Full Scrubbing 1251. At that point, objects can be created from the memory buffer and rates can be read. In the event of a problem, e.g., an internal problem such as that the rates cannot be read, errors can be reported back to the front end in the same manner as can be performed by Full Scrubbing 1251.

In the representative embodiment, certain solve scenarios can prevent Full Scrubbing 1251 from performing a complete job. For example, in a base face solve, determining the availability of riders in regards to base face amounts or rider/base face ratio is fruitless. Also because of the concept of custom solves, validation of solves and the dependant data is done in the Solve Interpreter logic of the Calculation Engine 16 of the representative embodiment before the actual solve is run. Also, any validation rule involving a premium calculation can be left to the Calculation Engine 16 since, in the representative embodiment, it cannot be done by Full Scrubbing 1251.

In the representative embodiment, much of the validation in the Calculation Engine 16 can utilize the same data structures that Full Scrubbing 1251 uses. It is possible to have non-bypassable errors in solve situations but as a general rule rider limits and/or availability are applied.

Currently messages can be passed back in the same window as the Full Scrubbing 1251 and the Calculation Engine 16 initialization errors are.

Also, in the representative embodiment, there can be limited validation within the Calculation Engine 16. Most of the information will be fully validated by the time it gets there. The validation that is left to the Calculation Engine 16 is validation that can only be done at run time either because a solve is changing a value that is an integral part of the validating process or the validation is being done on a value that changes within the Calculation Engine 16 processing.

An example of the first situation is a base face solve which is changing an amount that is used to determine a particular rider's availability. This means the availability of the rider within the Calculation Engine 16 must be checked. An example of validating an in-process value is the face amount of an increasing Flex Term Rider (FTR). The FTR may only increase up to a maximum of two times the original total death benefit. This new face amount is calculated each year and tested against this maximum.

The Calculation Engine 16 can take action in the event of that the Validation Engine 11 determines data to be invalid. In general, in the representative embodiment, the Calculation Engine 16 will take action (i.e. change input values, drop riders, etc.,) and report the action via the Validation Log. These messages will be shown in the Validation log after the run has been completed.

Appendix A

PROP data structure

```
ytypedef struct {
  PROPOSAL              Proposal;              //primary calculation input
structure
  PROPOSAL              UndoProposal;          //copy maintained for 'undo'
operations (not presently used)
  LIST                  UndoDesignAspect;      //copy of Design Aspec list maintained
for
      undo operations (not                                presently used)
  DYNAMIC_CLENT_FACTS   Client;                //Client informaition structure
used
by Calculation Engine
  HWND                  hwndMDIChild;          //Window handle to MDI child to
which this instance belongs
  HWND                  hwndData:              //not presently used
  BOOL                  bDirty: I;             //flag indicating this request has
been updated
  BOOL                  bNew: 1;               //flag indicating this request is
not
      persistent (i.e. it's new)
  BOOL                  bOptionalTargets: 1;   //notpresentlyused
  BOOL                  bDesignDetails: I;     //notpresentlyused
  BOOL                  bVaryFaceAmounts: 1:   //notpresentlyused
  BOOL                  bTermRiders: 1;        //notpresently used
  BOOL                  bCashValueRiders: 1;   //notpresentlyused
  BOOL                  bOtherRiders: 1;       //notpresentlyused
  BOOL                  bDividendDetail: 1;    //notpresently used
  BOOL                  bUlDetail: 1;          //notpresentlyused
  BOOL                  bUnderwritingOption: 1; //notpresentlyused
  int                   nLastControl;          //not presently used
  RW                    rw;                    //"Request Window" data structure
  int                   nSolveStrategy;        //used to ensure we don't redundantly
process defaults for solve
} PROP, NEAR *NPPROP. FAR *LPPROP:              // aka Proposal request
typedef const LPPROP LPCPROP;
typedef const NPPROP NPCPROP;
```

"Request Window" structure

```
typedef struct {
  SS_COORD      nLastRow;                      //last row in design grid
  SS_CELLCOORD  ssccActiveCell;                //used to "remember" active cell
  SS_CELLCOORD  ssccEditModeOn;                //used to "remember" active cell
  RECT          rectStatics[NUMSTATICS];       //rectangles of static text
  RECT          rectControls[NUMCONTROLS];     //rectangles of controls
  HWND          hWndControls[NUMCONTROLS];     //window handles for proposal request
  RECT          rectMaxMDIChild;               //not presently used
  POINT         ptGroupBox[4];                 //0 = bottom left, 1 = top left, 2= top
right, 3 =
                                               bottom right
  LIST          DesignAspect:                  //List of Design Aspects
  int           nCurrentSpinProducer;          //current producer number display
  int           nCurrentSpinInsured;           //current insured number displaying
  LIST          GridRiders;                    //List used to keep track of riders
  FARPROC       lpfnOldEditProc;               //Edit functions for sub-classing
  FARPROC       lpfnOldComboProc;              //Combo functions for subclassing
  FARPROC       lpfnOldGridProc;               //grid functions for subclassing
  UINT          MenuHelpId;                    //used in processing status bar help
  BOOL          bGridFocusFromTab;             //boolean to help in tabbing properly
  FOLDERTABS    FolderTabs;                    //folder tab struct
  SCROLL        scrollRec;                     //scrolling information
  int           nNumCombos;                    //number of combo boxes
  int           nLastCombo;                    //last combo box to create
  int           nNumTabControls;               //Number of controls in tab order
  PINT          pnTabOrder;                    //pointer to array to hold ids of controls
in tab order
  BOOL          (*pCBStrategyFunc) (LPVOID lpProp); //function to call on EN_CHANGE for
                                               Strategy
```

```
BOOL            (*pCBSolveFunc) (HWND hWndlPVOID IpProplPARAM IParam) //function to
                                                call on EN_CHANGE for Solve
BOOL            (*pRowValidationFunc)(LPVOID IpProp,int nFrontEndSolveStrategy); //function to
                                                call to set up row validation
} RW, NEAR *NPRW, FAR *LPRW;         //data needed for Request Screen
```

"Design Aspect" (DESIGN ASPECT) data structure

```
typedef struct{
int       id;                          //id of design aspec
BOOL (*pStrategyFunc)(HWND hWndLPPROP IpProp,LPVOID IpAspect.SS_COORD Col,SS_COORD Row);
//pointer to function to load strategy catalog into control
BOOL (*pAmountFunc)(HWND hWnd,LPPROP IpProplPVOID IpAspect,SS_COORD Col,SS_COORD Row);
//pointer to function to load arnount catalog into control
BOOL (*pYearsFunc)(HWND hWndlPPROP IpProp,LPVOID IpAspect,SS_COORD Col,SS_COORD Row);
//pointer to function to load years catalog into control
BOOL (*pSetAspectFunc)(HWND hWndlPPROP IpProp,LPVOID IpAspect.SS_COORD Col,SS_COORD Row);
//pointer to function called when feature is initially selected from list box
BOOL (*pSetStrategyFunc)(HWND hWndlPPROP IpProp,LPVOID IpAspect,SS_COORD Col,SS_COORD Row);
//function called when option column for this feature is changed
BOOL (*pSetArnountFunc)(HWND hWnd,LPPROP IpProplPVOID IpAspect,SS_COORD Col,SS_COORD Row);
//function called when amount column for this feature is changed
BOOL (*pSetYearsFunc)(HWND hWndLPPROP IpProplPVOID IpAspect,SS_COORD
Col,SS_COORD Row);
      //function called when years column for this feature is changed
  BOOL (*pRemoveFunc)(HWND hWnd,LPPROP IpProp,LPVOID IpAspect);//function called
when user chooses to delete
      this feature
  BOOL (*pAutoShowFunc)(LPPROP IpProp,LPVOID IpAspect);//function called
when this feature is to "auto
      display"
  char szName[30];                              //user friendly name
  DWORD dwFlags[3];                             //validation flags [0] = Product Line,
[1] = Solves,
[2] = Auto Show
INVALIDFLAGS Flags;
  BOOL              bPersistent;                //1=Aspect loaded from disk; 0= Aspect
new in grid data entry
  BOOL              bDetailAvailable;           //1=Aspect is in state where details can be
entered,0=can't get to detail
  BOOL              bDetailExists;              //1=Details exist on this aspect. 0=no
details
exist
  BOOL              bError[4];                  //error for each cell [0] = no error, 1
= error
  POSITION    Position;                         //maintains position in Rider list for Rider
aspects
  SS_COORD    Row;                              //row displayed on grid
  LPSTR       IpstrStatusBarOld[NUMSBSTRINGS];
  LPSTR       IpstrStatusBar[NUMSBSTRINGS];
  DWORD dwHelpTopicId[4];  //F1 HelpTopic ID
  VALID             CellValid[3];               //0 = Strategy, 1= Amount, 2 = Years
  int         nInstanceId;                      //Identifier for multiply occurring aspects.
e.g.
Withdrawal Surrender ==                                SURRENDER
  BOOL bAspectNotify;                  //0,FALSE = *pSet
notificaton (i.e. called from user
1,TRUE = called from notification
}FAR * LPDESIGNASPECT;
```

The "Proposal" (PROPOSAL) structure

```
#ifndef _PROPIO_H
#detine _PROPIO_H                     // prevent multiple inclusion
#ifndef _INC_WINDOWS
#include <windows.h>
endif include "_defs.h"

include "propcat.h"
#include "listni.h"
```

```
#include "array.h"
#include "calclist.h"
#include "propdefs.h"
#include "dbio.h"

#ifdef _cplusplus
  extern "C" {    /* avoid name-mangling if used from C++ */
endif ifndef PROPIO_HANDLE_DEFINED
typedef HANDLE PROPIO_HANDLE:
#define PROPIO_HANDLE_DEFINED
endif ifdef _PROPDLL_NAME
CODE_STRING(szPropIoDII, "propio.dll");
#endif

/* ProploOpen()
call after CalcInit() in calcapi.h
Use for all I/O calls in this header file

*/ typedef PROPIO_HANDLE (WINAPIX *LPPROPIOOPEN)(void);
PROPIO_HANDLE WINAPIX ProploOpen(void);

typedef VOID (WINAPIX *LPPROPIOCLOSE)(PROPIO_HANDLE io);
VOID WINAPIX PropIoClose(PROPIO_HANDLE io);

typedef VOID (WINAPIX *LPCREATEWORKFOLDERFUNC)(BOOL bPercentComplete, BOOL bDoCheck); VOID
WINAPIX CreateWorkFolderDBslfNotExist(BOOL bPercentComplete. BOOL bDoCheck);

/*
CreateProposalPickList()
Reads PROPINDX for dwClient and PROPOSAL.DB for szUserParmName
Creates a LIST of objects of typedef LPPICKPROPOSALS for the specified dwClientId.
For generic solutions, set the dwClient to zero, otherwise set it
to a known Client Id to recall the saved proposal input data
records for that client.
When the LIST is no longer needed issue a DeleteList(xxx, TRUE).
*/

/*

The following typedefs describe different LIST data structures
which are used within the PROPOSAL master data structures.
*/

// manifest constants for the field STREAM_IDs values for PROPSTRM.DB // used unternally by UO
routines.
#define _PUAR_LUMP    0
#define _PUAR_ANNUAL  1
#define _FTR_PERCENT  2
#define _OUTLAYS      3
#define _FACEAMOUNT   4
#define _DBOPTION     5
#define _ASSUMED_INT  6
#define _SURRENDER    7
#define _BORROW       8
#define _SECTIONIDS   9
#define _REPAYLOAN    10
#define _UNSCHEDULED_OUTLAY 11
#define _HYPOPERCENT  12
#define _HYPOPERCENTBELOW 13

// manifest constants for the field ANNUITY_STREAM_ID values for PROPANN.DB
#define _ANNUITYPAYMENT 0
#deftne _ANNUITYLUMP  1
define _ANNUITYSURRENDER 2 typedef struct {
int     nType;      // flag to determine if nStartYr is
                    // 1) CONTRACT_YEAR
```

```
                    // 2) AGE_YEAR
                    // 3) CALENDAR_YEAR
    int     nStattYr;    // contract year/age/calendar yeat
    decimal dAmount;     // amount or code
    int     nYears;      // number of yeat s or code
    int     nDurType;    // flag to determine if nYears is
                    // 1) CONTRACT_YEARS
                    // 2) AGE_YEAR
                    // 3) CALENDAR_YEAR
} STREAM, FAR *LPSTREAM:

typedef struct {
 int nFundld[4];
decimal dFundAlloc[4];
} FUNDALLOC, FAR *LPFUNDALLOC;

// Manifests for nAmountType and nFundAllocType
#define ANNDOLLAR  0
define ANNPERCENT 1 typedef struct {
STREAM annuityValue:
FUNDALLOC fundAlloc; int nAmountType; // Percent of salary or dollar amount
}ANNUITYSTREAM, FAR *LPANNUITYSTREAM;

typedef union {
long lSeriesPlan;
struct { short nSeries:
short nPlan; _SP;
) SERIESPLAN;

typedef struct { int nLinkCode: unt nSubLinkCode; int nType;
} LINKCODETYPE, FAR *LPLINKCODETYPE;
typedef const LINKCODETYPE FAR * LPCLINKCODETYPE;

typedef struct { LINKCODETYPE LinkCodeType; char szPlanSpecKey[6]; // key to inforce planspec
record SERIESPLAN SeriesPlan:
int     nClassCode; // COV-PLAN-CLASS-INS
int     nSuffix;    // COV-PLAN-RT-SER-SUF
char    achStatus[2]; // COV-STAT-CD
char    achSexCode[2];  // COV-SEX-CD
int     nIssueAge; // COV-ISS-AGE
WDATE   dtAnniversary;    // COV-POL-DT
WDATE dtPaidUpRenewal; // COV-PD-UP-RENEW-DT
WDATE   dtMatyExpy;    // COV-MATY-EXPY-DT
decimal dUnits; // COV-UNIT
decimal dDBPerUnit;    // COV-DTH-BEN-UNIT decimal dCovAnnualPremAmt: // COV-GAP-UNIT
{ COVERAGE, FAR *LPCOVERAGE;
defune COVFlELD(ptr, fieldname) ((LPCOVERAGE)ptr)->fieldname typedef struct {
LINKCODETYPE LinkCodeType;
char szPlanSpecKey[6];   // key to inforce planspec record
unt nBenefitType;     // BEN-TYP-CD
decimal dUnits;       // BEN-PRIV-UNIT
WDATE dtCease;         // BEN-PRIV-CEASE-DT int nIssueAge;        // BEN-PRIV-ISS-AGE
WDATE dtAnniversary;   // BEN-PRIV-ISS-DT
WDATE dtPaidUp;        // BEN-PRIV-PD-UP-DT
decimal dBenAnnualPremAmt; // BEN-PRIV-AN-PREM-UNIT
decimal dDBPerUnit;       // fudged for Illustration purposes
} _BENEFIT, FAR *LPBENEFIT;
define_BENFIELD(ptr, fieldname) ((LPBENEFIT)ptr)->fieldname typedef struct {
LINKCODETYPE LinkCodeType;
int nChgFreqNoYr;

WDATE dtChgDate;
int nNumChanges; decimal dChgAmount;
} CHANGE, FAR *LPCHANGE;
```

```
typedef struct { LINKCODETYPE LinkCodeType; decimal dSpecArnount: int nTableRating; WDATE
dtSpecPdUp; SPECIAL_CLASS, FAR *LPSPECIAL_CLASS;

//rnanifests for nCovBenType
#define IGNORE_COVBENSECTION 0
#define IS_BENEFIT
#define IS_COVERAGE     2

// handy macros for accessing Coverage and Benefit info in RIDER struct
#defume RCF(fieldname) CovBen.Cov.##fieldnarne
#define RBF(fieldname) CovBen.Ben.##fieldnarne
#define_RCF(ptr, fieldname) (ptr->RCF(fieldname))
#define_RBF(ptr, fieldname) (ptr->RBF(fieldname))

typedef struct {
 union _tagCOVBEN {      // must be offset 0 for FindLinkNode()
   COVERAGE Cov;
   _BENEFIT Ben;
 } CovBen;               // Use above macros
 char szMnemonic[9];     // Rider pseudo-mnemonic
 STREAM Amount;
 BOOL    bUseUnisex;     // for single life term riders
 int     nYears;         // number years of rider (for single life decreasing term)
                         // or for joint life temp flat extra years #1
 int    nClassFactor;    //extrapremium factor2
 int    nIndicator;      // for Waiver Indicator for Client or Spouse
 decimal dFlatExtra[3];  // 0 flat extra perm, 2 flat extra temp (for Joint life term only)
 int nYears2;            // for joint life temp flat extra years #2
 int nCovBenType;        // see nCovBenType above on how to interpret following union
} RIDER, FAR *LPRIDER;

typedef struct {
 char achPrefix[2];
 char szPolicyNum[9];
 char szDuplicateInd[3];
 char szAlphaCode[4];
} POLICY_NUMBER. FAR *LPPOLICY_NUMBER;

#ifndef _CALCINTN typedef HANDLE PContext; // calc engine context handle typedef HANDLE
PFContext; // calc file context handle #endif typedef struct {
WORD      wFormatted;        // set to a signature by FormatProposal().
DWORD dwUserParmKey;
char      achProductType;    // from GetPlanInfoArray()
char      szUserParmName[55];
int       nBusinessPlan;     // for FE use only
int       nPaymentStrategy;  // for FE use only
int       nSolveStrategy;    // for FE use only
int       nMarketId;         // for FE use only
int       nSolveOption;
char szProductMnemonic[13];  // used in CreateBaseCoverage()
decimal dPremiumPayment;
int nPremiumMode;            // aka Outlay mode, 12 for Annual, etc.

// Tamra fields
int nTaxMecStatus;           // MEC Status
BOOL     bTaxQualify;
BOOL     b1035Exchange;      // TRUE or FALSE
decimal  d1035Basis;         // ignore unless previous field TRUE
BOOL     bUnMec;             // Set to TRUE for Unmec Solve decimal  dLoanCap;           // dollar amount or code
decimal  dSurrenderCap;      // dollar amount or code
decimal  dLoanIntRate:
int nLoanIntPayOpt;          // if == IGNORE_VAL (means no loan interest option)
decimal  dTaxRate;
int nTargetOptionCode;       //
STREAM Target;               // nYears ignored used nStartYr to trigger target year
int      nFundingOption;     // if == IGNORE_VAL (means no funding option)
LIST     Riders;             // uses RIDER struct
int      nLevelOutlayYr;     // contract year
LIST     Outlays;            // uses STREAM struct
LIST     FaceAmount;         // uses STREAM struct
```

```
        int     nSurrenderType; // OBJECTIVE_WITHDRAWL or OBJECTIVE_INCOME
        int     nGrossNetOutlay; //_GROSS or_NET
        LIST    Surrender; // uses STREAM struct
        int     nBorrowType; // OBJECTIVE_WITHDRAWL or OBJECTIVE_INCOME
        LIST    Borrow;   //uses STREAM struct
        LIST    LoanRepayment;    // uses STREAM struct
        DWORD dwAncestralUserPatm;
        decimal dAutomaticIssue; // 0 if fully underwritten, else automatic issue limit
        int nTargetCrossoverYr; // contract year
        int nTargetCrossoverYrType:   // contract/age/calendar code
        int nTargetCushionYr;// contract year or AFTERVANISH
        int nTargetCushionYrType;   // contract/age/calendar code
        decimal dTargetCushionAmt;   // dollar aunount or PREMIUM
        STREAM SideFund;
        decimal dSideFundIntRate;
        int nGrossNetSideFund: //_GROSS or_NET
        int nZeroAutoOutlayYr: // Fill with -999 if you want Automatic Zero Outlay Solve
        int nPolicyChangeType; // for future use
        decimal dAfterTaxCostofMoney:

// Tl Specific Section
        decimal dTotalDeathBenefit;
        LIST     HypoPercent;// uses STREAM struct - hypo above
        LIST HypoPercentBelow;     // uses STREAM struct int nReducePaidUpYear:      // if == IGNORE_VAL
        (means no reduce paid up year) int nReducePaidUpYearType; // contract/age/calendar code BOOL
        bAlboOption;        //Oor 1 int nDividendOptionTypeLMAX_DIV_PHASES [_MAX_DIV_PRIORITrES]; int
        nDividendDuration[_MAX_DIV_PHASES]; 1/ int nDividendDurTypeLMAX_DIV_PHASES]; //CONTRACT_YEAR,
        AGE_YEAR, CALENDAR YEAR
        LIST     PuarLu np;// uses STREAM struct
        LIST     PuarAnnual;// uses STREAM struct
        LIST     FtrIncreasePercent;// uses STREAM struct
        BOOL     bDiscountPremium;//Oor 1
        int      nYearsToDiscount;// new issue
        decimal dDiscountPremRateL2];// 0 - Ist ten years. 1 rest
        STREAM AlboYears;   // nStartYr ignored used nYear to trigger albo years
        decimal dSpecifiedReducedBaseFace; // used for Reduce Base Face Solve
        STREAM ReduceBaseFaceYear;// nYears ignored used nStartYr to trigger years
        BOOL bRelativeHypo;

// Ul Vl Specific Section
        decimal CurrentInterest;
        LIST DeathBenefitOption;// uses STREAM struct
        LIST AssumedInterest;// uses STREAM struct
        LIST UnscheduledOutlays;// uses STREAM struct // Design fields
        int uaVanhiishYpamr assisted vanish solve
        int nVanishiteamThylage/calendar code // Annuity fields.
        LIST    AnnuityPayrnent;// use ANNUITYSTREAM struct
        LIST    AnnuityLump;    // use ANNUITYSTREAM struct
        LIST    AnnuitySurrender; // use ANNUITYSTREAM struct
        int     nfundAllocType;   // 0 for dollar amount. 1 for percentage
        int     nMaturityAge;
        int     nObjective;
        TDATE dtInitialPayrnentDate;
        int nValuationMonth;
        BOOL bAlternateInde; // 0 = FALSE, 1 = TRUE
        int nVariableOptionL2]; // Annuity variable settlement options
        int nFixedOptionL2]; // Annuity fixed settlement options
        decimal dAnnAssumedIntRate;

// Illustration Section
        ARRAY SectionIds;    //1 to n section ids
        // see sectids.h each item in array
        // is SECTIONID
        char szSectionldFileName[9]; // binary file holding section id info
        char szSavedLedgerFileName[9]; // for reprinting ledgers with no calcs
        int nYearsToIllustrate; // checkbox on Presentation Dlg screen
        BOOL   bPrintScenarioRates;   // checkbox on Presentation Dlg screen // Inforce Section
        BOOL    hIsInforce;// TRUE if inforce proposal else FALSE
```

```
        LIST BaseCov;          // uses COVERAGE structs char szPolicyStatusCode[3]; // POL-STAT-CD char
        achDividendStatusCodeL2]; // DIV-STAT-CD
        WDATE dtLastPolicyAnniversary; // LAST-POL-ANV-PROC-DT
        WDATE     dtlnforceLastRefresh;   // as of Date inforce information
5       decimal dLoanBalance; // LN-BAL (see dLoarlIntRate above for loan interest rate)
        decimal   dLoanInterestDue;  // LN-INT-DUE-CUR-AN
        WDATE dtLoanlnterestDueDate; // LN-INT-DUE-DT
        decimal   dCurrDividendAmount;     // DIV-AMT-TOT
        WDATE     dtDividendCredit;    // DIV-CR-DT
10      decimal   dPrevPuarCost; // PREV-PUAC-COST
        decimal   dNextPuarAmount;     // NEXT-YEAR-PUAR
        decimal   dAlboAmount; // GPL-PUAR-LEVEL-BILL-AMOUNT
        decimal   dAccumsDeposit;   // DEP-BAL
        decimal   dAccu nsLastlnt;   // DEP-LAST-AN-INT
15      decimal   dDivAddsFaceArnount;     // PD-UP-ADDS-CUR-FACE-AMT char      achRedCashDivType[2];    // RED-TYP-CD
        decimal   dRedCashDivAmt:    // RED-DIV-AMT
        decimal   dOYTFaceArnount;   1/ TERM-ADDS-CUR-FACE-AMT
20      decimal   d7PayAccruedPrem;     // ADM-7PAY-ACCRUED-PREM
        decimal   d7PayLirnit;// ADM-7PAY-LIMIT
        int n7PayDuration; // ADM-7PAY-DURATION
        decimal   d7PayDeathBenefit;    // ADM-7PAY-DEATHBENEFIT
        decimal dAIMaxDBCaporTermlnsCap; // AI-MAX-DB-CAP or TERM-INS-CAP
25      decimal   dOldAPFace; // OLD-AP-FACE
        decimal   dModalPremium;    // BILL-MODE-PREM
        decimal   dGrossAnnualPremium;     // BLL-GAP
        int nBillTypeCode; // BILL-TYPE-CODE
        WDATE dtBillPaidToDate;     // BILL-PD-TO-DATE
30      int nBillFrequency;// BILL-FREQ
        int nBillModeRuleCode; // BILL-MOD-RULE-CD
        decimal dBillPolicyFee; // BILL-POL-FEE
        WDATE dtBillToDate;  // BILL-TO-DATE
        WDATE dtPremAnniversary;     // PREM-ANNIV
35      POLICY_NUMBER PolicyNumber;
        int nBorrowRepayType;  // 0 = None, 1 = Borrow. 2 = Repay, 3 = Tot Surr
        WDATE dtBorrowRepayDate;    // DATE TO BORROW, REPAY LOAN OR SURRENDER
        decimal dBorrowRepayAmt;    // AMT TO BORROW OR REPAY LOAN
        decimal dTermAddsCurCost;   // TERM-ADDS-CUR-COST
40      int nPuarStatus;       // PUAC-COST-STATUS
        decimal   dModalPuarDBUnits;    // DIV-MOD-PUAR-DTH-BEN-UNITS
        decimal   dModalPuarCurrUnits;     // DIV-MOD-PUAR-CUR-YR-UNITS
        decimal   dModalPuarCulTPymts;    // DIV-MOD-PUAR-CUR-YR-PUAR-COST
        decimal   dModalPuarPayment;    // DIV-MOD-PUAR-PREMIUM
45      decimal   dTennLnsCap; // TERM-INSURANCE-CAP
        char      achOwnerCode[2];    // OWN-CD
        char      szPolIssueSt[3];// ISS-ST
        char      achLnTypIntCalcRule[2];     // LN-TYPE-INT-CALC-RULE
        char achDirectLoanRecCod[2]; // DIRECT-LN-RECOG-CD
50      LIST SpecialClass; // uses SPECIAL_CLASS struct
        LIST Change;          // uses CHANGE struct
        char achV12VanishPremInd[2]; // VL2-VANISH-PREMIUM-IND
        int nCustomLifeGuarYears; // COV-GUAR-NO-OF-YRS
        decimal dCustomLifeCurrYrUnits; // COV-CURR-YR-AP-UNITS int nEconomaticGuarFullProtectionYrs;//
55      GUAR-FULL-PROTC-PERIOD
        decimal dSaveLoanlntDue;   // SAVE-LOAN-INT-DUE
        WDATE dtSaveLoanIntDueDate:    // SAVE-LOAN-INT-DUE-DATE
        decimal dLastYrDivAmt;   // LAST-YR-DIV-AMT
        char achLastYrDivStatInd[2];    // LAST-YR-DIV-STAT-IND
60      int nFutureLvlBillStartYr;   // ADMIN-FUT-LVL-BILL-START-YR
        decimal dFutureLvlBillAmt;    // ADMIN-FUT-LVL-BILL-AMT
        WDATE dtPurchOptNextOptDate; // BEN-PRIV-NEXT-OPT-DT
        int nPurchOptNextOptCode;  // BEN-PRIV-NEXT-OPT-CALC-X
        int nTermAddsSpecClassCode;    // TERM-ADDS-SPC-CLAS-CD
65      char szSavedlnforceRates[9];   // rates and planspec filename
        WDATE dtDiscountDate;   //
        ARRAY PlanInfo;     // inforce planspec rules // Error Section
70      ARRAY Errors;        // use ArrayGetBufAddress to access
        // LPERROR_INFO structs
        // >>>NOT STORED/READ by I/O routines
        // OR duplicated by CopyProposal()<<<
```

```
} PROPOSAL, FAR *LPPROPOSAL, NEAR *NPPROPOSAL;

typedef const PROPOSAL FAR *LPCPROPOSAL;

/*
UpdateProposalInfo() updates PROPOSAL.DB, PROPRIDR.DB, PROPSTRMpB, and PROPNEED.DB.
Does NOT update the associative link PROPINDX.DB between Client
and proposal info. See ProposalClientAssociation() for that.
manifests for wSaveFlags
#define APPEND_REC #define UPDATE_REC
#define DELETE_REC
actual definitions in dbio.h.
The only PROPOSAL field required for DELETE_REC is dwUserParmKey!!!
returns the userparm key if update successful else 0
*/

DWORD WINAPIX UpdateProposalInfo(PROPIO_HANDLE io, LPPROPOSAL IpProposal, WORD wSaveFlags);
/*
GetProposalInfoO reads PROPOSAL.DB for a match on dwUserParmKey.
If PROPOSAL struct is already formatted, then an UnformatProposal()
is issued. Issues a FormatProposal() on PROPOSAL struct.
If dwUserParmKey found then all information will be formatted
into the PROPOSAL struct for the respective product type: TL, UL, VL, etc. The LISTs
The LIST of Riders comes from the PROPRIDR.DB table, LIST of Needs comes from
PROPNEED.DB where all the other lists come from PROPSTRM.DB.
For the default solution, set the dwUserParmKey to zero.
Returns TRUE if information found, else FALSE.
*/
BOOL WINAPIX GetProposalInfo(PROPIO_HANDLE io, LPPROPOSAL IpProposal, DWORD
dwUserParmKey, int iNodeExtraBytes);

typedef struct {
DWORD dwClassId;
    char    szFName[21];
    char    szLName[81];// organization name too.
    char    szIssueState[3];
    char    achSex[2];// 'M', 'F, or 'U' for unisex
    int     nSmokerStatus;// 0 for preferred, 1 for standard, 2 for super select
    int     nAge;
    int     nRetirementAge;
    TDATE dDOB;
    int nTableRating;  // table rating
    decimal dFlatExtra[3];    // 0 flat extra perm, 1 flat extra templ, 2 flat extra temp2
    int     // 0 for flat templ yr, 1 for flat temp2 yr
int nTitle;         // Prefix/Title
int nSubtitle;      // Suffix/SubTitle
} CLENTINFO, FAR *PCLIENTINFO;

typedef struct {// single producer information
    long IProdId;
    BOOL bOldBlank;
char szFName [ _MAX_PRODFNAME + I ];
char szLName [ _MAX_PRODLNAME+ I ];
) APRODUCER, near *P_APRODUCER, far *LP_APRODUCER;

typedef struct {          // producer information int nProducers; APRODUCER Producer [
_MAX_PRODUCERS ];
} PRODUCERINFO, near *P_PRODUCERINFO, far *LP_PRODUCERINFO;

typedef struct { DWORD dwUserParmKey; CLENTINFO ClientSpouse[_MAX_CLENTINFO]; // 0 for Client, 1
for Spouse int    nClients;       // nu nber of clients int    nAgeYoungestChild: BOOL
bUseUnisex: char szOutputColumnPathName[9]; DWORD dwFolderKey;
TDATE    dLastUpdate;
int     nProducerId LMAX_PRODUCERS];
int     nAgencyId;
decimal  dJtFlatExtra[3];// This is for the flats that come out of the
int     nJtFlatExtraYrs[2];// "Black Box" for substd Survivorship products
decimal  dTioSubstdPercent;  // This is for TIO substd. It also comes from the "Black Box"
BOOL     bIncreaseIointAge;  // This is only for survivorship substd
int     nSubstandardYears;// SPC-PD-UP-DT for base
int     nReduceToTableDYears;  // reduce to table D years for base
I DYNAMIC_CLENT_FACTS, FAR *LPDYNAMIC_CLENT_FACTS;
typedef const DYNAMIC_CLENT_FACTS FAR *LPCDYNAMIC_CLENT_FACTS;
```

```
/*
ProposalClientAssociation()
Gets or Updates or Deletes associative link of client and userparm PROPINDX.DB
depending on wFlag.
Returns TRUE if successful else FALSE.
The szName field is basically ignored by this API. It is there for programming
convienance.
NOTE: Get requests that fail, return the buffer (IpClientFacts) unchanged.
*/

// rnanifests constants for wFlag
#define GET_CLENT_DYNAMIC_FACTS  0x01 // updates IpClientFacts
#define UPDATE_CLENTpYNAMIC_FACTS  0x02 // uses IpClientFacts
#define DFT FTE_CLIENT_DYNAMIC FACTS 0x03 // ignores IpClientFacts, deletes one record is
associative defineGET_PRODUCER      0x01 //updateslpProp->ProducerInfo
define UPDATE_PRODUCER    0x02 // updates PROPPROD table from IpProd->ProducerInfo
define DELETE_PRODUCER    0c03 // deletes PROPPROD records BOOL WINAPIX ProposalClientAssociation( PROPIO_HANDLE io, DWORD      dwUserParrnKey, // always
required LPDYNAMIC_CLENT_FACTS IpClientFacts, // required on get and update, ignored on delete
WORD     wFlag ); BOOL WINAPIX ProposalProducerAssociation( PROPIO_HANDLE io, DWORD
dwUserParmKey, // always required LP PRODUCERINFO IpProducerInfo, WORD    wFlag );

BOOL WINAPIX ChangeFolderForProposalClientAssociation(PROPIO_HANDLE io, DWORD dwUserParmKey, //
input DWORD dwFolderKey);
/*
**************************************************************

Helper Functions

**************************************************************
/*
FormatProposal()
First invokes UnformatProposal()
NULLS out total PROPOSAL struct. in
itializes achProductType in PROPOSAL struct. Initializes all LISTs to empty.
Sets the wFor natted to FORMATTED_SIGNATURE;
Return TRUE if successful formatting accomplished.
*/

BOOL WINAPIX ForrnatProposal(LPPROPOSAL IpProposal);

/*
UnforrnatProposal() if wFormatted != FORMATTED SIGNATURE
does nothing
else
Issues a DeleteList(xxx, TRUE) against all LISTs.
then NULLs out entire PROPOSAL struct. Sets wForrnatted to 0.
*/

VOID WINAPIX UnforrnatProposal(LPPROPOSAL IpProposal);

// IsDividendOptionPresent() - Loops through the dividend phases and priorities to find
// a match for the nDividendOptionType. Returns TRUE or FALSE and updates IpPhase and
IpPriority.
BOOL WINAPIX IsDividendOptionPresent(LPCPROPOSAL IpProp, // long pointer to proposal structure
int nDividendOptionType, // use manifests
LPint IpPhase,     // address of an integer to update for the phase where div opt found
LPint IpPriority);    // address of an interer to update for the priority where div opt found // IsRiderPresent() - searches riders list for a match on mnemonic and client/spouse
// indicator - returns long pointer to RIDER struct if found otherwise NULL
LPRIDER WINAPIX IsRiderPresent(CLIST RidersList,    // identifies riders list
LPCSTR IpszMnemonic. // use manifests int nClientSpouse.    // 0 for client, I for spouse
        LPPOSITION IpPos);// address of a position variable (updated by this
function)

int WINAPIX JointEqualAge(int nClientAge,
        char achClientSex.
        int nSpouseAge,
        char achSpouseSex.
```

```
           BOOL bUseUnisex);

void WINAPIX ExtraMortalityExpected(int nTableRating, decimal dTotalFlatExtra, LPdecimal
lpExtraMortalityExpected);

BOOL WINAPIX IsAJointPlan(LPCSTR pszBaseCoverageType);
BOOL WINAPIX IsAJointPlan2(LPCPROPOSAL IpProposal); // better than previous, supports inforce define SUPERSELECTRISK 'Z' BOOL WINAPIX IsSuperSelectAvailableForPlan(LPCSTR
pszBaseCoverageType); int WINAPIX IncreasedAgeAdjustment(int nClientAge, int nTableRating); BOOL
WINAPIX IsRetirementAge(int n); LPSTR WINAPIX NormalizeStartorEndYear2Str(int n, LPSTR
IpszReturnBuf. int nSizeReturnBufl;

#if 0 Front ends should call NormalizeStartorEndYear2Str() for display of start year and
duration/number of years that are stored as ints. Front ends should call
DeNormalizeStartorEndYearStr2Int() for storage of start year and duration/number of years that
are stored as ints. Calc engine and propio require this. supports the following strings: "x" -
where x is a nurnber string - e.g. " 10" "R" - clients retirement age "R-x" - clients retirement age - number string e.g. "R-10" white space not supported
"R+x" - clients retirement age + number stnng e.g. "R+10" white space not supported
"M" - maturity/all years #endif int WINAPIX DeNormalizeStartorEndYearStr2lnt(LPCSTR
IpszSourceBuf);

// for use internally by calc engine and validation engine int WINAPIX NormalizeYear(int
nDenormalizedYear, int nRetirementAge, int nAge, int nIssueYear); int WINAPIX
NormalizeDuration(int nDenormalizedDuration, int nNormalizedYear. int nRetirementAge, int nAge);

// use manifests for nStartType of STREAM un propdefs.h
// converts nAgeYear to contract year int WINAPIX NormalizeAgeYear(int nType, int nAgeYear, int
nRetirementAge, int nAge, unt nlssueYear);

// following actual copies entire contents of IpProp to IpTrg
// duplicating the LISTs. (a copy is made);
BOOL WINAPIX CopyProposal(LPPROPOSAL IpTrg, LPCPROPOSAL IpProp);

// use following functions to allocate any pointers added to LISTS
// this function memsets buffer to zero
LPVOID WINAPIX PropMalloc(int nSizeAllocation);

// use following functions to free any pointers that are not in LISTS
// allocated with PropMalloc()
VOID WINAPIX PropFree(LPVOlD IpVoid);

// manifests for nMode in FindLinkNode() #define FIND_FIRST_NODE I #define FIND_NEXT_NODE 2
#define FIND_PREV_NODE 3 #defneFIND_LAST_NODE 4 /* FindLinkNode() Assumes nodes in SearchList
contain a LINKCODE at offset 0. Matches IpSearchLink. For searching for a specific set of types,
set cTypeCount to the number of types you want to search for and pass the type values
afterwards. This function will walk the stack depending on cTypeCount. This assumes that the
SearchList actually contains a LINKCODETYPE at offset 0. *1

LPLINKCODETYPE CAPIX FindLinkNode(int nMode, LPCLINKCODETYPE IpSearchLink, LIST SearchList,
LPPOSITION IpReturnPos, int cTypeCount, ...);

MultipleClientAssociationsforWorkFolder()
Returns number of Client Ids associated with Work Folder.
*/ int WINAPIX NumberOfClientAssociationsforWorkFolder(PROPIO_HANDLE io, DWORD dwUserPannKey);

// use APPEND_REC. DELETE_REC, UPDATE_REC for wSaveFlags DWORD WINAPIX
UpdateFolderlnfo(PROPIO_HANDLE io, DWORD dwKey, LPCSTR IpszFolderName, WORD wSaveFlags);

typedef struct{
DWORD dwKey;
char szFolderName[51];
short nSequence;      // FE can ignore this
} PROPFOLDER, FAR *LPPROPFOLDER;

LIST WINAPIX CreateFolderPickList(PROPIO_HANDLE io);

// sequence for folder list is implicit by order of LIST BOOL WINAPIX
ReSequenceFolders(PROPIO_HANDLE io, LIST FolderList);
```

```
//================================================ typedef struct
{ DYNAMIC_CLIENT_FACTS ClientFacts;
int nPaymentStrategy;
int nSolveStrategy;
char achProductType;
char szProductMnemonic[FIELDSIZE(PROPOSAL, szProductMnemonic)];
char szUserParmName[FIELDSIZE(PROPOSAL, szUserParmName)];
} PICKPROPOSALS, FAR *LPPICKPROPOSALS;

// use CreateProposalPickList() to get all proposal requests associated with
// a folder. LIST WINAPIX CreateProposalPickList(PROPIO_HANDLE io, DWORD dwFolderId);

// use CreateProposalPickListForClassClient() to get all proposal requests associated with // a
CLASS client id. typedef LIST (WINAPIX *LPCREATEPROPOSALPICKLISTFORCLASSCLIENT)(PROPIO_HANDLE
io, DWORD dwClientId); LIST WINAPIX CreateProposalPickListForClassClient(PROPIO_HANDLE io, DWORD
dwClientId);

// use NumberofProposalsRequestforClient() to determine number of stored proposal requests //
for a client int WINAPIX NumberofProposalsRequesfforClient(PROPIO_HANDLE io, DWORD dwClientId);

I* Use BulkDeleteProposals() to delete many proposals, pass a list which was created either from
CreateProposalPickList() or CreateProposalPickListforClassClient(). Use the following manifests
if you want this function to either issue a DeleteList() or EmptyList() against the list. *1

// manifests for fListAction flag #define ISSUE_DELETE_LIST_AFTER_DELETE 0x01
//issuesDeleteList(lpList,TRUE)before return #define _ISSUE_EMPTY_LIST_AFTFR_DELETE 0x02 //
issues EmptyList(*lpList) before return typedef BOOL (WINAPIX
*LPBULKDELETEPROPOSALS)(PROPIO_HANDLE io, LPLIST IpList, UINT flListAction); BOOL WINAPIX
BulkDeleteProposals(PROPIO_HANDLE io, LPLIST IpList, UINT flListAction);

/** Inforce Conversion function **/
// struct used to populate inforce policy values
typedef struct {
PROPOSAL    Prop;
DYNAMIC_CLENT_FACTS Dcf;
} INFLISTITEM, FAR *LPINFLISTITEM;

/** main function which populates the inforce fields of proposal struct **/
LIST WINAPIX Pmr2PropStruct(VOID);
BOOL WINAPIX DeleteInforceRates(LPSTR IpszCompiledRateFileName);

/*
***********************************************************

Error Helper Functions
***********************************************************
*/

// manifests for error types
#define INFORCE_CONVERSION 0
#define SCRUBBING #define CALCENGINE 2
#define HOST_SYSTEM 3
#define HOST_APPLICATION 4 typedef struct {
  UINT   nErrorType: 4;   // see above manifests
  UINT   nByPassable: 1; ;  //T/F
  UINT   nField;   // ignore if zero else used by scrubbing/calc engine to identify field in
error
  UINT   nSubField;   // ignore if zero else used by scrubbing/calc engine to identify subfield
in
error
  UINT   nRelatedField;   // ignore if zero else used by scrubbing/calc engine to identify field
in
error
  UINT   nErrorCode;   // error number -
LPSTR IpszErrorMessage; // user friendly message
} ERROR_INFO, FAR *LPERROR_INFO;
// AddPropError() error types other than HOST_SYSTEM or HOST_APPLICATION types
// should put there error message in the string table of propio.rc
BOOL WINAPIX AddPropError(ARRAY Errors,
UINT nErrorType,
UINT bByPassable,
```

```
            UINT nFieldInError, // for scrubbing
            UINT nSubFieldlnError, // for scrubbing
            UINT nRelatedFieldInError, // for scrubbing
            UINT nErrorCode, // use value from valdefs.h
  5         LPCSTR IpszErrorMessage);
            VOID WINAPIX ScratchPropErrors(ARRAY Errors); // call to purge errors ifdef _cplusplus

10         #endif endif

15         "Grid Rider" (GRIDRIDER) structure typedef struct{
             char szName[DEFREQSIZE];      //user friendly name
             char szufMnemonic[25];        //user friendly mnemonic
 20          char szRealMnemonic[13];      //real mnemonic
             BOOL bAvailable;              //available for product in question
             BOOL bUsed;                   //has been used as an aspect row
            }FAR * LPGRIDRIDER;

25         Cell Validation (CELLVALID) data structure typedef struct (
            BOOL    bRequired  //0 = value in szDefReq is default, 1 = value in szDefReq is
            Required
 30         char    szDefReq [DEFREQSIZE]//Defaultorrequiredvalue
            LPSTR        IpstrValid    //universe of valid values (tab delimited)
            LPSTR        IpstrSaveValid//saved validation buffer (used when updating
            details)
            BOOL (*pValidationFunc) (LPPROP IpProp,LPVOlD IpAspectlPSTR IpStr) //validation function to
 35         call upon solve
                      notification
             BOOL (*pDefaultFunc) (LPCPROP IpProplPVOID IpAspect)//default function
            to call upon solve
                             notification
 40          char   cType       //Cell type manifest from Drovers e.g.
            SS_TYPE_COMBOBOX
             long    IStyle        //cell type style
             int    nErrorStringId    //error string
             decimal       dMax          //maximum value -- not used
 45         VALID, NEAR *NPVALID. FAR *LPVALID //validation structure
```

What is claimed is:

1. A computer implemented graphical user interface displayed on a computer screen for receiving instructions and information relating to a plurality of insurance products, and for displaying an insurance proposal related thereto, the graphical user interface comprising:

an insured section for receiving personal information about a person to be insured;

a product design section for receiving information specifying an insurance product being one of the plurality of insurance products and for specifying the components of the insurance product, the product design section including a product line box enabling selection of an insurance product line, a strategy box enabling selection of a strategy for a selected insurance product line, a solve box enabling selection of a procedure for calculating one or more values relating to the selected insurance product line, and a design grid being a matrix comprising of elements selected as a function of the selected product line, strategy and procedures for calculating, and for enabling input of product information, premium information and dividend information relating to the selected insurance product line, and enabling selection of a variable as the subject of the selected procedure for said product line; and an output display section for displaying an insurance proposal, the insurance proposal created as a function of all of the personal information, the selected product line, a selected strategy, the product information, the premium information and the dividend information, and for displaying a result of applying the procedure to the variable.

2. The graphical user interface of claim 1 wherein the plurality of insurance products includes a life insurance product.

3. The graphical user interface of claim 1 wherein the product information comprises a plurality of product sub-components, and wherein the graphical user interface further comprises a detailed dialogue box for enabling variation of individual one or ones of the plurality of product sub-components.

4. The graphical user interface of claim 1 wherein the premium information comprises a plurality of premium sub-components, and wherein the graphical user interface further comprises a detailed dialogue box for enabling variation of individual one or ones of the plurality of premium sub-components.

5. The graphical user interface of claim 1 wherein the premium information comprises a plurality of dividend sub-components, and wherein the graphical user interface further comprises a detailed dialogue box for enabling variation of individual one or ones of the plurality of dividend sub-components.

6. A computer implemented graphical user interface displayed on a computer screen for receiving instructions and information relating to a plurality of investment products, and for displaying an investment proposal related thereto, the graphical user interface comprising:

an insured section for receiving personal information about a person making an investment;

a product design section for receiving information specifying an investment product being one of the plurality of investment products and for specifying the components of the investment product, the product design section including a product line box enabling selection of an investment product line, a strategy box enabling selection of a strategy for a selected investment product line, a solve box enabling selection of a procedure for calculating one or more values relating to the selected investment product line, and a design grid being a matrix comprising of elements selected as a function of the selected product line, strategy and procedures for calculating, and for enabling input of product information, premium information and dividend information relating to the selected investment product line, and enabling selection of a variable as the subject of the selected procedure for said product line; and an output display section for displaying an investment proposal, the investment proposal created as a function of all of the personal information, the selected product line, a selected strategy, the product information, the premium information and the dividend information.

7. The graphical user interface of claim 6 wherein the output display section further comprises means for displaying a result obtained by applying the procedure to the variable.

8. A computer implemented graphical user interface displayed on a computer screen for receiving instructions and information relating to a plurality of insurance products, and for displaying an insurance proposal related thereto, the graphical user interface comprising:

means for receiving personal information about a person to be insured;

means for receiving information specifying an insurance product being one of the plurality of insurance products and for specifying the components of the insurance product, said means including means for selecting an insurance product line, means for selecting a strategy for a selected insurance product line, means for selecting a procedure for calculating one or more values relating to the selected insurance product line, means for enabling input on a single grid of product information, premium information and dividend information relating to the selected insurance product line wherein said grid comprising of elements of the selected product line, strategy and procedures for calculating, and means for enabling selection on the grid of a variable as the subject of the selected procedure;

means for displaying an insurance proposal, the insurance proposal created as a function of all of the personal information, the selected product line, a selected strategy, the product information, the premium information and the dividend information; and means for displaying a result of applying the procedure to the variable.

9. A computer-based method for receiving instructions and information relating to a plurality of insurance products on one user interface, and for displaying an insurance proposal related thereto, the method comprising:

displaying a graphical user interface on a display device, the graphical user interface including a design grid being a matrix for designing a plurality of different insurance proposals;

receiving as input at the graphical user interface personal information about a person to be insured;

receiving as input at the graphical user interface information specifying an insurance product line;

receiving as input at the graphical user interface information specifying a strategy for the insurance product line;

receiving as input at the graphical user interface information specifying a procedure for calculating one or more values relating to the insurance product line;

receiving product information at the design grid relating to the insurance product line;

receiving premium information at the design grid relating to the insurance product line;

receiving dividend information at the design grid relating to the insurance product line;

at the design grid, enabling selection of a solve variable as the subject of the selected procedure;

displaying, on the graphical user interface, an insurance proposal created as a function of the personal information, the insurance product line, the strategy, the product information, the premium information, and the dividend information; and displaying, as part of the insurance proposal, a result of the procedure when applied to the solve variable.

10. The method of claim 9 wherein input received at the graphical user interface is validated prior to displaying the insurance proposal.

* * * * *